US012601911B1

(12) United States Patent
Tarof et al.

(10) Patent No.: US 12,601,911 B1
(45) Date of Patent: Apr. 14, 2026

(54) METHODS AND SYSTEMS FOR HIGH-SPEED OPTICAL APPLICATIONS, AND THE DESIGN OF A CORRESPONDING RECEIVER AND TRANSMITTER

(71) Applicant: ElectroPhotonic-IC Inc., Kanata (CA)

(72) Inventors: Lawrence E. Tarof, Kanata (CA); Vighen Pacradouni, Montreal (CA); Joshua Baxter, Kanata (CA); Dhiraj Kumar, Redondo Beach, CA (US); Eric Cauchon, Ottawa (CA); Anton Menshov, Montreal (CA)

(73) Assignee: ElectroPhotonic-IC Inc., Kanata (CA)

( * ) Notice: Subject to any disclaimer, the term of this patent is extended or adjusted under 35 U.S.C. 154(b) by 0 days.

(21) Appl. No.: 19/259,200

(22) Filed: Jul. 3, 2025

Related U.S. Application Data

(60) Provisional application No. 63/809,670, filed on May 21, 2025.

(51) Int. Cl.
*G02B 27/00* (2006.01)
*G01J 1/04* (2006.01)
*G01J 1/44* (2006.01)

(52) U.S. Cl.
CPC ........ *G02B 27/0025* (2013.01); *G01J 1/0425* (2013.01); *G01J 1/44* (2013.01); *G02B 27/0012* (2013.01); *G01J 2001/446* (2013.01)

(58) Field of Classification Search
CPC ............. G02B 27/0025; G02B 27/0012; G01J 1/0425; G01J 1/44
See application file for complete search history.

(56) References Cited

U.S. PATENT DOCUMENTS 5,689,122 A 11/1997 Chandrasekhar
2002/0181869 A1* 12/2002 Lin .................. H04B 10/25133
385/27

OTHER PUBLICATIONS

Shermin, S.A. et al.; "Determination of the Best Apodization Function and Grating Length of Linearly Chirped Fiber Bragg Grating for Dispersion Compensation"; Journal of Communications, vol. 7, No. 11; Nov. 2012; pp. 840-846.
Hubbard, M.; "Dispersion Compensation of High Bit Rate Lightwave Systems Using Fiber Bragg Gratings"; Queen's University Thesis; Sep. 1999; 253 pages.
Aladadi, Y.T. et al.; "Optimum apodization profile for chirped fiber Bragg gratings based chromatic dispersion compensator"; Journal of the European Optical Society-Rapid Publications; 12:6; 2016; pp. 1-5

(Continued)

*Primary Examiner* — Georgia Y Epps
*Assistant Examiner* — Don J Williams
(74) *Attorney, Agent, or Firm* — Miltons IP/p.i.

(57) ABSTRACT

A dispersion compensation structure for use in an optical network to compensate for transmission-based dispersion of a light signal, wherein the dispersion compensation structure comprises an array of dispersion compensation elements having an AI-generated arrangement configured to compensate for transmission-based dispersion to one or more channels of the light signal and to generate an output having a spectrum that is substantially matching a pre-transmission spectrum for the or each channel.

30 Claims, 32 Drawing Sheets

(56)          References Cited

OTHER PUBLICATIONS

Lv, Z et al.; "On-Chip Multichannel Dispersion Compensation and Wavelength Division MUX/DeMUX Using Chirped-Multimode-Grating-Assisted Counter-Directional Coupler"; Photonics, 2024, 11, 110; https://www.mdpi.com/journal/photonics; pp. 1-8.

St-Arnault, C et al.; "Practical Fiber Dispersion-Induced Limitations for 1.6 Tbps (4X400Gbps/λ) O-Band IM/DD Transmission Systems Over 2, 10, 20 and 40 km"; Journal of Lightwave Technology; vol. X, No. X; Jan. 2025; pp. 1-11

"Dispersion Compensation with Fiber Bragg Gratings"; FOSCO. Fiber Optics for Sale Co.; available online: https://www.fiberoptics4sale.com/blogs/wave-optics/dispersion-compensation-with-fiber-bragg-gratings; 16 pages.

mathscinotes; "Optical Fiber Dispersion Formula—Where Did This Come From?"; Math Encounters Blog; Apr. 22, 2012; 5 pages.

"Corning® SMF-28® Ultra Optical Fiber"; Product Information; PI1424; Issued: Jul. 2025, Supersedes: Feb. 2024; TL9000/ISO 9001 Certified; 2 pages.

\* cited by examiner

226

DCM

Channel 1
Tx

Channel 1
Rx 222          220          224

Transmitter

Channel 1
Tx

DCM 242     240

Channel 2
Tx

DCM

240

Channel n
Tx

DCM

240

242

Mux

238

241

Receiver 248       244

Demux

Channel 1
Rx

Channel n
Rx 246       244

Fig. 3

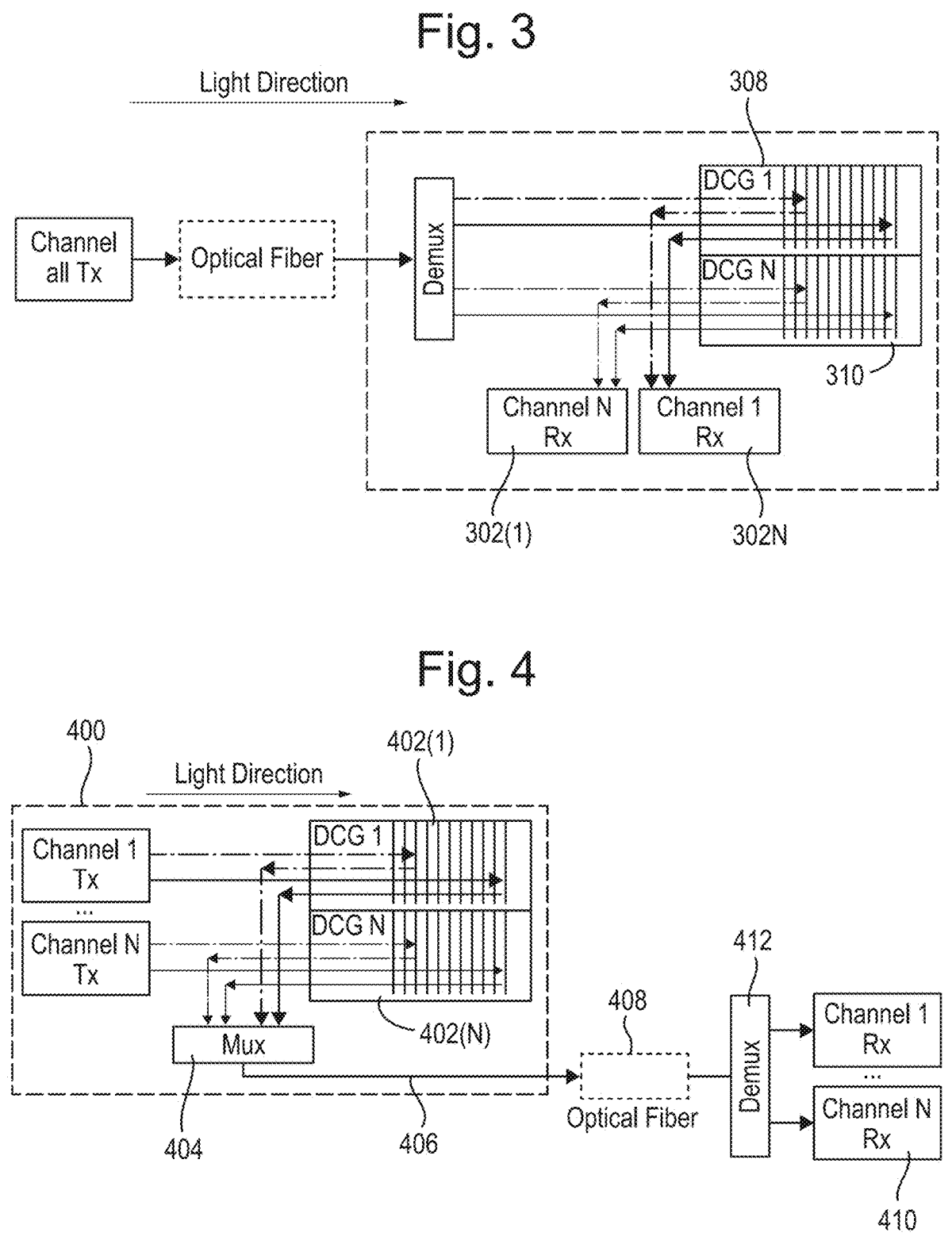

Light Direction →

308

| Channel all Tx | → | Optical Fiber | → | Demux |

DCG 1

DCG N

310

| Channel N Rx | | Channel 1 Rx |

Light Direction →

402(1)

| Channel 1 Tx |

DCG 1

...

| Channel N Tx |

DCG N

402(N)

| Mux |

404       406

408

Optical Fiber

412

| Demux |

| Channel 1 Rx |

...

| Channel N Rx |

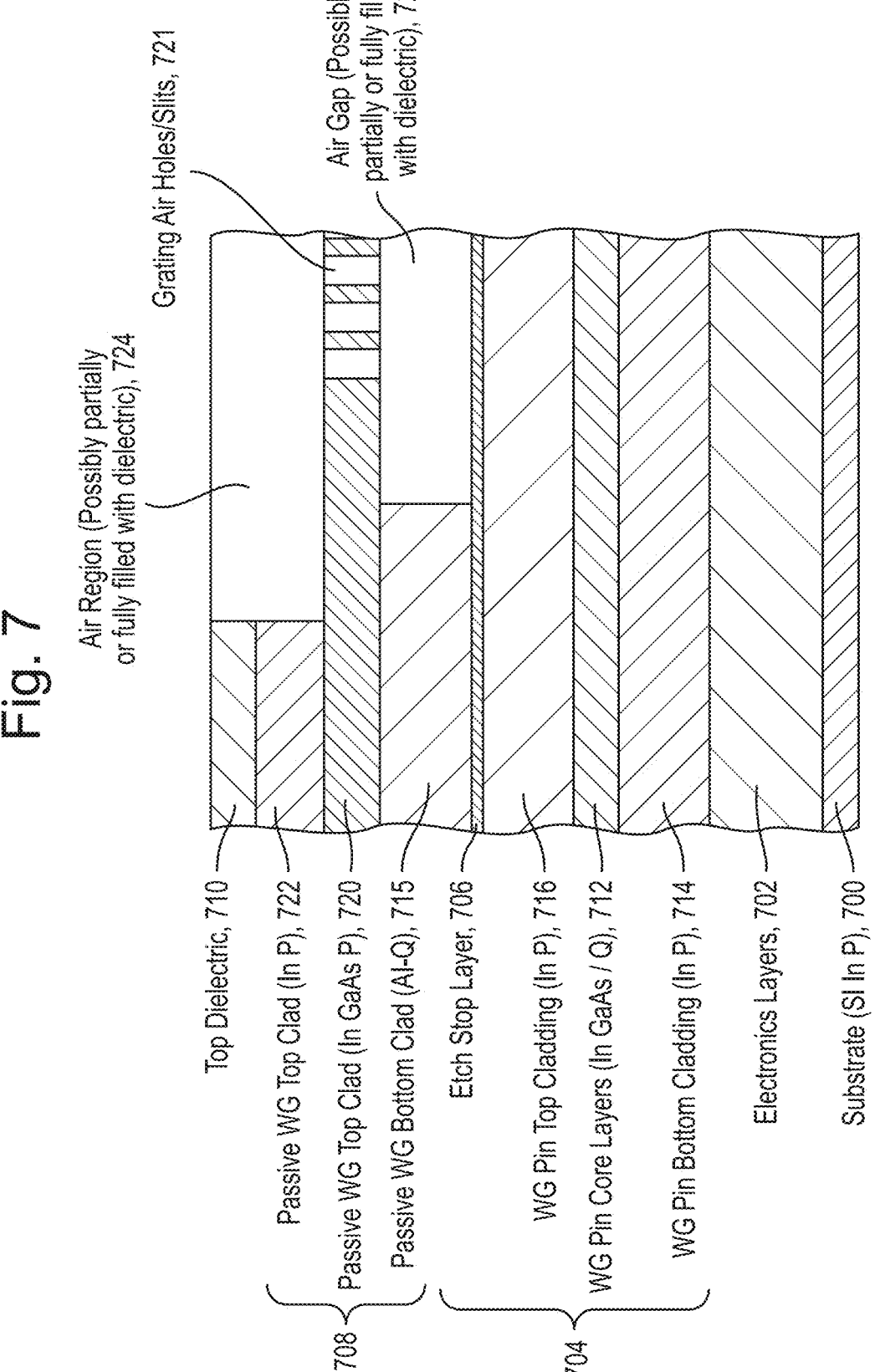

Grating Air Holes/Slits, 721

Air Gap (Possibly partially or fully filled with dielectric), 721

Air Region (Possibly partially or fully filled with dielectric), 724

Top Dielectric, 710

Passive WG Top Clad (In P), 722

Passive WG Top Clad (In GaAs P), 720

Passive WG Bottom Clad (Al-Q), 715

708

Etch Stop Layer, 706

WG Pin Top Cladding (In P), 716

WG Pin Core Layers (In GaAs / Q), 712

WG Pin Bottom Cladding (In P), 714

Electronics Layers, 702

Substrate (SI In P), 700

704

Grating Air Holes/Slits, 1021

Air Region (Possibly partially or fully filled with dielectric), 1024

Top Dielectric, 1026

Passive WG Top Clad (In P), 1022

Passive WG Top Clad (In GaAs P), 1020

Passive WG Bottom Clad (AlOx), 1018

Etch Stop Layer, 1006

WG Pin Top Cladding (In P), 1016

WG Pin Core Layers (In GaAs / Q), 1012

WG Pin Bottom Cladding (In P), 1014

Electronics Layers, 1002

Substrate (SI In P), 1000

1008

1004

Light Path

Input WG
(light from single
demux channel)

Output WG
(to WG PIN TIA die)

Dispersion
Compensating
Grating 1100

Reflection Reducing Tapers

Grating Air Holes/Slits, 1310

Air Region (Possibly partially or fully filled with dielectric), 1308

Top Dielectric, 1306

Si WG Core, 1304

SiO2 Bottom Cladding, 1302

Substrate (Si), 1300

Edge-receiving waveguide pin-PD
with lateral facet window

Fig. 23

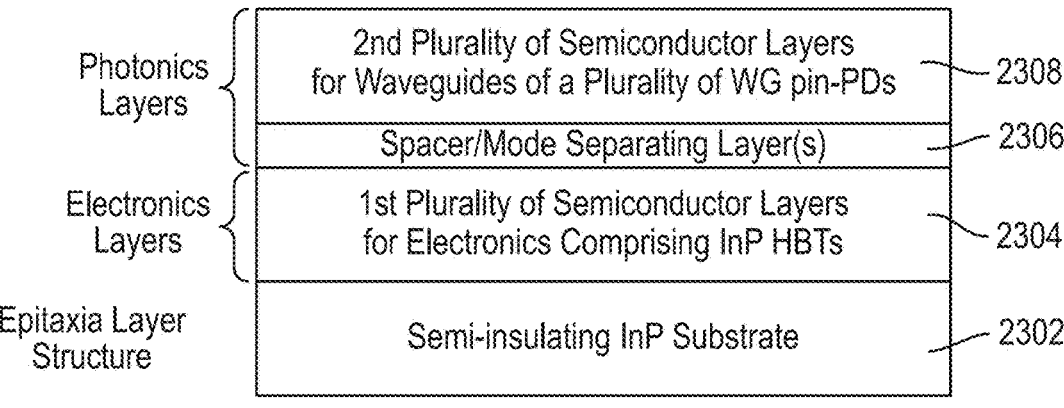

Photonics Layers { 2nd Plurality of Semiconductor Layers for Waveguides of a Plurality of WG pin-PDs — 2308

Spacer/Mode Separating Layer(s) — 2306

Electronics Layers { 1st Plurality of Semiconductor Layers for Electronics Comprising InP HBTs — 2304

Epitaxia Layer Structure — Semi-insulating InP Substrate — 2302

Fig. 24

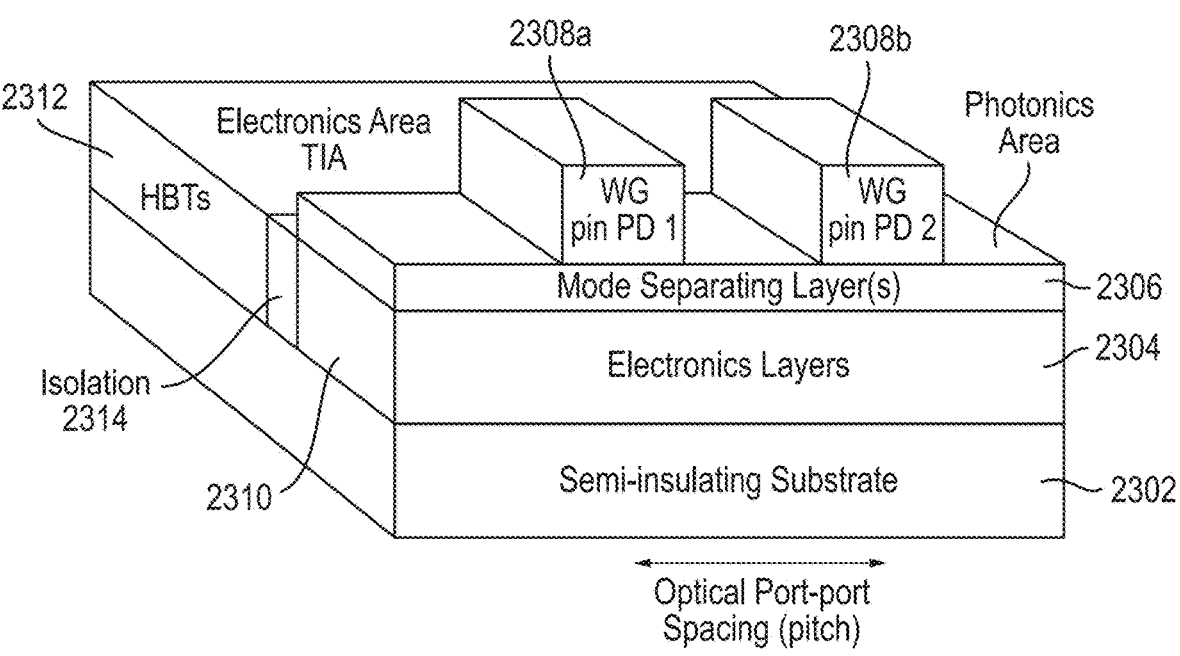

2308a     2308b

2312

Electronics Area TIA     Photonics Area

HBTs     WG pin PD 1     WG pin PD 2

Mode Separating Layer(s) — 2306

Electronics Layers — 2304

Isolation 2314

2310

Semi-insulating Substrate — 2302

Optical Port-port Spacing (pitch)

2500

Monolithically Integrated
EAM and EAM Driver chip
2500

EAM
2520

EAM
Driver

2530

Direct on-chip
Interconnection of
EAM and EAM Driver

EAM
2520

2500 i p

2525 n

Pin epi-layers
2508 epi-layers for
InP HBTs of
EAM Driver
2504

Spacer
2506

EAM Driver

3002

SI InP Subtrate

Photonics Area
2512

Electronics Area
2514

Signal in ⇨

Compensated signal out

Signal in ⇨
Compensated
signal out ⇦

Fig. 29
Transmission DCG
2900
2908
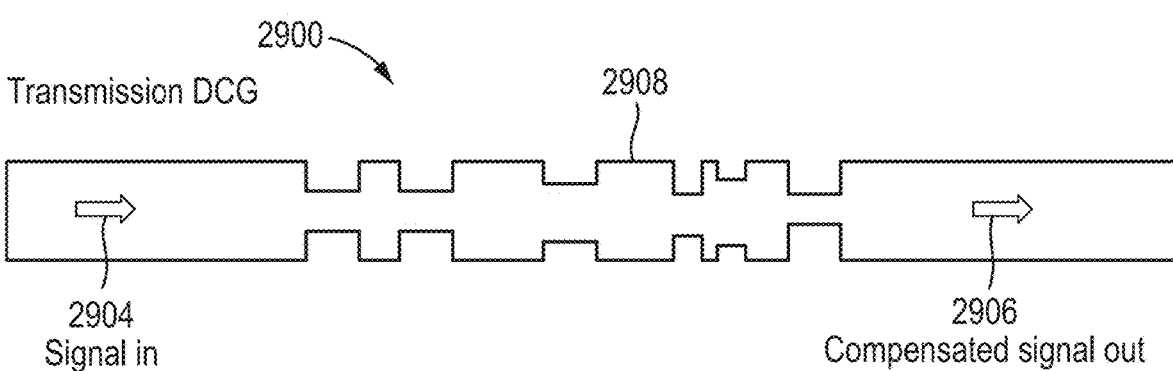
2904
Signal in
2906
Compensated signal out
Reflection DCG
Signal in
2910
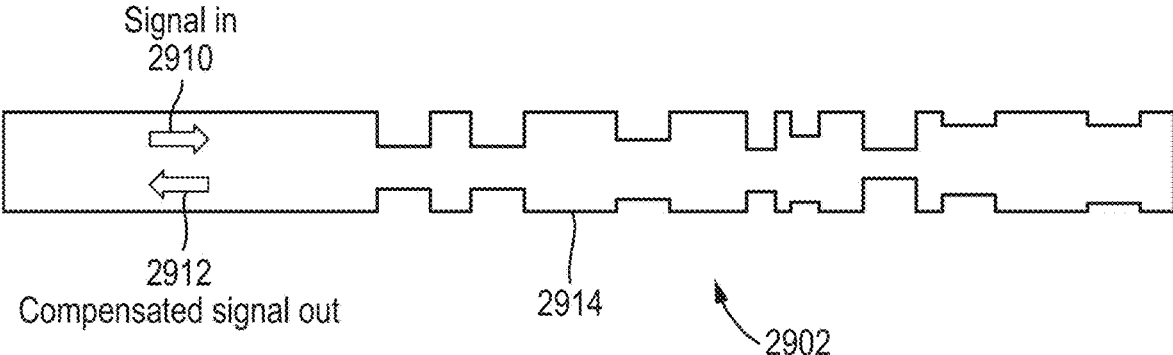
2912
Compensated signal out
2914
2902

METHODS AND SYSTEMS FOR HIGH-SPEED OPTICAL APPLICATIONS, AND THE DESIGN OF A CORRESPONDING RECEIVER AND TRANSMITTER

CROSS-REFERENCE TO RELATED APPLICATIONS

This application is related to U.S. provisional patent application No. 63/809,670, filed May 21, 2025, entitled "METHODS AND SYSTEMS FOR HIGH-SPEED OPTICAL APPLICATIONS, AND THE DESIGN OF A CORRESPONDING RECEIVER AND TRANSMITTER", which is incorporated herein by reference in its entirety.

This application is related to U.S. provisional patent application No. 63/766,464, filed Mar. 4, 2025, entitled "OPTICAL MONOLITHICALLY INTEGRATED DEVICES", which is incorporated herein by reference in its entirety.

This application is related to U.S. patent application Ser. No. 17/785,989, which is a National Stage entry of PCT International Application no. PCT/CA2020/051666, filed Dec. 4, 2020, designating the United States and having a § 371(c)(1) date of Jun. 16, 2022, and which claims priority from U.S. provisional patent application No. 62/950,479 filed Dec. 19, 2019; U.S. patent application Ser. No. 18/973,578 filed Dec. 9, 2024; both entitled "Optical Receiver Comprising Monolithically Integrated Photodiode and Transimpedance Amplifier", all of which are incorporated by reference in their entirety.

This application is related to United States provisional patent application no. U.S. 63/778,687, filed Mar. 27, 2025, entitled "Distributed electro-absorption modulator systems", which are incorporated herein by reference in their entirety.

This application is related to U.S. patent application Ser. No. 19/089,534, filed Mar. 25, 2025, entitled "Vertically Integrated Electro-absorption Modulated Laser", which is a continuation-in-part of U.S. patent application Ser. No. 17/687,803, filed Mar. 7, 2022, entitled "Vertically integrated Electro-absorption Modulated Laser", which are incorporated herein by reference in their entirety.

This application is related to U.S. patent application Ser. No. 18/984,180 filed Dec. 17, 2024, entitled "Vertically Integrated Electro-absorption Modulated Laser", which is a continuation of U.S. patent application Ser. No. 17/687,803, filed Mar. 7, 2022, entitled "Vertically Integrated Electro-absorption Modulated Laser" which are incorporated herein by reference in their entirety.

This application is related to U.S. provisional patent application No. 63/734,954, filed Dec. 17, 2024, entitled "Electro-absorption Modulator and Monolithic Electro-Photonic Circuit comprising an Electro-absorption Modulator and Driver" which is incorporated herein by reference in its entirety.

TECHNICAL FIELD

The present invention relates to a method and system and an optical receiver and transmitter, particularly but not exclusively for use in applications such as high-speed data interconnect, 5G wireless communications, and gigabit-capable passive optical networks (GPON). Devices may comprise optical monolithically integrated devices or other combinations of devices such as a receiver or a transmitter including a dispersion compensation grating or matrix, a multiplexer or a demultiplexer, a photodiode detector (PD);

a transimpedance amplifier (TIA), and other devices as required. The combinations may comprise different semiconductor-based materials.

BACKGROUND

A passive optical network (PON) is a point-to-multipoint, fiber to premises network architecture. PON networks use passive splitters and combiners to distribute optical signals, without requiring active elements such as optical amplifiers. An optical line terminal (OLT) at a central office of the service provider communicates with optical network units (ONUs) at each customer premises. The OLT produces an optical signal from electrical signals for transmission along an optical transmission line towards the receiver end ONUs. Each ONU comprises an optical receiver for converting the received optical signal to an electrical output.

For example, 10Gigabit-capable PON may be referred to as 10G-PON or XG-PON. Recommendation ITU-T G.987 is a family of documents that define this access network standard. Simultaneous upstream and downstream transmission over the same fiber is made possible through wavelength division multiplexing (WDM). This technology allows one PON wavelength transmission for upstream and another for downstream. For example, 10G-PON uses 1577 nm for downstream and 1270 nm for upstream.

Passive optical networks are becoming more sought after and used in most situations in the modem world. As with all developing technologies there is a drive for smaller, faster and other related improvements for such networks. As a result, single chip integrated devices are a requirement, and technologies are developing and combining to provide solutions to the technical challenges in and associated with high-speed communications.

The optical receiver of the ONU and the transmission end devices comprises multiple devices, including devices including a grating, a demultiplexer or a multiplexer, a photodiode detector and a transimpedance amplifier.

For 10G PON, optical receivers for 1577 nm have typically used a hybrid arrangement of an avalanche photodiode (APD) and a transimpedance amplifier (TIA), i.e. discrete components. Recently monolithic approaches have been proposed in for example U.S. patent application Ser. No. 17/785,989 and U.S. patent application Ser. No. 18/973,578 hereby incorporated by reference.

There are many other applications in which optical signals are used and some of these applications need to be distributed between transmitters and receivers via an appropriate network. Some applications use wavelength division multiplexing (WDM) comprising optical signals of multiple wavelengths which are multiplexed onto a single optical fiber, for example, using multiple wavelengths in the O-band, L-band, C-band and S-band wavelength ranges. WDM networks include e.g. high-speed optical data interconnects for data centers, which may be short range optical interconnects within a data center, or longer-range optical interconnects between data centers, 5G network optical communications and other similar forms of transmission and reception techniques.

As technology advances there is a need to combine passive devices such as gratings, grating couplers, multiplexers and demultiplexers in combination or not, with or without photodiodes, TIAs and the like. These add additional complexity and require different consideration in terms of design, positioning and locating the different devices to optimize space and performance on a monolithic substrate. Other devices may be included in both the receiver and transmitters alike. To achieve this is a challenge if speed of operation and size of the device continues to be pushed beyond current norms, e.g. next generation high-speed modulation schemes 112 GB, 224 Gb/s PAM4 modulation and 224 GB, 448 Gb/s PAM4 modulation applications.

The photodiode technology sets the physical limit on sensitivity and bandwidth performance in the receiver and transmitter. The choice of TIA technology and design approach strongly determines the overall device performance. The nature of the devices included in the receiver and transmitter define limits in terms of size and speed of operation. For WDM applications, currently available gratings, multiplexers and demultiplexers based on conventional waveguide structures are relatively large devices, and take up a considerable area on chip, e.g. >500 µm×500 µm for a 4-channel demultiplexer. For other sized demultiplexers the size may be considerable larger. A multiplexer will have similar dimensions to the demultiplexer. A grating can take up orders of millimeters which are simply too big for the current required devices.

It has been recognized that there is a significant problem in obtaining high-speed operation in future networks. For example, Charles St-Arnault, et al. "Practical Fiber Dispersion-Induced Limitations for 1.6 Tb/s (4×400 Gb/s/λ) O-Band IM/DD Transmission Systems Over 2, 10, 20 and 40 km" (*Journal of Lightwave Technology*, vol. X, no. X, January 2025 (DOI 10.1109/jlt.2024.3519901)) expresses the problem existing today and states: "This analysis reveals that channel rates of 400 Gb/s are implementable at distances up to 10 km using WDM grids wide enough to accommodate for the use of uncooled lasers, but are practically unfeasible at distances larger than 10 km. Instead, for these longer reaches, channel rates of 100 Gb/s are favorable due to lower accumulated chromatic dispersion (CD)".

In the past chromatic dispersion was compensated for by spools of Dispersion Compensating Fiber (DCF) or Fiber Bragg Gratings (FBG), and more recently by Dispersion Compensating Gratings (DCG) in Silicon Photonics (Si-Pho), where the gratings are linearly chirped, and also apodized to reduce group delay ripples.

At present there is no solution available which provides a workable solution for operating high-speed networks over any substantial distance. The fundamental failings are a limitation to the demand for high-capacity interconnections which are seen in data centers and elsewhere.

One area of development that offers an option for the design of new devices to address the varying challenges is the use of Artificial-Intelligence (AI)-based inverse design techniques. The use of AI to design a layout for pixelated materials, for example silicon and silicon oxide to generate a photonic device has been proposed. For example, a 4-channel coarse wavelength division multiplexing demultiplexer has been suggested in A. K. C. Cheung et al., "Inverse-designed CWDM demultiplexer operated in O-band," 2024 *Optical Fiber Communications Conference and Exhibition (OFC)*, San Diego, CA, USA, 2024, pp. 1-3. This is a specific example and there remain many challenges in the ability to combine the required components monolithically on a substrate.

The use of AI-based inverse design techniques help to achieve a smaller size for multiplexers and demultiplexers. However, there are still many limitations which make practical design of multiplexers and demultiplexers difficult. In addition, for a practical grating the size requirements are very challenging especially in pursuit of 336 Gb/s and beyond.

In addition, the design of all devices and combinations of devices which are likely to be needed for use in high-speed applications has not been addressed to date and there is a general push for devices that operate at speeds of greater than 336 Gb/s.

Thus, there is a need to provide optical communication using WDM which enables high-capacity interconnections in data centers and elsewhere which address at least some of the constraints presently encountered for high-speed data interconnects, 5G network communications, and the like. It would be further of interest to provide a solution to fit the spectrum of up to 16×448 Gb/s into a single fiber with sufficient fidelity to enable future communications to occur.

Further, there is a need for optical monolithically integrated devices which at least in part overcome the problems in the technology today and further provide a solution to integrating multiple devices on a single chip for applications such as CWDM for high-speed data interconnects, 5G network communications, et al.

SUMMARY OF INVENTION

The present invention seeks to eliminate or mitigate one or more of the above-mentioned disadvantages of known devices and systems comprising a dispersion compensation structure for use in an optical network to compensate for transmission-based dispersion of a light signal, wherein the dispersion compensation structure comprises an array of dispersion compensation elements having an arrangement configured to compensate for transmission-based dispersion to one or more channels of the light signal and to generate an output having a spectrum that is substantially matching a pre-transmission spectrum for the or each channel.

According to an aspect of the invention there is provided a dispersion compensation structure for use in an optical network to compensate for transmission-based dispersion of a light signal, wherein the dispersion compensation structure comprises an array of dispersion compensation elements having an AI-generated arrangement configured to compensate for transmission-based dispersion to one or more channels of the light signal and to generate an output having a spectrum that is substantially matching a pre-transmission spectrum for the or each channel.

In an aspect, the dispersion compensation structure of claim 1, wherein the dispersion compensation structure comprises one of a dispersion compensation grating (DCG); a dispersion compensation matrix (DCM) and a unit cell DCM.

In an aspect, the dispersion compensation structure of claim 1, wherein the dispersion compensation structure comprises a plurality of unit cell DCMs arranged in an array.

In an aspect, the dispersion compensation structure of claim 3, wherein the or each of the plurality of unit cell DCMs is connected to one or more further unit cell DCM in a predetermined configuration.

In an aspect, the dispersion compensation structure of claim 4, wherein the predetermined configuration of unit cells is uniform and different unit cells in the configuration of unit cells are connected in sequence for the or each channel In an aspect, the dispersion compensation structure of claim 5, wherein the arrangement is one of a 1-D, a 2-D and a 3-D array of dispersion compensation elements or unit cells.

In an aspect, the dispersion compensation structure is grown on an underlying supporting semi-insulating (SI) substrate.

In an aspect, the dispersion compensation structure is a dispersion compensation grating (DCG).

In an aspect, the dispersion compensation structure is a dispersion compensation matrix (DCM).

In an aspect, the AI-generated arrangement is one of a 1-D, a 2-D and a 3-D array of dispersion compensation elements.

In an aspect, further comprising a dispersion compensation structure for each channel of the light signal.

In an aspect, the dispersion compensation structure comprises a dispersion compensation fiber.

In an aspect, one dispersion compensation structure is located at one end of an optical fiber.

In an aspect, one dispersion compensation structure is located at one end of an optical fiber and another dispersion compensation structure is located at another end of fiber.

In an aspect, configured to operate over a Wavelength Division Multiplexing (WDM) spectral range.

In an aspect, the array of dispersion compensation elements comprise a plurality of holes in a passive optical material.

In an aspect, dispersion compensation elements comprise an array of air-holes in a passive optical material.

In an aspect, the air-holes are round, pseudo round or any other shape as is determined by the AI-generated arrangement.

In an aspect, the dispersion compensation elements are made from a combination of materials having different relative refractive index.

In an aspect, further comprising a demultiplexing arrangement.

In an aspect, the demultiplexing arrangement comprises a plurality of AI-generated demultiplexing elements.

In an aspect, the demultiplexing arrangement comprises a plurality of AI-designed drop filters.

In an aspect, further comprising a multiplexing arrangement.

In an aspect, the multiplexing arrangement comprises a plurality of AI-generated multiplexing elements.

In an aspect, the multiplexing arrangement comprises a plurality of AI-designed adders.

According to an aspect of the invention there is provided an optical receiver including the dispersion compensation structure of an aspect, and further comprising a plurality of semiconductor layers grown on an underlying supporting semi-insulating (SI) substrate; the layers comprising: one or more electronic component layers formed on the SI substrate; one or more waveguide PIN diode layers forming a WG-PIN PD; and one or more dispersion compensation structure layers.

In an aspect, further comprising an associated cladding layer; an etch stop material and a top dielectric.

In an aspect, the one or more electronic component layers form one or more of a driver, a modulator, an amplifier, a transimpedance amplifier (TIA), a non-photonic device or a non-optical device.

In an aspect, fabricated with an InP-based materials system comprising binary, ternary, quaternary and other compositions of In, Ga, As, Al, P and Sb.

In an aspect, the one or more WG-PIN PD layers comprise InGaAs/Q, where Q refers to quaternary and other compositions of In, Ga, As, Al, P and Sb.

In an aspect, the one or more dispersion compensation structure layers comprise air-holes formed in a passive WG material.

In an aspect, further comprising an upper defined air gap overlying the passive waveguide material and a lower defined air gap underlying the passive waveguide material.

In an aspect, the upper defined air gap and the lower defined air gap are partially or fully filled with dielectric material forming one or more or more pillars or posts of dielectric material. In an aspect, further comprising a defined air gap overlying a passive waveguide material and an AlOx layer underlying the passive waveguide material.

In an aspect, the defined air gap is partially or fully filled with dielectric material forming one or more or more pillars or posts of dielectric material.

In an aspect, the one or more dispersion compensation structure layers comprise silicon.

In an aspect, the one or more waveguide PIN diode layers comprise a waveguide photodiode (WG-PD), and one or more electronic layers comprising a transimpedance amplifier (TIA) monolithically integrated on a semi-insulating (SI) substrate, the optical receiver further comprising an epitaxial layer stack formed on the SI substrate; the TIA formed by a first plurality of semiconductor layers of the epitaxial layer stack formed on the SI substrate; the WG-PD comprises a p-i-n (PIN) diode formed by a second plurality of semiconductor layers of the epitaxial layer stack horizontally distanced from the first plurality of semiconductor layers, the second plurality of semiconductor layers comprising an n-layer, an i-layer and a p-layer, wherein the WG-PD is configured to output a photocurrent to the TIA, the TIA configured to provide an electrical output from the light signal; the dispersion compensation structure is horizontally distanced from the first plurality of semiconductor layers and formed from the second plurality of semiconductor layers, the dispersion compensation structure having an optical input port for the light signal and a one or more optical output ports; wherein the dispersion compensation structure is configured to receive the light signal, and provide an optical output to the or each of the one or more optical output ports, and an input of the WG-PD is optically coupled with the or each of the one or more optical output ports of the dispersion compensation structure.

In an aspect, the demultiplexing arrangement is horizontally distanced from the first plurality of semiconductor layers and formed from the second plurality of semiconductor layers in optical communication between the light source and the dispersion compensation structure.

According to an aspect of the invention there is provided a combination dispersion compensation and demultiplexing arrangement comprising the dispersion compensation structure of an aspect.

In an aspect, the demultiplexing arrangement comprises a plurality of AI-generated demultiplexing elements.

In an aspect, a combination dispersion compensation and demultiplexing arrangement and a demultiplexing arrangement comprises a plurality of AI-designed drop filters.

According to an aspect of the invention there is provided an optical receiver for receiving an optical signal from a transmitter via a fiber, and compensating for dispersion caused by transmission of the optical signal from a launched spectrum to a received spectrum, the optical signal comprising one or more channels each having a predetermined dispersion across the or each channel caused by the transmission, the receiver further comprising the combination dispersion compensation and demultiplexing arrangement according to an aspect.

According to an aspect of the invention there is provided a combination dispersion compensation and multiplexing arrangement comprising the dispersion compensation structure of an aspect.

In an aspect, a combination dispersion compensation and multiplexing arrangement, wherein the multiplexing arrangement comprises a plurality of AI-generated multiplexing elements.

In an aspect, the multiplexing arrangement comprises a plurality of AI-designed adders.

According to an aspect of the invention there is provided an optical transmitter for receiving an optical signal from a laser via a fiber, and pre-compensating for dispersion caused by transmission of the optical signal from a launched spectrum to a received spectrum, the optical signal comprising one or more channels, each having a predetermined dispersion across the or each channel caused by the transmission, the receiver further comprising the combination dispersion compensation and multiplexing arrangement of an aspect.

According to an aspect of the invention there is provided an optical transmitter including the dispersion compensation structure of an aspect and further comprising: a plurality of semiconductor layers grown on an underlying supporting semi-insulating (SI) substrate; the layers comprising: one or more electronic component layers formed on the SI substrate; one or more electro-absorption modulator (EAM) layers forming an EAM; and one or more dispersion compensation structure layers.

In an aspect, further comprising an associated cladding layer; an etch stop material and a top dielectric.

In an aspect, the one or more electronic component layers form one or more (EAM) driver layers.

In an aspect, fabricated with an InP-based materials system comprising binary, ternary, quaternary, quintenary and other compositions of In, Ga, As, Al, P and Sb.

In an aspect, the one or more EAM layers comprise InGaAs.

In an aspect, the one or more dispersion compensation structure layers comprise air-holes formed in a passive WG material.

In an aspect, an upper defined air gap overlying the passive waveguide material and a lower defined air gap underlying the passive waveguide material.

In an aspect, the upper defined air gap and the lower defined air gap are partially or fully filled with dielectric material forming one or more or more pillars or posts of dielectric material.

In an aspect, the one or more dispersion compensation structure layers further comprising a defined air gap overlying a passive waveguide material and an AlOx layer underlying the passive waveguide material.

In an aspect, the defined air gap is partially or fully filled with dielectric material forming one or more or more pillars or posts of dielectric material.

In an aspect, the one or more dispersion compensation structure layers comprise silicon.

According to an aspect of the invention there is provided an optical transmitter of an aspect wherein the one or more one or more electronic component layers form an electro-absorption modulator (EAM) driver; one or more electro-absorption modulator (EAM) layers forming an EAM; and one or more dispersion compensation structure layers monolithically integrated on the semi-insulating (SI) substrate, the transmitter comprising an epitaxial layer stack formed on the SI substrate; the electronic circuitry comprising the EAM driver formed by a first plurality of semiconductor layers of the epitaxial layer stack formed on the SI substrate; the EAM is formed by a second plurality of semiconductor layers of the epitaxial layer stack horizontally distanced from the first plurality of semiconductor layers, wherein the EAM driver is configured to output a voltage to the EAM, the EAM driver configured to receive said electrical input; the dispersion compensation structure layers horizontally distanced from the first plurality of semiconductor layers and formed from the second plurality of semiconductor layers, the dispersion compensation structure layers having a one or more optical input ports and one or more optical output port; wherein the dispersion compensation structure layers is configured to receive one or more optical inputs on the one or more optical input ports, and provide one or more optical outputs to the one or more optical output ports, and an output of the EAM is optically coupled with one or more of the optical input ports of the dispersion compensation structure layers.

In an aspect, a multiplexer comprises a plurality of AI-generated multiplexing elements, In an aspect, the multiplexer is horizontally distanced from the first plurality of semiconductor layers and formed from the second plurality of semiconductor layers in optical communication between the light source and the dispersion compensation structure.

According to an aspect of the invention there is provided an optical system including an optical transmitter according to an aspect.

According to an aspect of the invention there is provided an optical system including an optical receiver according to an aspect.

According to an aspect of the invention, there is provided an optical system according to one aspect and further including an optical transmitter according to another aspect.

According to an aspect of the invention there is provided an optical system including an optical transmitter according to one aspect and an optical receiver according to another aspect.

According to an aspect of the invention there is provided an photonic device comprising a dispersion compensation structure according to an aspect and an array of a plurality of waveguide photodiodes (WG-PD) monolithically integrated on a semi-insulating (SI) substrate, comprising: an epitaxial layer stack comprising a plurality of semiconductor layers formed on the SI substrate structured to form optical waveguides of the dispersion compensation structure and the plurality of WG-PDs; the dispersion compensation structure comprising a first part of the plurality of semiconductor layers, and comprising one or more optical input port for receiving one or more input optical signal, and one or more optical outputs for outputting one or more optical signals; the array of the plurality of WG-PDs comprising a second part of the plurality of semiconductor layers, the second part being horizontally distanced from the first part, and the plurality of WG-PDs being arranged in parallel; an input of each WG-PD is optically coupled with one of the plurality of optical outputs of the dispersion compensation structure, and each WG-PD is configured to output a photocurrent to an electrical output.

According to an aspect of the invention there is provided a photonic device comprising a dispersion compensation structure of an aspect, and an array of a plurality of electro-absorption modulators (EAM) monolithically integrated on a semi-insulating (SI) substrate, comprising: an epitaxial layer stack comprising a plurality of semiconductor layers formed on the SI substrate structured to form optical waveguides of the dispersion compensation structure and the plurality of EAMs; the dispersion compensation structure comprising a first part of the plurality of semiconductor layers, and comprising and one or more optical inputs for receiving one or more optical signals and one or more optical output ports for outputting one or more optical signals, the array of the plurality of EAMs comprising a second part of the plurality of semiconductor layers, the second part being horizontally distanced from the first part, and the plurality of EAMs being arranged in parallel; each EAM is configured to receive a continuous wave optical input and an EAM drive signal and to output a modulated optical output, and the modulated optical output of each EAM is optically coupled with one or more optical inputs of the dispersion compensation structure.

According to an aspect of the invention there is provided a method of transmitting an optical signal from a transmitter via an optical fiber to a receiver, the method for compensating for transmission-based dispersion of the light signal, at least one of the transmitter and the receiver comprising a dispersion compensation structure wherein the method comprises providing dispersion compensation via an array of dispersion compensation elements having a predetermined arrangement configured to compensate for transmission-based dispersion to one or more channels of the optical signal and to generate an output having a spectrum that is substantially matching a pre-transmission spectrum for the or each channel.

In an aspect, the array of dispersion compensation elements having a predetermined arrangement comprises an AI-generated arrangement.

In an aspect, the array of dispersion compensation elements having a predetermined arrangement comprises an arrangement configured to compensate for transmission-based dispersion for each channel of the light signal.

In an aspect, further comprising multiplexing an output from the dispersion compensation structure into the optical fiber.

In an aspect, further comprising demultiplexing an output from the optical fiber into the dispersion compensation structure.

According to an aspect of the invention there is provided a dispersion compensation structure for use in an optical network to compensate for transmission-based dispersion of a light signal comprising a plurality of channels, wherein the dispersion compensation structure comprises an array of dispersion compensation elements having an arrangement configured to compensate for transmission-based dispersion for each channel of the light signal and to generate an output having a spectrum that is substantially matching a pre-transmission spectrum for the or each channel.

According to an aspect of the invention there is provided a dispersion compensation structure for use in an optical network to compensate for transmission-based dispersion of a light signal, wherein the dispersion compensation structure comprises an array of dispersion compensation elements having an arrangement configured to compensate for transmission-based dispersion to one or more channels of the light signal and to generate an output having a spectrum that is substantially matching a pre-transmission spectrum for the or each channel.

According to an aspect of the invention there is provided a dispersion compensation structure for use in an optical network to compensate for transmission-based dispersion of a light signal, wherein the dispersion compensation structure comprises an array of dispersion compensation elements having an arrangement configured to compensate for transmission-based dispersion to one or more channels of the light signal and to generate an output having a spectrum that is substantially matching a pre-transmission spectrum for the or each channel monolithically integrated with a multiplexing arrangement.

According to an aspect of the invention there is provided a dispersion compensation structure for use in an optical network to compensate for transmission-based dispersion of a light signal, wherein the dispersion compensation structure comprises an array of dispersion compensation elements having an arrangement configured to compensate for transmission-based dispersion to one or more channels of the light signal and to generate an output having a spectrum that is substantially matching a pre-transmission spectrum for the or each channel monolithically integrated with a demultiplexing arrangement.

According to an aspect of the invention there is provided an optical transmitter including the dispersion compensation structure of an aspect.

According to an aspect of the invention there is provided an optical receiver including the dispersion compensation structure of an aspect.

The optical transmitter of an aspect wherein the plurality of semiconductor layers grown on an underlying supporting semi-insulating (SI) substrate comprise silicon-based material.

The optical transmitter of an aspect, wherein the plurality of semiconductor layers grown on an underlying supporting semi-insulating (SI) substrate comprise InP-based material.

The optical transmitter of an aspect wherein the plurality of semiconductor layers grown on an underlying supporting semi-insulating (SI) substrate comprise a first plurality of semiconductor layers in a silicon-based material and a second plurality of semiconductor layers in an InP-based material.

The optical receiver of an aspect, wherein the plurality of semiconductor layers grown on an underlying supporting semi-insulating (SI) substrate comprise InP-based material.

The optical receiver of an aspect, wherein the plurality of semiconductor layers grown on an underlying supporting semi-insulating (SI) substrate comprise silicon-based material.

The optical receiver of an aspect, wherein the plurality of semiconductor layers grown on an underlying supporting semi-insulating (SI) substrate comprise a first plurality of semiconductor layers in a silicon-based material and a second plurality of semiconductor layers in an InP-based material.

According to an aspect of the invention there is provided an optical system of an aspect, comprising two or more chips in which at least one chip is made from silicon-based material and at least one chip is made from InP-based material.

According to an aspect of the invention there is provided an optical transmitter of an aspect comprising two or more chips in which at least one chip is made from silicon-based material and at least one chip is made from InP-based material.

According to an aspect of the invention there is provided an optical receiver according to an aspect, comprising two or more chips in which at least one chip is made from silicon-based material and at least one chip is made from InP-based material.

BRIEF DESCRIPTION OF THE DRAWINGS

FIG. 3 shows a schematic view of a monolithic multi-channel multidevice system according to an aspect of the present invention.

FIG. 4 shows a schematic view of a monolithic multi-channel multidevice system according to an aspect of the present invention.

FIG. 7 shows a side view of part of the system of FIGS. 5 and 6.

FIG. 23 shows an example epitaxial layer structure for monolithic integration of multiple WG-pin PD with electronic circuitry, e.g. comprising a TIA according to an aspect of the present invention.

FIG. 24 shows a simplified perspective view of part of a monolithically integrated circuit comprising a plurality of WG-pin PD integrated with electronic circuitry comprising a TIA according to an aspect of the present invention.

FIG. 29 includes schematic drawings showing examples of a dispersion compensation matrix (DCM) of dispersion compensating elements designed using an AI-inverse design process.

FIG. 31a to 31e are schematic drawings showing examples of arrangements of dispersion compensating elements in the form of unit cells forming a combination thereof for a designed dispersion compensation effect using an AI-inverse design process.

DETAILED DESCRIPTION

Figure 1A:
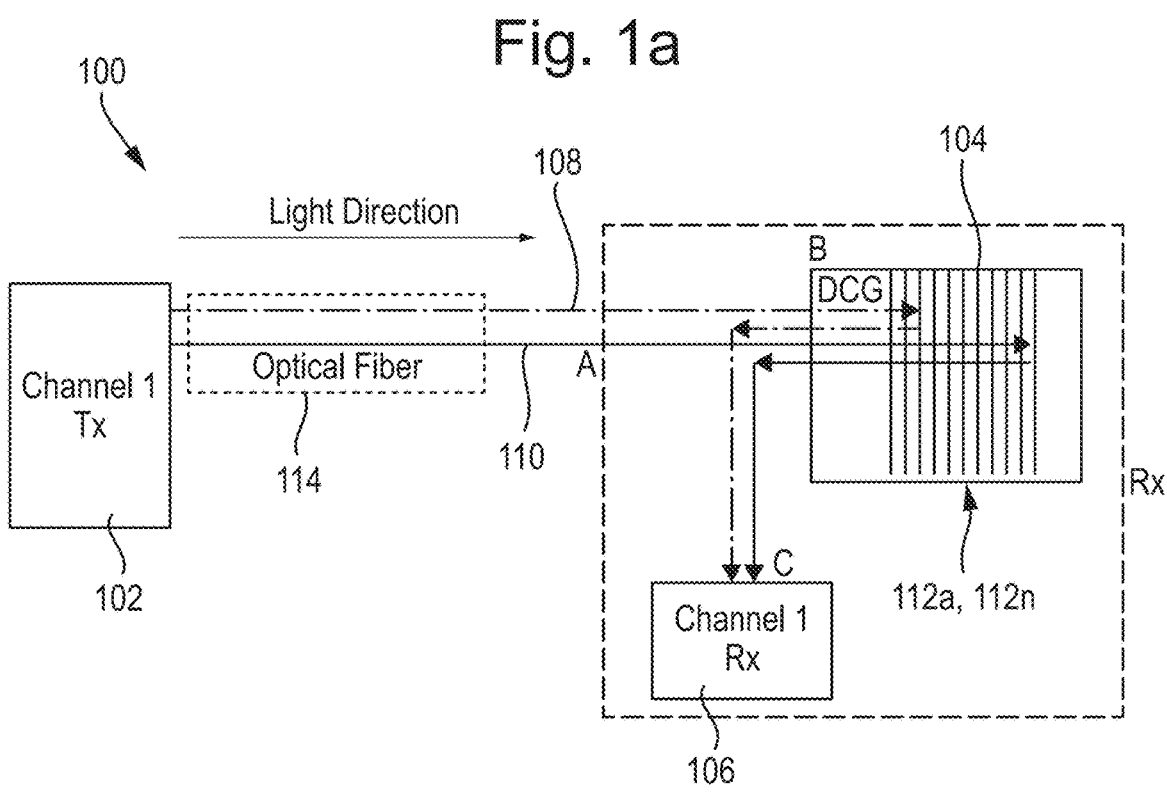
FIG. 1a shows a schematic view of a monolithic multi-device system including a dispersion compensating grating (DCG) according to an aspect of the present invention.

A major impediment to 448 Gb/s in a WDM scheme is the spectral dispersion produced by transmission of light through a fiber. Even for data rates faster than 224 Gb/s for 16 channels this is a problem. A further impediment is crosstalk that is generated by a signal transmitted on one circuit or channel of a transmission system by an undesired effect in another circuit or channel. Crosstalk is usually caused by undesired capacitive, inductive, or conductive coupling from one circuit or channel to another. Crosstalk can be avoided, to some extent, by use of appropriate filters. But there is still a problem in attaining the high data rates needed for tomorrow's devices and systems. The problem may be further exacerbated by chirp which may occur as a result of dispersion (i.e. a dependence of the propagation speed of the various frequency components of the transmitted pulse through the fiber, such that the pulse broadens temporally and therefore interferes with signal in the adjacent (time) frame).

The present invention seeks find a solution to the problems associated with the compensation of chromatic and other dispersion by designing devices to an arbitrary refractive-index-textured design that yields the required chromatic dispersion (CD) spectrum to compensate for the CD created by the transmission channel. In at least some examples the arbitrary refractive-index-textured design is an AI-designed 1D, 2D, or 3D an arbitrary refractive-index-textured design. In at least some examples the arbitrary refractive-index-textured design provides dispersion compensation on a channel-by-channel basis. In at least some examples the arbitrary refractive-index-textured design provides dispersion compensation on monolithic chip. In at least some examples the arbitrary refractive-index-textured design provides dispersion compensation on a combination of different chips formed from different materials and having a bespoke set of optical coupling and electrical connections. The different chips may carry different components. For example, the passive components may be in silicon-based materials and the active components in InP-based materials.

A typical optical fiber for use in telephony, television and other network applications might comprise a single mode optical fiber such as a Corning® SMF-28™ fiber. The fiber provides transmission for a plurality of wavelengths λ1 to λn having a spectral span or spectral range extending from about 1270 nm to about 1600 nm each channel occupying a constant channel width in either frequency or wavelength.

The typical single mode optical fiber is considered as having the following example characteristics:

A midpoint of spectral frequency range is considered to be 1310 nm, 229008 GHz using c=3E8 m/s;

Zero-dispersion wavelength λ0 is set to 1302≤λ0≤1322;

The frequency between channels is constant;

The dispersion limit is defined as when the time constant reaches 10% of the Nyquist limited period, e.g. 4*10%/(Gb/s)—means 1.19 ps for 336 Gb/s and 0.89 ps for 448 Gb/s—this is referred to as t_dispersion.

Δλ_spectrum is usually 2× bit rate, so 672 GHz for 336 Gb/s, 896 GHz for 448 Gb/s etc. This means it is a fixed value.

The present invention is based on using a constant frequency e.g., Dense Wavelength Division Multiplexing (DWDM) or Lan Wavelength Division Multiplexing (LWDM) which may be a quarter the frequency spectral density of DWDM channels.

The effects of dispersion are a major problem in the design of devices which are used in high-speed chips.

It is known to use dispersion compensation gratings to mitigate dispersion.

By addressing the problems of dispersion compensation, the present invention considers a number of different options. Each of these options provides a solution to and the common aim of addressing dispersion compensation effects in an optical signal to enable high data rates to be fully supported.

To determine the viability of the dispersion compensation, the dispersion coefficient D is calculated for the endpoint wavelengths (frequency converted to wavelength) in an example Ch1 and Ch16 for λ0 of 1302, 1312, 1322 nm and a maximum spectral reach is calculated as:

$$\mathrm{ABS}[(\lambda\_endpoint - \lambda 0)*t\_dispersion/D)] \qquad \text{Eq. 1}$$

The chromatic dispersion coefficient for a typical fiber such as the Corning @SMF-28™ fiber, which is a standard single-mode fiber, can be calculated using the Sellmeier formula, expressed as $$D(\lambda) = 0.25\lambda S.0*(1-(\lambda.0/\lambda)^4),$$

where D(λ) is the dispersion coefficient, is the wavelength, S.0 is the dispersion slope, and λ.0 is the zero-dispersion wavelength.

From the various calculations, it is thus determined that the further away from Zero-dispersion wavelength λ0 (1302-1322 in the typical fiber) the greater the absolute value of dispersion. Different fibers may have a different Zero-dispersion wavelength λ0 and so different calculations and materials may apply.

The two outer channels are substantially similar in terms of the amount of dispersion and dispersion is progressively smaller towards the central wavelength of the selected spectral range. The invention seeks to address this by restoring the post dispersion pulse width to the launched pulse width using one or more channel-based dispersion compensated gratings as described below.

The addition of chirp will lead to small modification in the design of the devices without major other implications. This is described in greater detail below with respect to the AI-based inverse design. Chirp may have an effect that gives rise to a change in the value of λ0. For example, chirp may mean that λ0 has a different effective value. In addition, in different fibers and different circumstances the value of λ0 may be different. It is noted that whatever λ0 turns out to be there is a wavelength at which there is zero-dispersion. Whenever there is zero-dispersion it will be clear that there is no need to apply any compensation at that wavelength.

Providing a compact device which exhibits efficient dispersion compensation has proved very difficult. The reality is still more complicated as the design of devices which provide a solution to this problem must also be addressed. The present invention further seeks to address this.

A dispersion compensating grating or an array of dispersion compensation elements for each channel of a multichannel device according to an aspect of the invention can be included at the transmitter, the receiver or both. In the latter case some of the dispersion is compensated for pre-transmission and some post-transmission. The amount of dispersion provided for pre-transmission and post-transmission can be determined in such a way as to optimize the sizes of the dispersion compensated elements at the respective ends of the optical fiber in which the optical signal is carried. The array of dispersion compensation elements comprise a predetermined structure of dispersion compensation elements that may be AI-generated using an AI-based inverse design process. An AI-generated structure of dispersion compensation elements is further described below. The array of dispersion compensated elements may be formed in a matrix of holes in a material having a different refractive index than the content of the holes. The holes may be air filled or include a material such as for example a dielectric material. The matrix of dispersion compensated elements is also referred to herein as a dispersion compensation matrix (DCM) and has a similar or equivalent function to a dispersion compensating grating (DCG). As used herein a matrix includes a 1-dimensional, a 2-dimensional or a 3-dimensional arrangement of elements in a grid or other arrangement and either periodic or aperiodic in nature.

One example solution is to implement devices in which the signal is altered to compensate for dispersion prior to demultiplexing and converting the optical signal to an electrical signal at a receiver and after multiplexing at the transmitter and transmission through the fiber. Different amounts of dispersion compensation are applied to the different channels using one or many arrays of dispersion compensation elements which may include but not limited to a dispersion compensating fiber (DCF), a dispersion compensation matrix (DCM), a dispersion compensating grating (DCG), a Fiber Bragg Grating (FBG), or a combination of one or more different types of dispersion compensation elements providing the function as claimed herein.

In the case where the spectrum used is not centered around the zero-dispersion wavelength of the fiber used to transmit the light, e.g., a band centered near the 1550 nm absorption minimum for SMF 28 fiber, a DCG, FBG, or DCF may be used for the transmitter or the receiver to apply a substantial amount of dispersion compensation to all of the channels before demultiplexing or in the case of the receiver, after multiplexing. This will relax the amount of dispersion compensation required from the DCM and improve the manner in which this may be implemented in accordance with an aspect of the invention.

The terms DCG and DCM are used throughout and are not intended to be limiting other than to state there is a grating having an appropriate functionality for the required use. Reflection, diffraction and transmission being examples of different types of DCG or DCM used herein. It will be appreciated that for different types of DCG or DCM the overall device will be configured in appropriate materials and include appropriate couplers and other devices as required. It is further noted that a DCG or a DCM, according to aspects of the invention, may be aperiodic, periodic and one, two or three-dimensionally formed and/or textured.

One element of the invention is a design of a device which compensates for dispersion, i.e., any dispersion compensator, including an array or matrix of dispersion compensation elements such as a dispersion compensation grating (DCG), DCM, or equivalent. This is now described in a broad context with reference to FIGS. 1 to 4. These figures refer to optical signals in the optical domain. A system 100 shows channel 1 of a transmitter 102, a DCG 104 and channel 1 of a receiver 106. As shown in FIG. 1a two edges of the channel 1 spectrum are shown as beams 108 and 110. The light beam at each edge 108, 110 travels a different distance based on the nature of the reflection in the DCG. The DCG includes an array of dispersion compensation elements 112a to 112n. The shorter beam path 108 represents one edge of the channel spectrum and the longer beam path 108 represents the other edge of the channel spectrum. The other wavelengths in the channel undergo one or more intermediate paths between the longer and shorter paths. The intermediate paths are not shown but are reflected by different dispersion compensation elements in the DCG. By varying the path travelled, compensation is made for chromatic dispersion caused by transmission through a fiber 114. The DCG can be located at the transmitter, the receiver or both. In FIG. 1 the DCG provides post-transmission compensation and is associated with the receiver.

The amount of dispersion which can be compensated in part or in total depends on the paths through which the light passes. The dispersion compensation Dg to be created by the grating is calculated as follows:

$$Dg = 2\ n_{avg}\ Lg/(c\Delta\lambda) \qquad\qquad \text{Eq. 2}$$

$\Delta\lambda$ is the difference in pitch at the two ends of the gratings; Lg is the length of the grating; $n_{avg}$=is the average index of refraction in the grating $(3.4+1.4)/2=2.4$ Lg=0.5e−3 m; c=299792458 m/s; which gives $$\Delta\lambda = 2\ n_{avg}\ Lg/(c\ Dg) = 2.50173e{-}10 \qquad\qquad \text{Eq. 3}$$

Linear Chirp Coefficient=2.50173e−10/0.5e−3=5.00346e−07; Df=16 ps/nm/km*2 km=0.032 s/m. Dg is the dispersion introduced by the grating [ps/nm], Df is the dispersion caused by the fiber=D [ps/nm/km]*fiber_length [km]. The linear chirp coefficient is the change in the pitch of the grating with respect to the distance from one end of the grating.

This works for low index contrast and relatively long gratings. Where these factors are different, the calculations are modified accordingly. By defining a size between the dispersion compensation elements of the grating it is possible to anticipate and compensate for the expected dispersion in the fiber. This approach is used in the various examples described herein. It will be appreciated that different manners of calculating the grating spacing may be used without deviating from the intended scope of the claims. The term dispersion compensation element as used herein is intended to include the or each of the parallel strips forming the whole grating. Each parallel strip is separated from the next by a distance and material having a different refractive index from the material of the strip. The grating has for example a periodic structure of strips, which diffract (or transmit) light, or another type of electromagnetic radiation, into several beams traveling in different directions. The directions or diffraction angles of the beams is related to the incident angle of the beam to the grating, the spacing between adjacent dispersion compensation elements, and the wavelength of the incident radiation.

In some cases, the grating is linearly apodized, decreasing from front to back to widen the negative dispersion bandwidth. In addition, a more symmetrical (e.g., Gauss, Sinc) apodization may reduce group delay ripples. A combination of the apodization and dispersion compensation is used in the design for the required grating spacing. Apodization reduces group delay ripples will be known to the skilled person. The DCG may be produced with high index contrast.

According to one or more aspects of the present invention, the use of AI-based inverse design is used to define the exact make up and profile of each array and/or matrix of dispersion compensation elements to be used to compensate for the dispersion in a specific channel. In some cases, the array of dispersion compensation elements having an AI-generated predetermined arrangement or structure is in 1-D, 2-D, or 3-D. The array and/or matrix of dispersion compensation elements comprises materials that provide different optical characteristics such that different paths are travelled by different wavelengths through the AI-generated predetermined arrangement of dispersion compensation elements. Each path providing a different dispersion compensation which may be dependent on the wavelength of the light passing through it. The array of dispersion compensation elements may be arranged in a periodic or aperiodic arrangement. The dispersion compensation elements may be completely random and define a set of predetermined paths being of different lengths or otherwise arranged and thus compensating for different dispersion. The optical input and output required for the device are the primary variables which lead to the different arrangement or structure of dispersion compensation elements forming the array and/or matrix. There is no limit to the shape size or arrangement of the AI-generated predetermined arrangement of dispersion compensation elements merely the requirement to provide a defined path which provides dispersion compensation in the required manner.

The present invention includes devices of different materials and is seeking to overcome the effects of dispersion caused by the transmission of light in a fiber of a predetermined length or any other type of dispersion and having a known optical characteristic in terms of input and output. In order to compensate for the dispersion caused, a dispersion compensator of the present invention provides a design for a device and method for forming and using such a device which provides dispersion compensation. The materials chosen for the design and fabrication of the grating are important in that they determine the strength of optical scattering. Materials with a large difference in index of refraction will generally produce stronger scattering and allow for DCGs or DCMs that provide more dispersion compensation relative to their overall physical size.

Figure 1B:
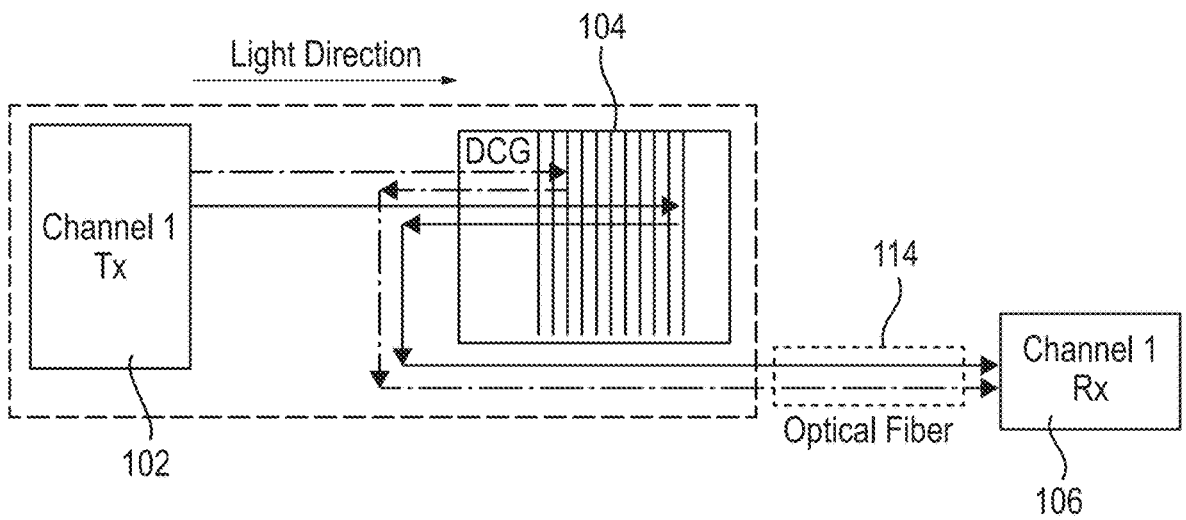
FIG. 1*b* shows a schematic view of a monolithic multi-device system including a dispersion compensating grating (DCG) according to an aspect of the present invention.

In an alternative in FIG. 1b, the DCG is associated with the transmitter and provides pre-transmission compensation. The compensation provided by the DCG is calculated in the same way as described above.

Figure 2A:
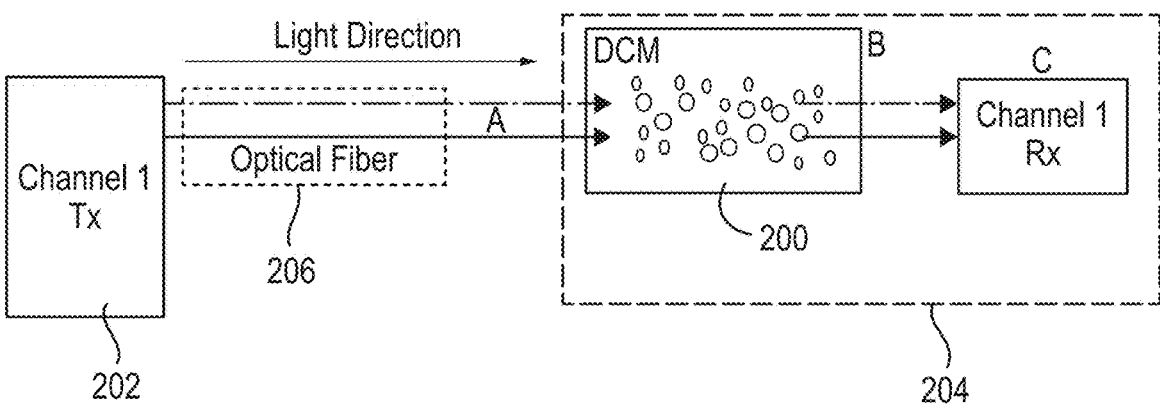
FIG. 2*a* shows a schematic view of a monolithic multi-device system including a dispersion compensating matrix (DCM) according to an aspect of the present invention.

FIG. 2a shows an example of a dispersion compensation matrix (DCM) 200 according to an aspect of the invention which is located between a one channel transmitter 202 and a one channel receiver 204. The DCM is shown located at the receiver end of a fiber 206 and associated with the receiver. In other examples the DCM may be at the transmitter end and associated with the transmitter or there may be a different DCM at either end associated with both receiver and transmitter. The DCM is a transmission DCM but may alternatively be diffractive or reflective and positioned appropriately for the input and output.

FIG. 2a shows a first and second path for light (orange forming a longer path length for one edge of the channel spectrum and blue forming a shorter path length for the other edge of the channel spectrum). The time delay in the DCM photonic matrix (e.g. a so-called Photonic crystal) is different for different wavelengths of light. As a result, the chromatic dispersion from the transmission through the fiber and the like has been compensated for by the DCM. This means that a higher rate signal can be transmitted than would otherwise be the case. Each channel has a different amount of dispersion compensation, based on the arrangement of the dispersion compensation elements of the dispersion compensation matrix.

Figure 2B:
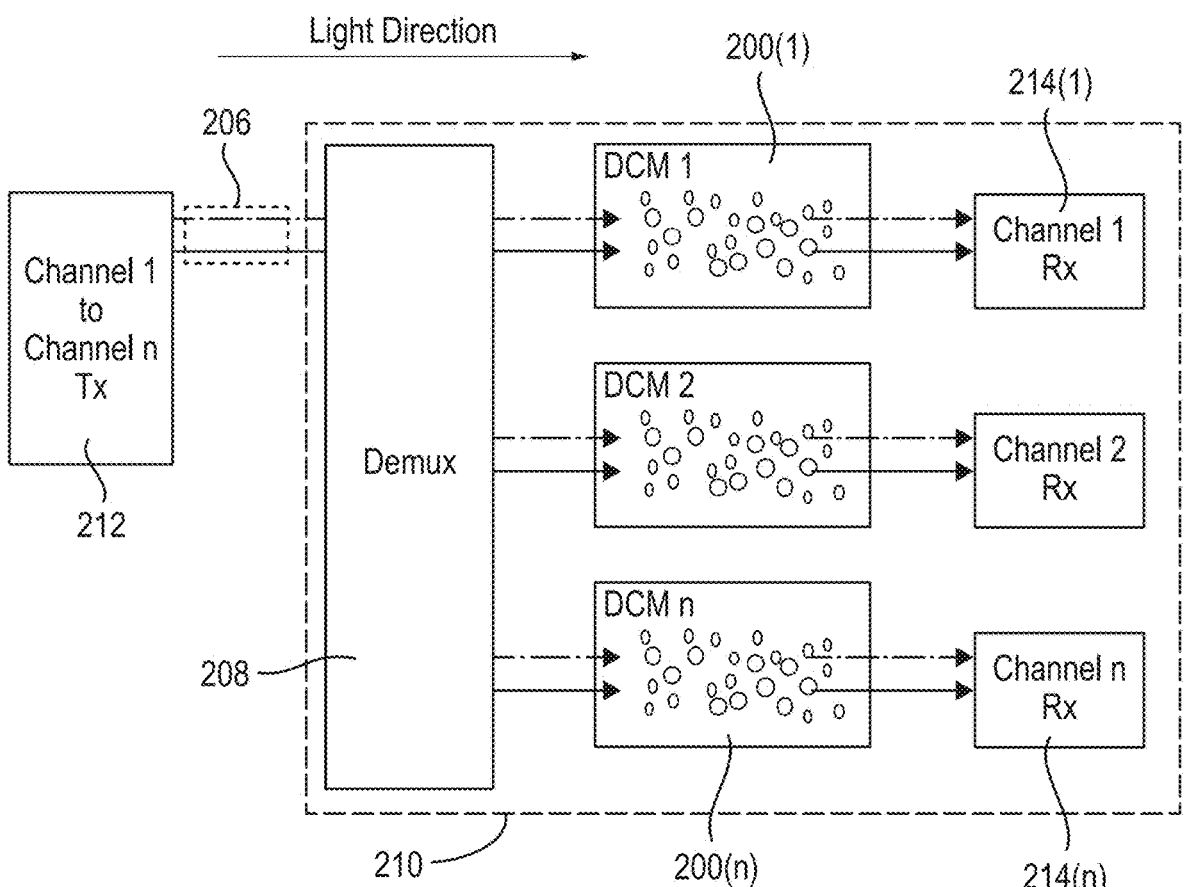
FIG. 2*b* shows a schematic view of a monolithic multi-channel multidevice system including a dispersion compensating matrix (DCM) according to an aspect of the present invention.

FIG. 2b shows an example of a dispersion compensation matrix (DCM) 200 according to an aspect of the invention which is located between a multi-channel transmitter 212 and n-one channel receivers 214(1) to 214(n). The DCMs 200 are shown located at the receiver end of a fiber 206 in a chip 210. The chip includes a demultiplexer 208 which splits a multi-channel light signal into wavelengths $\lambda_1$ to $\lambda_n$ received from the transmitter 212. Each wavelengths $\lambda_1$ to $\lambda_n$ passes through a respective DCMs to respective channel receivers 214(1) to 214(n).

Figures 2C, 2D:
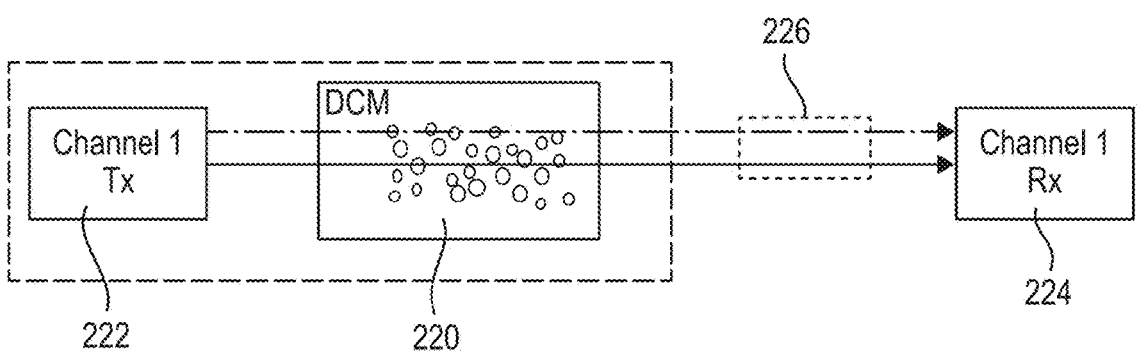
FIG. 2*c* shows a schematic view of a monolithic multi-device system including a dispersion compensating matrix (DCM) according to an aspect of the present invention.
FIG. 2*d* shows a schematic view of a monolithic multi-channel multidevice system including a dispersion compensating matrix (DCM) according to an aspect of the present invention.

FIG. 2c shows an example of a dispersion compensation matrix (DCM) 220 according to an aspect of the invention which is located between a one channel transmitter 222 and a one channel receiver 224. The DCM is shown located at the transmitter end of a fiber 226 and associated with the transmitter. The DCM is a transmission DCM but may alternatively be diffractive or reflective and positioned appropriately for the input and output.

FIG. 2c shows a first and second path for light (orange forming a longer path length for one edge of the channel spectrum and blue forming a shorter path length for the other edge of the channel spectrum). The time delay in the DCM photonic matrix (e.g. a so-called Photonic crystal) is different for different wavelengths of light. As a result, the chromatic dispersion from the transmission through the fiber and the like has been compensated for by the DCM. This means that a higher rate signal can be transmitted than would otherwise be the case. Each channel has a different amount of dispersion compensation, based on the arrangement of the dispersion compensation elements of the dispersion compensation matrix.

FIG. 2d shows an example of a dispersion compensation matrix (DCM) 240 according to an aspect of the invention which is located between n single-channel transmitters 242 and a n channel receivers 244. The DCMs 240 are shown located at the transmitter end of a fiber 246 in a chip 241. The chip includes a multiplexer 238 which combines a multi-channel light signal into wavelengths $\lambda_1$ to $\lambda_n$ received from the transmitter 242. Each wavelengths $\lambda_1$ to $\lambda_n$ passes through a respective DCMs to respective channel receivers 244(1) to 244(n) via local demultiplexer 248.

In an aspect of the invention there is a simple cell DCM using a known combinations of materials and having a known arrangement of matrix elements. This simple cell DCM is also referred to herein as a unit cell DCM. That is to say a smallest unit array of holes and materials making up a unit cell DCM of a predetermined size. In an example, this may be 18×18 μm or 32×32 μm. In other examples the unit cell may be rectangular or any other appropriate shape and arrangement of elements. Further details of the unit cells and example layouts thereof are described in more detail in FIG. 31.

The required number of unit cell DCMs is determined by the ratio of the Fiber chromatic dispersion ($CD_{fiber} \cdot L_{fiber}$) divided by the dispersion compensation provided by the DCM ($DC_{DCM}$). As it is only possible to have a whole number of devices, it may be necessary to round up/down the number of unit cells to be a whole number. This may depend on a variety of factors.

The formula for the number of unit cells of dispersion compensating devices required is given by:

$$N_{DCM} = \text{Round}\left[\frac{CD_{fiber} \cdot L_{fiber}}{DC_{DCM}}\right] \qquad \text{Eq. 4}$$

where, $N_{DCM}$=number of dispersion compensating devices required; $CD_{fiber}$=chromatic dispersion coefficient of the fiber (ps/nm/km); $L_{fiber}$=length of the fiber (km); and $DC_{DCM}$=dispersion compensation provided by the DCM (ps/nm).

Based on the dispersion compensation provided by a unit cell DCM it is possible to combine multiple unit cell DCMs to provide a specific channel dispersion compensation. This will be discussed in further detail below.

For a receiver or a transmitter having multiple channels additional DCMs can be combined in parallel or series for multiple channels. There may be a matrix or array of DCMs or DCGs as the case may be. Arrays of any number of DCGs or DCM can be accommodated and can include any of 2, 4, 8, 16 or 32 as examples.

FIG. 3 is similar to FIG. 1 and includes channels 1 302 (1) to N 302 (N) of receiver 300. A demultiplexer 304 is combined with 1 to N, DCGs 306 (1, . . . N) In the example shown DCG1 and DCGN are shown respectively at 308 and 310. Two wavelengths are illustrated for each channel as an example to show that different wavelengths of a channel travel along a different defined path so that different dispersion is compensated for by the different paths. As shown in this aspect, a different channel has a different DCG and different wavelengths within a channel travel along a different path. Each DCG has an array of dispersion compensation elements, such as for example an AI-generated predetermined arrangement of air-holes separated to provide the necessary paths to conform to the expected dispersion to be encountered by the light from the respective channel and/or wavelength. The number of channels will depend on the use case and may include 2, 4, 8 and 16 channels as examples. Other options can also be operated in a similar manner. The Demultiplexer may be formed with the DCG or as a separate component. The Demultiplexer may form part of a single component comprising a combination of DCG and demultiplexer. The combination of DCG and demultiplexer may form part of a larger monolithic chip including other components or form a chip including the combination and other devices as required for a given use case.

It will be appreciated that the DCG in FIG. 3 may be a DCM as shown elsewhere and there may be multiple DCMs each having a different matrix of dispersion compensation elements, one for each channel or one for more than one channel as the case may be. The DCM may also include a demultiplexer formed with the DCM or as a separate component. The Demultiplexer may form part of a single component comprising a combination of DCM and demultiplexer. The combination of DCM and demultiplexer may form part of a larger monolithic chip including other components or form a chip including the combination and other devices as required for a given use case.

FIG. 4 is similar to FIG. 1b showing the multichannel transmitter 400 including multiple DCGs 402 (1 . . . N) and a multiplexer 404. An output 406 from the transmitter travels through an optical fiber 408 towards receivers 410 for one or more channels. If there are multiple channels a demultiplexer 412 is provided, otherwise a demultiplexer is not required, unless for other purposes. Two wavelengths are illustrated for each channel as an example to show that different wavelengths of a channel travel along a different defined path so that different dispersion is compensated for by the different paths. As shown in this aspect, a different channel has a different DCG and different wavelengths within a channel travel along a different path. Each DCG has dispersion compensation elements, such as for example an AI-generated predetermined arrangement of dispersion compensation elements, separated to provide the necessary paths to conform to the expected dispersion to be encountered by the light from the respective channel and/or wavelength. The number of channels will depend on the use case and may include 2, 4, 8 and 16 channels as examples. Other options can also be operated in the same way.

The multiplexer may be formed with the DCG or as a separate component. The multiplexer may form part of a single component comprising a combination of DCG and multiplexer. The combination of DCG and multiplexer may form part of a larger monolithic chip including other components or form a chip including the combination and other devices as required for a given use case.

It will be appreciated that the DCG in FIG. 4 may be a DCM as shown elsewhere and there may be multiple DCMs each having a different matrix of dispersion compensation elements, one for each channel or one for more than one channel as the case may be. The DCM may also include a multiplexer formed with the DCM or as a separate component. The multiplexer may form part of a single component comprising a combination of DCM and multiplexer. The combination of DCM and multiplexer may form part of a larger monolithic chip including other components or form a chip including the combination and other devices as required for a given use case.

In FIGS. 1 and 3 to 4, it is noted that each DCG is shown as a plurality of linear parallel dispersion compensation elements, but this is only shown for ease of explanation and to demonstrate different wavelengths travel different paths through the or each DCG so that the required dispersion compensation is provided. The actual DCG is instead designed by an AI-based inverse design process and has a different form as is described elsewhere. The DCM shown in FIG. 2 is a further example of an array or matrix of dispersion compensation elements which may be used as an alternative to any DCG herein.

It is further noted that the light paths shown include a number of deviations and again this is merely illustrative. The actual passage of the light through the device is not in any particular direction and may follow any path required to accomplish a required optical characteristic as is described below.

In the example of FIG. 1 to 4 directional couplers (not shown) may be used to align the light direction. In each case the channel or channels are carried simultaneously on the optical fiber between the transmitter and the receiver. In the examples shown there is a DCG or a DCM at one end, i.e. either the transmission end or the receiver end, but as indicated previously there may be a DCG and/or a DCM at both ends sharing the dispersion compensation effort. The split may be uniform or non-uniform. In addition, the examples may include a further dispersion contribution from other dispersion compensators as described herein. Again, this may be divided in any proportion and the split may be uniform or non-uniform.

As previously suggested, there could be one grating for all channels having enough elements and spacing to accommodate the anticipated dispersion. In the one grating per channel scheme, each grating would be different and tuned to the particular central wavelength and amount of dispersion expected at the frequency and fiber to be used. In addition to addressing the effect of dispersion the grating is further tuned and designed to mitigate the effect of chirp in the or each channel due to the nature of the transmitter In each or the examples in FIG. 1 to 4 and any other equivalent or different example the combination of the multiplexing and demultiplexing function with the dispersion compensation function is co-optimized by using an AI-based inverse design. More details of the AI-based inverse design process is described below. As the DCGs, DCMs, multiplexers and demultiplexers are passive devices they can be easily fabricated together in a monolithic device that includes just these components and/or other elements of an optical distributed network system. Passive devices are made from materials that are optically passive such as InP, InGaAsP, Aluminum Oxide, Silicon Nitride, SiO2, Si, The materials used in the configurations are examples and could comprise other materials than those stated having similar electro-optical characteristics as would be known to the skilled person. In certain cases, some combinations of materials may be used which require the use of an interposer or other form of coupling and so can be made from one or more dies. In some aspects, the materials are suitable to monolithic integration on a single die. Each configuration has different advantages.

FIG. 5 shows an example of an implementation of a single channel-based solution as described above with reference to FIGS. 4 to 6 and which further includes details of a possible dispersion compensation grating structure 500 for a receiver 502. In FIGS. 5 to 11 the grating 500 is provided as a receiver-based air bridge configuration and includes an air gap 501 under the grating. The receiver 502 includes two closely spaced waveguides 504 and 506 which are in the form in a double serpentine shape and include respective inner edges 508 and 510 that are substantially parallel to enable coupling between the first waveguide 504 and the second waveguide 506. The coupling is an evanescent coupling in an example. Light from a single demultiplexer channel enters the first waveguide 504 and is coupled into the second waveguide 506 and continues along the second waveguide towards grating 500. As described above, the light directed to the grating comprises multiple wavelengths of the channel 1 spectrum, configured to travel and be reflected by multiple dispersion compensation elements of the grating so that a first edge of the channel 1 light travels a different distance from the last edge of the channel 1 light. In this way the expansion of the channel spectrum from the launched spectrum caused by travelling along a fiber to the receiver is compensated for. The light is reflected back from the grating 500 along the second waveguide 506 towards a waveguide PIN (WG-PIN) photodiode (PD) 512 via a reflection reducing taper 513.

Figure 28A:
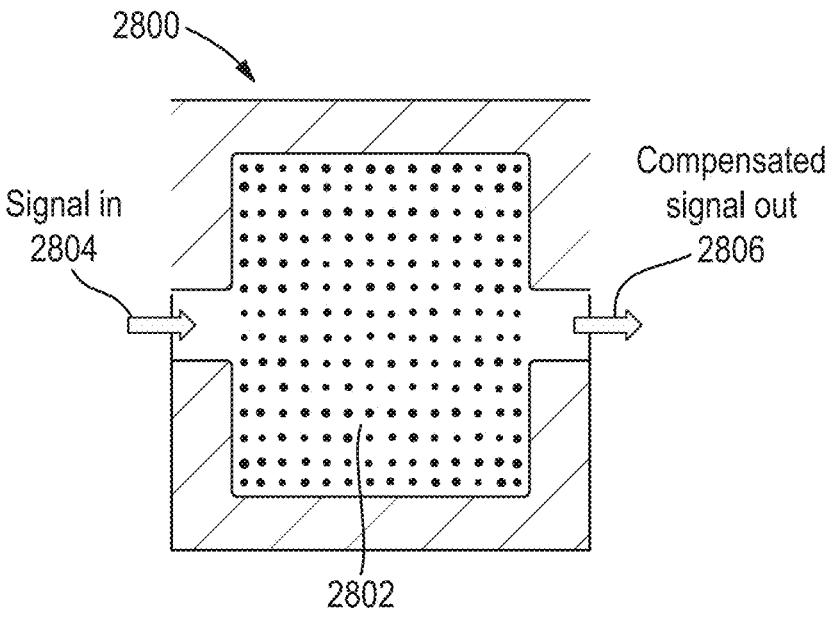
FIGS. 28*a* to 28*c* are schematic drawings showing examples of a dispersion compensation matrix (DCM) of dispersion compensating elements designed using an AI-inverse design process.

The second waveguide 506 includes a number of couplers, for example a reflection reducing taper 514 between the second waveguide and the grating 500; and a tapered vertical optical coupler 516 between the second waveguide 506 and the WG-PIN 512. The reflection reducing taper 514 couples the light into and out of the grating. In the drawing a further taper is shown after the DCG, this may be used if the DCG is transmissive, and further devices are connected in series after the DCG. The second DCG may act to absorb and/or reflect and/or terminate the light which passes through the DCG. The tapered vertical optical coupler 516 enables vertical optical communication between horizontally distanced layers. A transmission grating may be as illustrated in FIG. 28a.

The grating 500 comprises an air bridge defined by layers of semiconductor materials around the grating structure making up the receiver, transmitter and/or any related structures or elements. The nature of the different layers of semiconductor materials is described in more detail below.

Figures 5, 6:
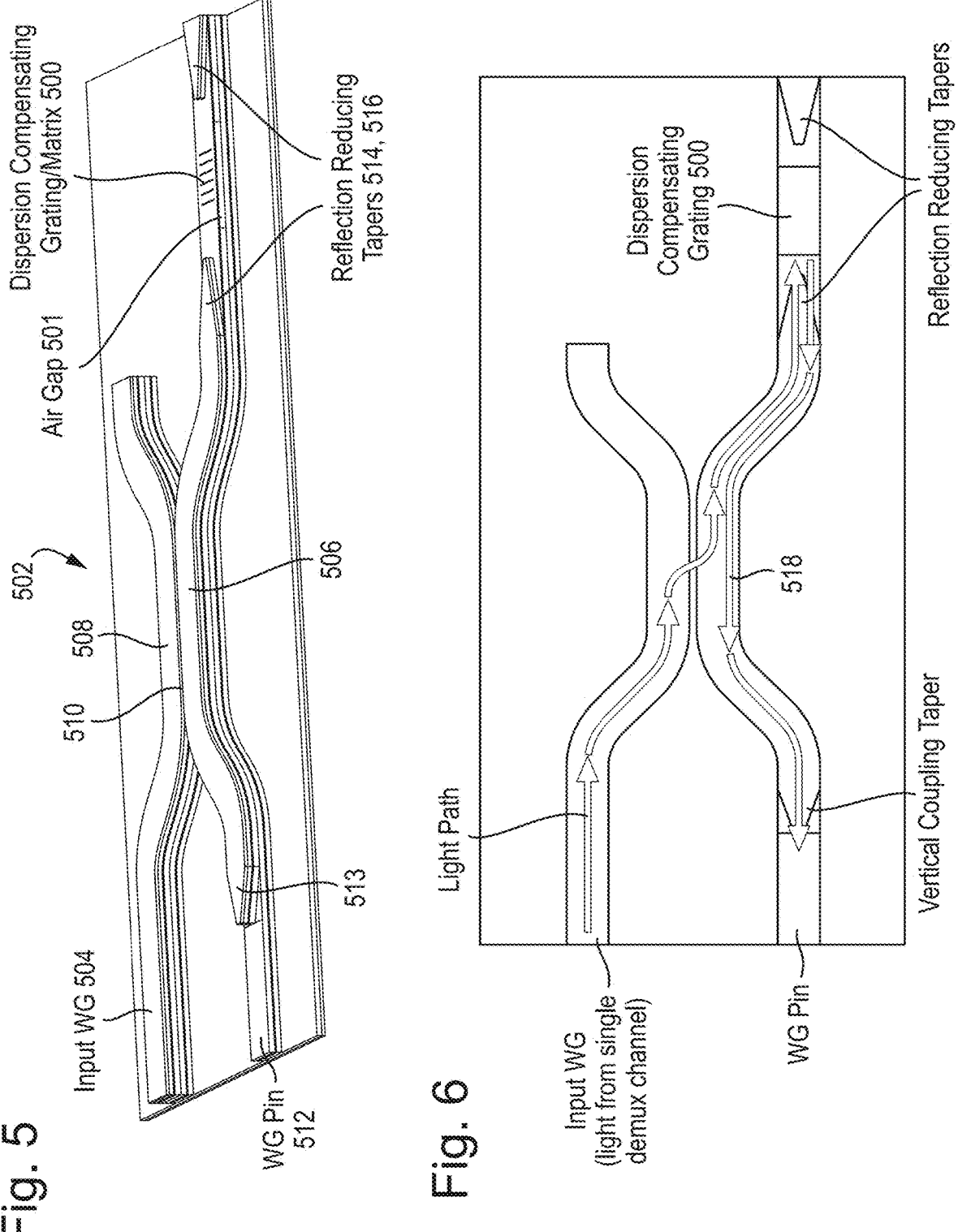
FIG. 5 shows a perspective view of a monolithic multi-device system according to an aspect of the present invention.
FIG. 6 shows a plan view of the system of FIG. 5.

FIG. 6 shows a plan view of the FIG. 5 configuration and the passage of light 518 through the structure. Only one beam is shown but it will be appreciated that this is in fact a spectrum not a single wavelength and the spectrum may comprise multiple wavelengths.

As stated above, this is a receiver-based air bridge configuration of a dispersion compensating grating (DCG) 500 and the nature of the semiconductor layers in the vicinity of the DCG are shown in FIG. 7. The layers are grown on an underlying supporting semi-insulating (SI) substrate 700 such as InP, as an example. One or more electronic component layers 702 are formed on the substrate 700. Layers 704 are applied forming a WG-PIN PD and associated cladding and an etch stop material 706 is grown. The grating structure, 500 in FIGS. 5 and 708 in FIG. 7, is added followed by a top dielectric 710.

The electronics components formed in the electronic layers can include drivers, modulators, amplifiers, TIAs, and any other non-photonic or non-optical devices. The layers 704 comprise WG-PIN PD core layers 712 such as InGaAs/Q and associated bottom cladding layer 714 and top cladding layer 716. The cladding layers comprise InP in an example. The grating structure 708 is defined by a passive WG bottom cladding 715 such as Al-Q or InGaAsP so that an air gap 718 is formed underlying a grating layer 720 which is formed from passive WG material such as InGaAsP or any Al-Q material. The grating layer 720 defines a plurality of air-holes or slits 721 forming the dispersion compensation elements. A further passive WG top cladding 722 formed in InP in an example defines a further air region 724. The top layer shown is a top dielectric layer 726.

The nature of the materials are shown as examples, and it will be appreciated that other examples are equally valid. In an example the refractive index n of layer 720>refractive index n of layer 715 so this functions effectively as a waveguide. If layers 720 and 715 are of the different materials the etch stop is easier to define.

The air gap 718 and the air region 724 may be partially or fully filled with dielectric material and either may comprise one or more or more pillars or posts of dielectric material for support. The grating is shown as a plurality of air-holes or slits spaced apart to facilitate reflection of the composite spectrum from different dispersion compensation elements, such as for example an AI-generated predetermined arrangement of dispersion compensation elements, of the grating. In an example the grating may be a 1-D, 2-D or 3-D array of periodic or aperiodic air-holes 721 or air-holes partially or completely filled with dielectric.

The air-holes 721 have a different refractive index from the surrounding materials. This is caused by the air or the partial or complete filling with a dielectric. The difference in refractive index helps provide the refractive index difference between the materials which leads to different transmission of light though the materials. It will be appreciated that air-holes provide one feature which changes the relative refractive index between materials but there may be many other materials in combination which provide a similar effect. All combinations materials which provide a required relative refractive index ratio are included as examples of materials in which the DCG, the DCM or the dispersion compensation elements may be made. Any material which is essentially transparent at 1310 nm and has a high enough refractive index contrast could be used to form the DCG, DCM or dispersion compensation elements. For different types of fiber, the zero-compensation wavelength may be different and the materials and the contrast in refractive index may be adapted accordingly.

Figures 8, 9:
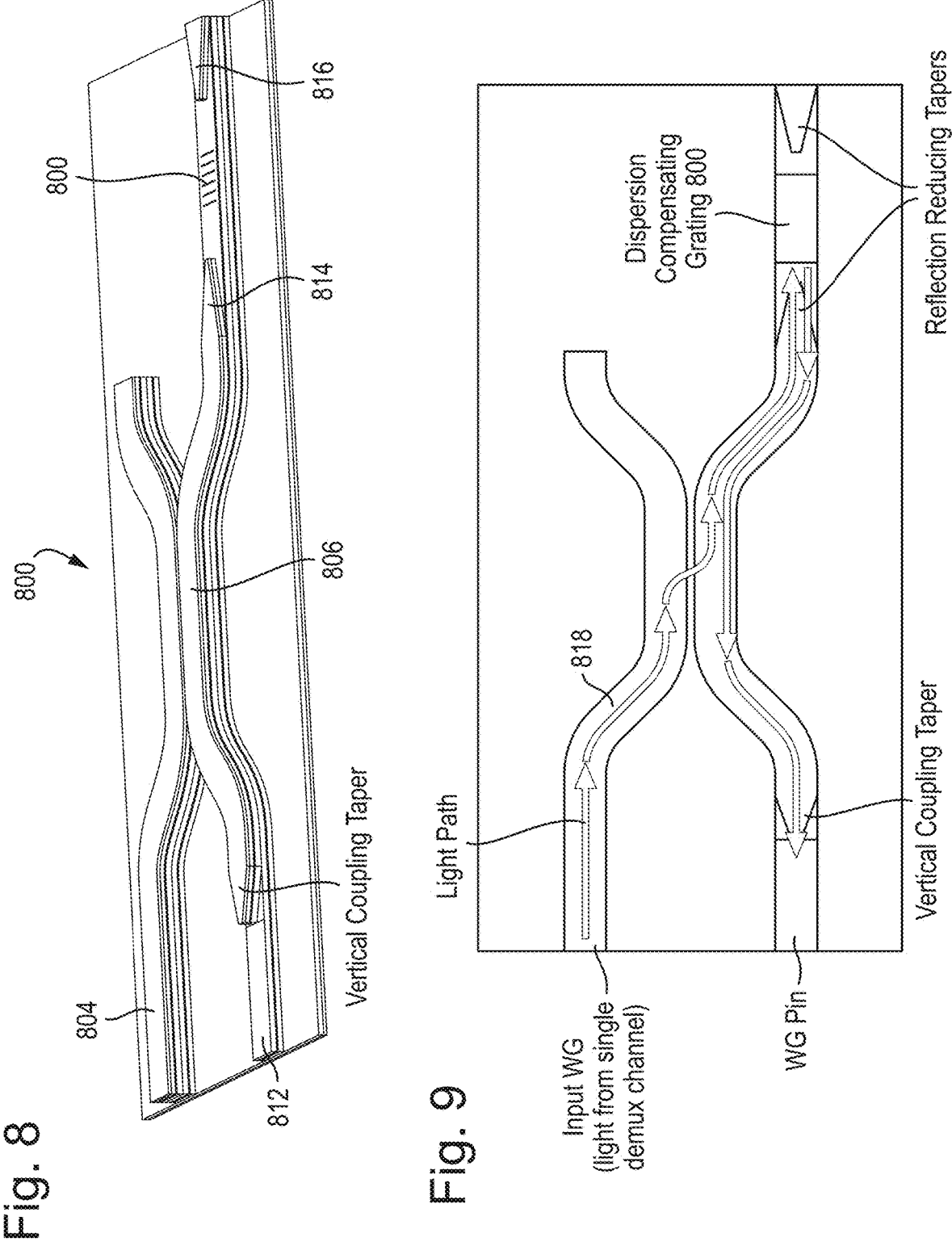
FIG. 8 shows a perspective view of a monolithic multi-device system according to an aspect of the present invention.
FIG. 9 shows a plan view of the system of FIG. 8.
Figure 10:
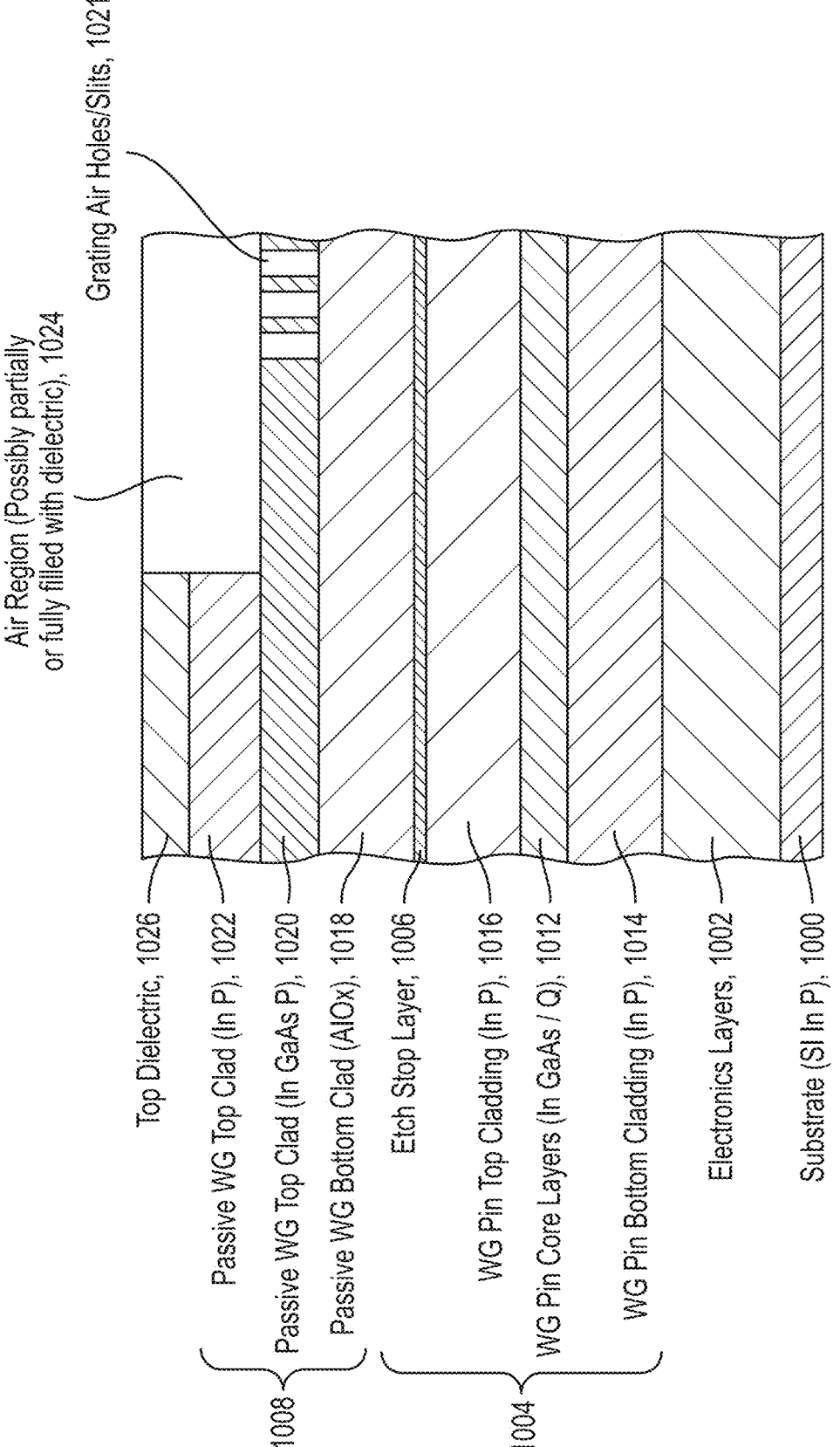
FIG. 10 shows a side view of part of the system of FIGS. 8 and 9.

FIG. 8 is similar to FIG. 5 and shows an example of an implementation of a single channel-based solution as described above with reference to FIGS. 1a and 1b and which further includes details of a possible dispersion compensation grating structure 800 for a receiver 802. In FIG. 8 to 10 the grating 800 is provided as a receiver-based Aluminum Oxide (Al₂O₃) configuration. The receiver 802 includes two closely spaced waveguides 804 and 806 which are in the form in a double serpentine shape and include respective inner edges that are substantially parallel to enable coupling from the first waveguide 804 to the second waveguide 806. The coupling is an evanescent coupling in an example. Light from a single demultiplexer channel enters the first waveguide 804 and is coupled into the second waveguide 806 and continues along the second waveguide towards grating 800. As described above, the light directed to the grating comprises multiple wavelengths of the channel 1 spectrum, configured to travel and be reflected by multiple dispersion compensation elements of the grating so that a first edge of the channel 1 light travels a different distance from the last edge of the channel 1 light. In this way the expansion of the channel spectrum from the launched spectrum caused by travelling along a fiber to the receiver is compensated for. The light is reflected back from the grating 800 along the second waveguide 806 towards a waveguide PIN (WG-PIN) photodiode (PD) 812 via a vertical taper 813. The launched spectrum is the spectrum that exists before transmission of light through a fiber between a transmitter and a receiver. The receive spectrum will include dispersion caused by the fiber and from other effects and artifacts.

The second waveguide 806 includes a number of couplers, for example a reflection reducing taper 814 between the second waveguide and the grating 800; and a tapered vertical optical coupler 816 between the second waveguide 806 and the WG-PIN 812. The reflection reducing taper 814 couples the light into and out of the grating. In the drawing a further taper is shown after the DCG, this may be used if the DCG is transmissive, and further devices are connected in series after the DCG. The tapered vertical optical coupler 816 enables vertical optical communication between horizontally distanced layers.

FIG. 9 is similar to FIG. 6 and shows a plan view of the FIG. 8 configuration and the passage of light 818 through the structure. Only one beam is shown but it will be appreciated that this is in fact a spectrum not a single wavelength and the spectrum may comprise multiple wavelengths As stated above, this is a receiver-based Aluminum Oxide (Al₂O₃) configuration of a dispersion compensating grating (DCG) 800 and the nature of the semiconductor layers in the vicinity of the DCG are shown in FIG. 10. The layers are grown on an underlying supporting semi-insulating (SI) substrate 1000 such as InP, as an example. One or more electronic component layers 1002 are formed on the substrate 1000. Layers 1004 are applied forming a WG-PIN PD and associated cladding and an etch stop material 1006 is grown. The grating structure 1008 is added followed by a top dielectric 1010.

The electronics components formed in the electronic layers 1002 can include drivers, modulators, amplifiers, TIAs, and any other non-photonic or non-optical devices. The layers 1004 comprise WG-PIN PD core layers 1012 such as InGaAs/Q and associated bottom cladding layer 1014 and top cladding layer 1016. Q means quaternary, i.e., InGaAsP or InGaAlAs for this example. Quintenary (five material based) materials may also be used. The cladding layers comprise InP in an example. The grating structure 1008 is defined by a passive WG bottom cladding such as AlOₓ 1018 formed underlying a grating layer 1020 which is formed from passive WG material such as InAlAs. The grating layer 1020 defines a plurality of air-holes or slits 1021 forming the dispersion compensation elements. In this example instead of etching and removing material to form the airbridge as above the layer is oxidized to form the dispersion compensation elements 1021. A further passive WG top cladding 1022 formed in InP in an example defines an air region 1024. The top layer shown is a top dielectric layer 1026. Other passive materials or passive waveguide materials may be used other than those described herein for any passive device.

The air region 1024 may be partially or fully filled with dielectric material and may comprise one or more or more pillars or posts of dielectric material for support and improved overall operation of the grating structure. The grating 1020 is shown as a plurality of air-holes or slits spaced apart to facilitate reflection of the composite spectrum from different dispersion compensation elements of the grating. The dispersion compensation elements, such as for example an AI-generated predetermined arrangement of dispersion compensation elements, are configured to reflect the incident light beam from the various elements of the grating in such a way as to overcome the anticipated dispersion caused by transmission through the fiber. In an example the grating may be a 1-D, 2-D or 3-D array of periodic or aperiodic air-holes 1021 or air-holes filled partially or completely by dielectric. A required relative refractive index ratio is provided by a design of the dispersion compensation elements 1021 to enable the device to give rise to the required dispersion compensation.

Figures 11, 12:
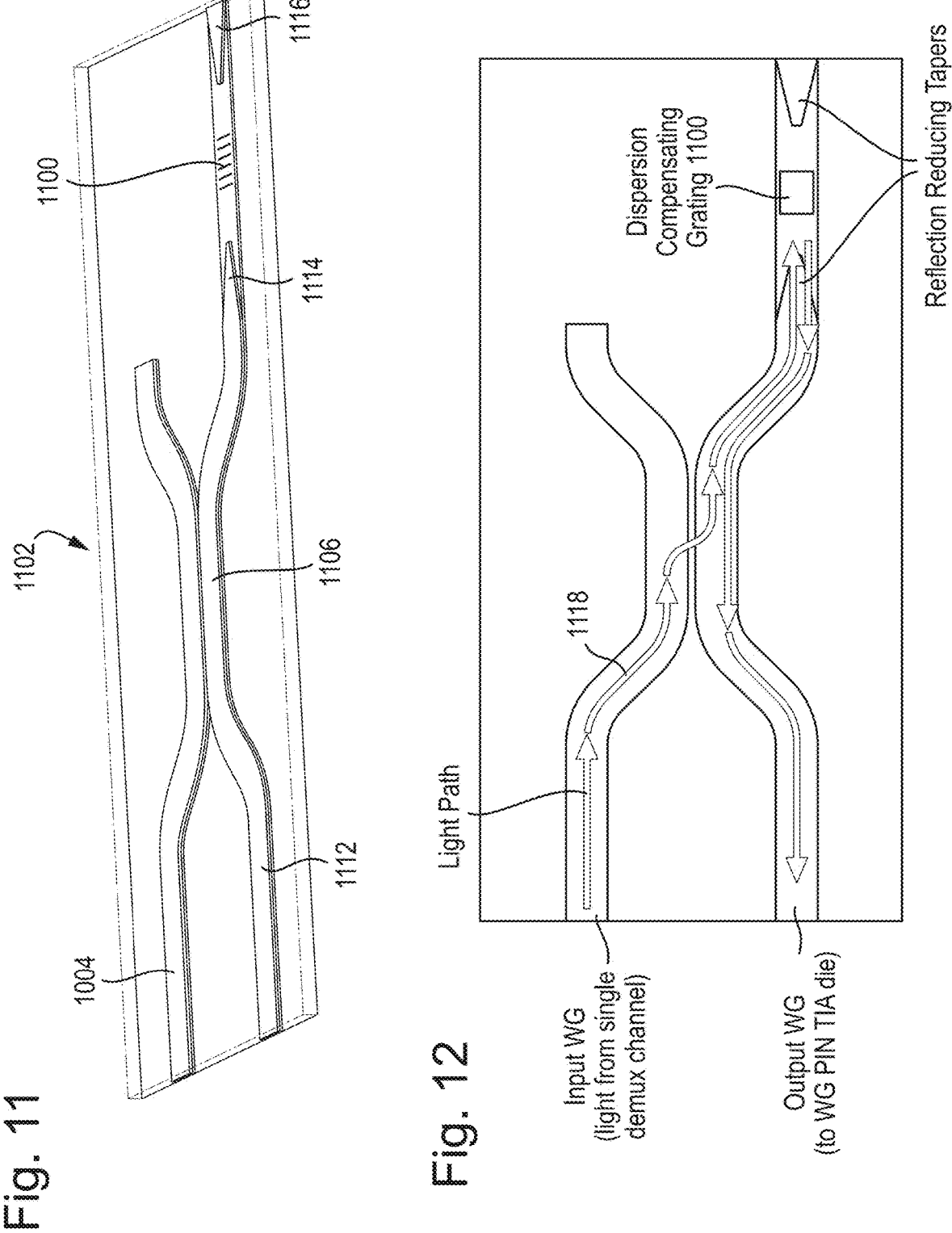
FIG. 11 shows a perspective view of a monolithic multi-tidevice system according to an aspect of the present invention.
FIG. 12 shows a plan view of the system of FIG. 11.
Figure 13:
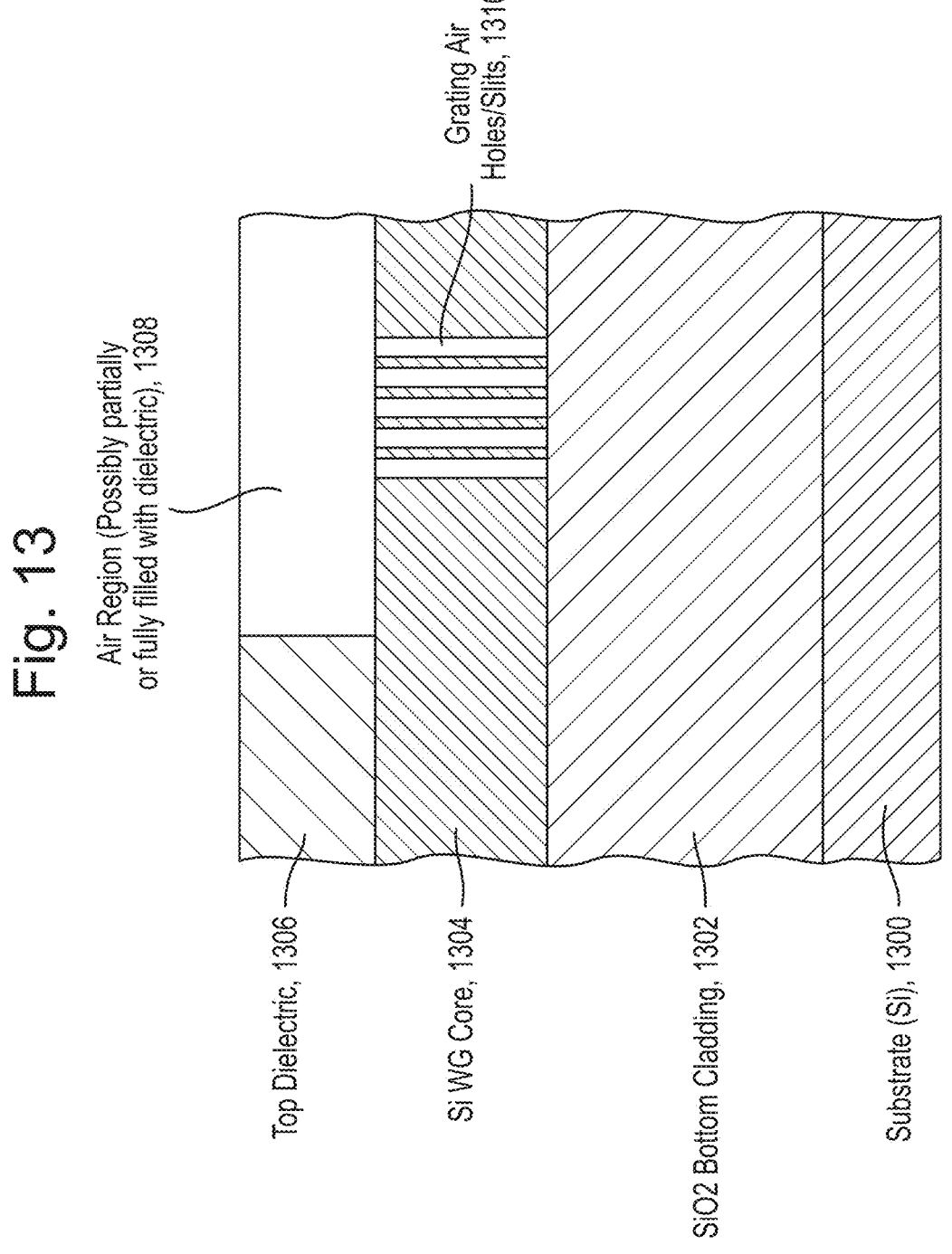
FIG. 13 shows a side view of part of the system of FIGS. 11 and 12.

FIG. 11 is similar to FIGS. 5 and 8 and shows an example of an implementation of a single channel-based solution as described above with reference to FIGS. 1 and 2 and which further includes details of a possible dispersion compensation grating structure 1100 for a receiver 1102. In FIG. 11 to 13 the grating 1100 is provided as a receiver-based hybrid InP-silicon-on-insulator (SOI) configuration that may be butt coupled to an InP die with WG PIN of an associated electro-photonics device. The receiver 1102 includes two closely spaced waveguides 1104 and 1106 that are in the form in a double serpentine shape and include respective inner edges that are substantially parallel to enable coupling from the first waveguide 1104 to the second waveguide 1106. The coupling is an evanescent coupling in an example. Light from a single demultiplexer channel enters the first waveguide 1104 and is coupled into the second waveguide 1106 and continues along the second waveguide towards grating 1100. As described above, the light directed to the grating comprises multiple wavelengths of the channel 1 spectrum, configured to travel and be reflected by multiple dispersion compensation elements of the grating so that a first edge of the channel 1 light travels a different distance from the last edge of the channel 1 light. In this way the expansion of the channel spectrum from the launched spectrum caused by travelling along a fiber to the receiver is compensated for. The launched spectrum is the spectrum that exists before transmission of light through a fiber between a transmitter and a receiver. The light is reflected back from the grating 1100 along the second waveguide 1106 towards a waveguide PIN (WG-PIN) photodiode (PD) (not shown) which forms part of an associated electro-photonics device.

The second waveguide 1106 includes a number of couplers, for example a reflection reducing taper 1114 between the second waveguide and the grating 1100; and a butt coupler (not shown) between the second waveguide 1106 and the WG-PIN 1112. The reflection reducing taper 1114 couples the light into and out of the grating. The butt coupler enables the juxtaposition of an SOI die and InP die so that light can be directed from an SOI grating to an electro-photonic device.

FIG. 12 is similar to FIGS. 6 and 9 and shows a plan view of the FIG. 11 configuration and the passage of light 1118 through the structure. Only one beam is shown but it will be appreciated that this is in fact a spectrum not a single wavelength and the spectrum may comprise both multiple wavelengths. The launched spectrum is the spectrum that exists before transmission of light through a fiber between a transmitter and a receiver.

As stated above, this is a receiver-based hybrid InP-silicon-on-insulator (SOI) configuration that may be butt coupled to an InP die with WG PIN of an associated electro-photonics device. The SOI-based configuration of a dispersion compensating grating (DCG) 1100 and the nature of the semiconductor layers in the vicinity of the DCG are shown in FIG. 13. The layers are grown on an underlying supporting Silicon on Insulator (SOI) substrate 1300 such as a silicon (Si) substrate and layer of $SiO_2$, as an example. The layer of $SiO_2$ forms a bottom cladding 1302 underlying a Si waveguide core grating layer 1304 and including a top dielectric layer 1306 above the grating 1304. An air region 1308 may be defined by the top dielectric layer over the grating. The grating may define a plurality of air-holes or slits 1310 which are configured to reflect the incident light beam from the various elements of the grating in such a way as to overcome the anticipated dispersion caused by transmission through the fiber. In an example the grating may be a 1-D, 2-D or 3-D array of periodic or aperiodic air holes which may be completely or partially filled with dielectric. Different materials may be used instead of those described as long as relative refractive index ratio for the dispersion compensation elements is maintained or enhanced. The materials will generally comprise silicon-based materials or materials compatible therewith.

The air region 1308 may be partially or fully filled with dielectric material, such as for example, $SiO_2$ Benzo-cy-clobutene (BCB), SiNx etc. In addition, the air region may comprise one or more or more pillars or posts of dielectric material for support and improved overall operation of the grating structure.

FIGS. 5 to 13 are examples relating to a single channel receiver. The grating structure in each example may be repeated multiple times for multiple channels. FIGS. 14 to 18 show some high-level examples of multi-channel arrangements for any example of the grating structures shown above. In examples this arrangement includes a parallel arrangement in which multiple DCGs are provided one for each channel. In this arrangement the DCG may be a reflective DCG. In this case the grating may comprise a transmission-based grating. In a further alternative there may be one "super" grating for all channels including a specific arrangement of dispersion compensation elements, such as for example an AI-generated predetermined arrangement of dispersion compensation elements, configured to mitigate or overcome the expected dispersion in any or all channels. The super grating may be a reflection grating or a transmission grating.

It will be appreciated that the DCG in FIGS. 5 to 18 may be a DCM as shown elsewhere and there may be multiple DCMs each having a different matrix of dispersion compensation elements, one for each channel or one for more than one channel as the case may be. The DCM may also include a demultiplexer or multiplexer formed with the DCM or as a separate component. The demultiplexer or the multiplexer may form part of a single component comprising a combination of DCM and demultiplexer or multiplexer. The combination of DCM and demultiplexer or multiplexer may form part of a larger monolithic chip including other components or form a chip including the combination and other devices as required for a given use case.

Whilst not shown in detail, similar arrangements of components as shown in FIGS. 5 to 18 can be adapted to form transmitter devices which EAM drivers and EAM devices rather than TIAs and WP-PIN devices as shown. The transmitter arrangements can be made using similar materials and the DCG or DCM as described in each of the receiver arrangements can be formed for a transmitter having AI-generated predetermined arrangement of dispersion compensation elements.

The alternatives in FIGS. 14 to 18 relate to both receiver configurations and transmitter configurations and each case include combinations of photoelectric devices as will be understood by the skilled person and described elsewhere in this application. The combinations may be formed as a single monolithic chip or a number of combinations of devices may reside on different chips. The devices and combinations have no limits apart from the practical limitations of combining the devices in a workable and practical combination. Where there are multiple chips forming the combination of devices appropriate coupling will be required for all optical communication and appropriate connections for any electrical communications. Examples are described elsewhere.

Figures 14, 15:
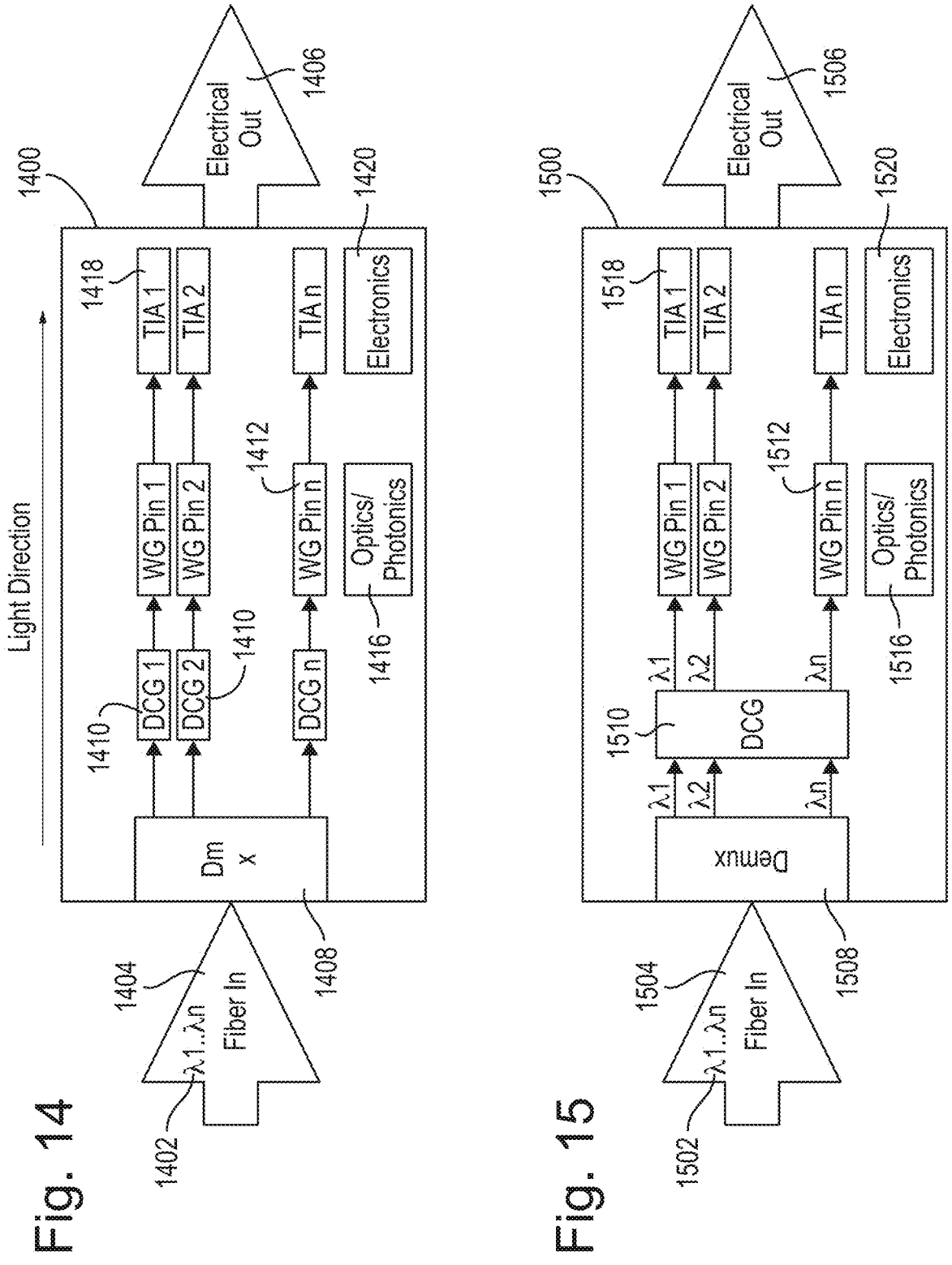
FIG. 14 is a schematic view of a receiver according to an aspect of the present invention.
FIG. 15 is a schematic view of a receiver according to an aspect of the present invention.

FIG. 14 shows a single chip monolithic receiver 1400 configured to receive an optical signal 1402 via a fiber in 1404 and to output an electrical output 1406. The optical signal 1402 comprises wavelengths $\lambda_1$ to $\lambda_n$ and is received from a transmitter (not shown). The received optical signal is first passed through a demultiplexer 1408 to generate channels centered on individual wavelength outputs $\lambda_1$, $\lambda_2$, $\lambda_a$ which are then passed through an array of dispersion compensation elements 1410 forming a DCG or a DCM. In this case there is a grating for each channel. Each channel passes from the demultiplexer 1408 to the dispersion compensation elements 1410 and then through an array of waveguide photodiodes such as PIN photodiodes ($WG-PIN_1$ to $WG-PIN_n$) 1412. As stated above for a zero-dispersion wavelength ($\lambda 0$) there is no need for a DCM and a through beam may pass from the demultiplexer to one of the WG-PINs.

The array of dispersion compensation elements 1410 may comprise one or more of a DCG or DCM, as previously described. Whatever the combination of grating structures they are designed to mitigate or overcome the effects of dispersion along the fiber between the transmitter (not shown) and the receiver 1400. Each of the array dispersion compensation elements will provide a different amount of dispersion compensation to the various wavelength making up the spectrum. As each channel is centered at a different wavelength and is this susceptible to different dispersion, the distances travelled by the composite wavelengths of each channel are each different. Each of the array dispersion compensation elements will provide a different amount of dispersion compensation to the various wavelength making up the spectrum. Thus, the DCM produces an output that substantially replicates the launched spectrum with the effects of dispersion removed. The output from the DCM is clear of dispersion and thus the wavelengths that enter the WG-pin PD devices are as launched by the transmitter despite the effect of dispersion through the fiber. In order to not to be too large the DCM is designed based on an AI-based inverse design in which each dispersion compensation elements of the grating or gratings provides a bespoke path for the outer edge wavelengths of each channel. There may be a chain or sequence of DCGs or DCMs per channel in which case each part of the chain or sequence would be considered as a DCG or DCM. In an alternative, a combination of either a demultiplexer or a multiplexer may be combined in a chain or sequence with the DCG or DCM as is described in greater details with reference to FIGS. 18a and 18b, as an example.

Subject to material consideration mentioned below the grating structures used in FIG. 14 can include any suggested grating structure described herein and where appropriate a combination of grating structures that conform to the fabrication requirements mentioned elsewhere in this application.

In an aspect of the invention, there are the same number of WG-pin PD devices (n) as channels (n) generated through the demultiplexer. In an aspect of the invention the demultiplexer may be an 8-channel demultiplexer or a 16 channel demultiplexer. If the demultiplexer is a 16-channel demultiplexer, there will be 16 waveguides and 16 WG-pin PDs. The Demultiplexer is a passive optical device.

The WG-pin PDs include an electrical contact or other optical or photonic control electronics 1416. Photocurrent from each wavelength $\lambda_1$, $\lambda_2$, $\lambda_n$ is passed to an array of transimpedance amplifiers (TIA) 1418 and output as multiple electrical steams 1406. The TIAs include control and driver circuits and any other necessary electronic components, 1420. In an aspect of the invention, each WG-pin PD is paired with a specific TIA and the array of WG-pin PDs is the same magnitude as the array of TIAs, in an aspect there are eight of each, but other numbers can be envisaged depending on the size of the demultiplexer and other factors. There may be an N-to-N relationship between the number of channels, the number of TIAs and/or the number of WG-pin PDs. This one-to-one relationship is important at high frequencies as there is a reduced delay in generating the overall output. In situations where high frequency throughput is less important, a one-on-one relationship between a WG-pin PD and a TIA may not be needed and a time division multiplexing of inputs to TIAs for a pair or other multiple of WG-pin PDs may be envisaged.

The wavelengths bands of the channels mentioned in FIG. 14 comprise a plurality of wavelengths selected from e.g. O-band, L-band, C-band. As described above, dispersion is removed prior to conversion from the optical to electrical domain via the WG-pin PD and the TIA pairs in one example.

It will be appreciated that the array of WG-pin PDs may share optical or photonic control electronics 1416 and the array of TIAs may share electronic components 1420. This means that the control circuitry for each array can be reduced in size relative to the case where each WG-pin PD includes control circuitry, and each TIA includes control electronics. This can make a distinct difference to the overall size of the monolithic receiver chip 1400 on which the receiver is built. Similarly, the same scaling can occur in an equivalent transmitter-based circuit as further described below. The circuits controlling the different devices may also be shared if there are common functionalities being carried out by each component part of the receiver or transmitter. An example might be processing which is common for all components.

In order to work at high frequencies and ensure the size is a minimum the demultiplexer and DCG configurations are designed based on an AI-based inverse design as described in greater detail below. The input to the demultiplexer is presented via an optical fiber and the output from the demultiplexer comprises the composite wavelengths having dispersion which is removed via the DCG prior to being passed to respective ones of the WG-pin PDs and then to the TIAs.

The device 1400 may have a structure in which the demultiplexer, the dispersion compensation elements and WG-pin PDs are parallel to the underlying supporting semi-insulating substrate. "Fiber in" to demultiplexer to WG-pin PD is in the same direction or plane (X, Y) of propagation of the optical beam and provides a unique optical demultiplexer into WG-pin PD monolithic design. As a result, the overall device size in a direction Z (up and down into the figure) is only limited by the size of the TIA dimensions. The main factor relating to the size of the TIA is based on the necessary control and driver circuitry and as a result any possibility to avoid duplication in respect of this circuitry has advantages in terms of the overall dimensions of the receiver or transmitter. As stated elsewhere, the dimension can be reduced further by sharing the electronic control and driver components between TIAs and between different components.

In some configurations some of the composite devices may be formed as a monolithic single chip where all devices are made in materials which can be fabricated in a single device. This includes type III-V semiconductor materials such as Indium phosphide (InP)-based materials system comprising binary, ternary, quaternary and other compositions of In, Ga, As, P, Al and Sb. In other configurations, for example using the $SiO_2$ grating structure described above, the grating may be configured to on an interposer and connected to InP-based photoelectric devices via the interposer.

A consequence of "Fiber in" to demultiplexer to grating to WG-pin PD is in the same direction or plane is that the dimensions of the grating and demultiplexer can be minimized as compared to a surface illuminated demultiplexer as has been used in alternative concepts. Surface illumination requires a relatively large device to ensure adequate capture of the light. By compression "fiber in" via a cable is already compacted into a relatively small diameter and thus requires a smaller input window for the demultiplexer than surface illumination requires.

In an alternative design a three-dimensional demultiplexer may be used, in which fiber in is vertically split into vertically stacked WG-pin PDs. The wavelengths are separated over more than one plane which may reduce the amount of space taken up by the WG-pin PDs. Similarly, the TIAs may be stacked providing more space saving possibilities.

FIG. 15 shows another configuration of receiver 1500 which is arranged to receive an optical signal 1502 via a fiber in 1504 and to output an electrical output 1506. The optical signal 1502 comprises wavelengths $\lambda_1$ to $\lambda_n$ and is received from a transmitter (not shown). The received optical signal is first passed through a demultiplexer 1508 to generate channels centered on individual wavelength outputs $\lambda_1$, $\lambda_2$, $\lambda_n$ which are then passed through an array of dispersion compensation elements for example, a DCG or DCM 1510. In this case there is a grating that is shown as a single component and may be arranged in such a way as to provide a predetermined dispersion compensation for each channel. Each channel passes from the demultiplexer 1508 to the array of dispersion compensation elements 1510 and then through an array of waveguide photodiodes such as PIN photodiodes (WG-PIN$_1$ to WG-PIN$_n$) 1512. The combination of demultiplexer and array of dispersion compensation elements, such as for example an AI-generated predetermined arrangement of dispersion compensation elements, may be monolithic, built on an interposer of a different material from other components, elements arrange in series or any other type of grating structure having the necessary dispersion compensation capabilities.

The WG-pin PDs include an electrical contact or other optical or photonic control electronics 1516. Photocurrent from each wavelength $\lambda_1$, $\lambda_2$, $\lambda_n$ is passed to an array of transimpedance amplifiers (TIA) 1518 and output as multiple electrical steams 1506. The TIAs include control and driver circuits and any other necessary electronic components, 1520. In an aspect of the invention, each WG-pin PD is paired with a specific TIA and the array of WG-pin PDs is the same magnitude as the array of TIAs, in an aspect there are eight of each, but other numbers can be envisaged depending on the size of the demultiplexer and other factors. There may be an N-to-N relationship between the number of channels, the number of TIAs and/or the number of WG-pin PDs. This one-to-one relationship is important at high frequencies as there is a reduced delay in generating the overall output. In situations where high frequency throughput is less important, a one-on-one relationship between a WG-pin PD and a TIA may not be needed and a time division multiplexing of inputs to TIAs for a pair or other multiple of WG-pin PDs may be envisaged.

The wavelengths bands of the channels comprise a plurality of wavelengths selected from e.g. O-band, L-band, C-band. As described above, dispersion is removed prior to conversion from the optical to electrical domain via the WG-pin PD and the TIA pairs in one example.

It will be appreciated that the array of WG-pin PDs may share optical or photonic control electronics 1516 and the array of TIAs may share electronic components 1520. This means that the control circuitry for each array can be reduced in size relative to the case where each WG-pin PD includes control circuitry, and each TIA includes control electronics. This can make a distinct difference to the overall size of the monolithic receiver chip 1500 on which the receiver is built. Similarly, the same scaling can occur in an equivalent transmitter-based circuit as further described below. The circuits controlling the different devices may also be shared if there are common functionalities being carried out by each component part of the receiver or transmitter. An example might be processing which is common for all components.

Figures 16, 17:
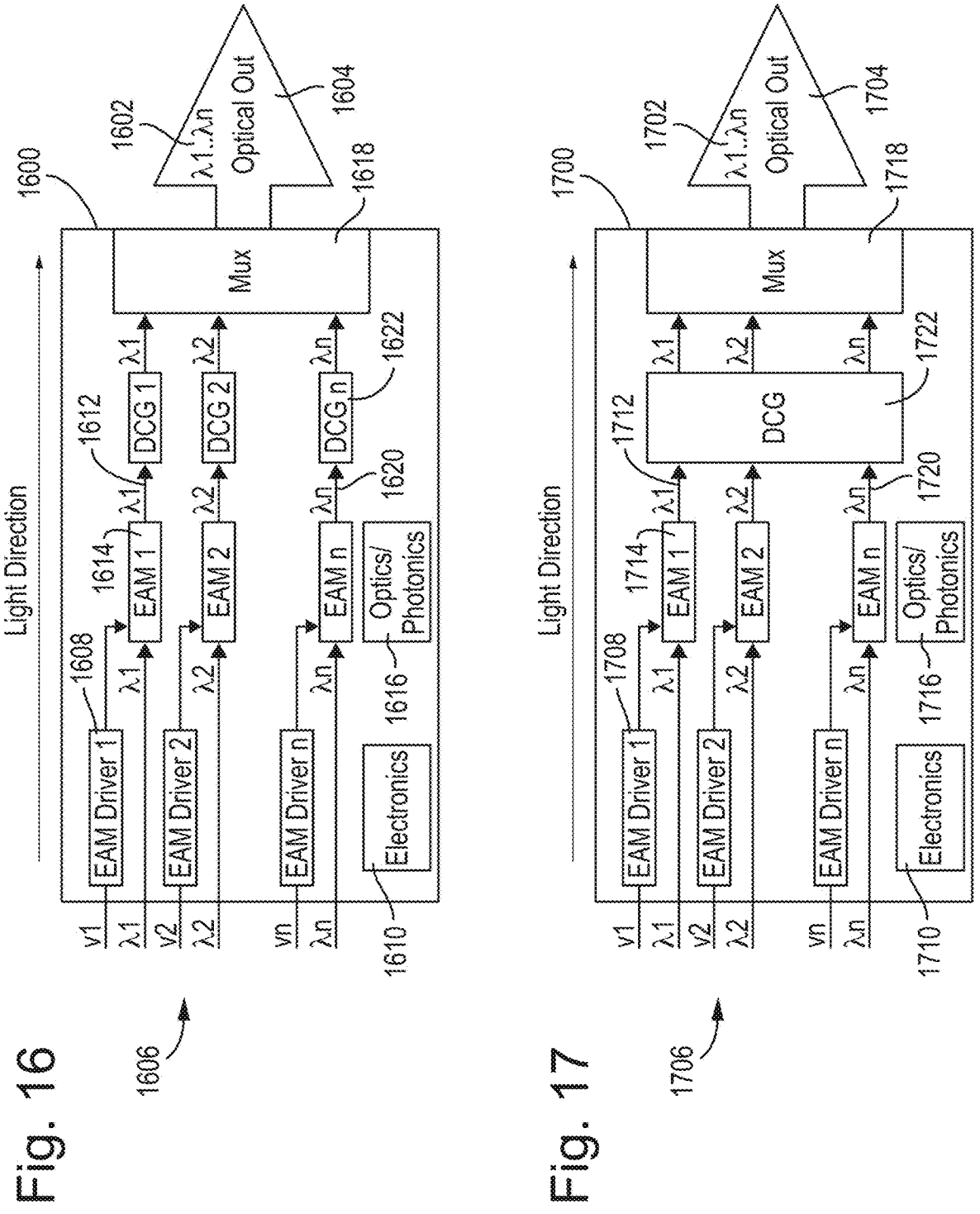
FIG. 16 is a schematic view of a transmitter according to an aspect of the present invention.
FIG. 17 is a schematic view of a transmitter according to an aspect of the present invention.

FIG. 16 shows a monolithically integrated transmitter 1600 which is configured to generate an optical signal 1602, comprising a plurality of wavelengths, via a fiber out 1604, intended to be transmitted, for example, to one or more receivers (not shown in FIG. 16; 1500 in FIG. 15. The monolithically integrated transmitter 1600 is fabricated on an underlying supporting semi-insulating substrate such as InP, as an example. An electric/laser inputs 1606 is input to an array of electro-absorption modulator (EAM) drivers 1608. Each EAM driver provides a driving signal to respective ones of a plurality of EAMs 1614. Each EAM may emit one of a plurality of optical or near optical wavelengths or wavelength spectra, e.g. wavelengths selected from the O-band, L-band and C-band, as mentioned above. It is noted that the precise wavelengths may depend on the materials and may vary based on the materials used for fabrication of the EAMs.

In FIG. 16 multiple EAM drivers 1608 are shown but this is not intended to be a limitation, and other numbers of EAM drivers may be used including just one. Each EAM driver may drive more than one EAM. The or each EAM is configured to output one or more of a plurality of wavelengths $\lambda_1$, $\lambda_2$, $\lambda_n$ 1612. The EAMs include optical and/or photonic electronics 1616 to provide control functionalities. There may be a one-to one relationship between each of the plurality of wavelengths, the EAM drivers and the EAMs. There may be a different number of EAM drivers to EAMs in cases where lower speeds of operation are tolerable. As stated elsewhere electronic resources 1610 may be shared between multiple ones of the EAM drivers thereby reducing the footprint of the chip. In order to avoid optical switching, there is normally a 1 to 1 relationship between the number of EAMs and the number of DCGs or DCMs. The plurality of wavelengths 1612 are passed through an array of dispersion compensation elements such as DCGs 1622 before being combined through a multiplexer 1618 to generate the optical out signal 1602 comprising $\lambda_1$, to $\lambda_n$ in a single stream for onward transmission to the receiver via an appropriate network. For the avoidance of doubt, for a zero-dispersion wavelength (O) there is no need for a DCM and a through beam may pass from one of the EAMs to the multiplexer.

There are electrical connections between the electrical input 1606 and each of the EAM drivers 1608. There are optical connections between e.g. passive waveguide materials 1620 between the EAMs 1614, the array of dispersion compensation elements, such as for example an AI-generated predetermined arrangement of dispersion compensation elements, 1622 and the multiplexer 1618. There may be an N-to-N relationship between the EAM drivers and the EAMs; with the EAMs and number of elements in the array of dispersion compensation elements; and with the EAMs and the number of channels in the multiplexer.

Where possible electronics used for active devices may be shared. Passive devices such as the array of dispersion compensation elements, the demultiplexer, the multiplexer and passive waveguides need no such electronics.

The array of dispersion compensation elements 1622, such as for example an AI-generated predetermined arrangement of dispersion compensation elements, may comprise one or more of a DCG or a DCM, as previously described. Whatever the combination of grating elements or structures they are designed to mitigate or overcome the effects of dispersion along the fiber between the transmitter 1600 and the receiver (not shown). Each of the array dispersion compensation elements will provide a different amount of dispersion compensation to the various wavelength making up the spectrum. As each channel is centered at a different wavelength and is thus susceptible to different dispersion, the distances travelled by the composite wavelengths of each channel are each different. The effect of the different paths through the DCG produces an output that substantially replicates the launched spectrum with the effects of dispersion removed. through the fiber. In order not to be too large the grating is designed based on an AI-based inverse design. Subject to material consideration mentioned below, the grating structures used in FIG. 16 can include any suggested grating structure described herein and where appropriate a combination of grating structures conform to the fabrication requirements mentioned elsewhere in this application. In some configurations some of the composite devices may be formed as a monolithic single chip where all devices are made in materials which can be fabricated in a single device. This includes type III-V semiconductor materials such as Indium phosphide (InP)-based materials system comprising binary, ternary, quaternary and other compositions of In, Ga, As, P, Al and Sb. In other configurations, for example using the $SiO_2$ grating structure described above, the grating may be configured to on an interposer and connected to InP-based photoelectric devices via the interposer.

The device 1600 has a structure in which the array of dispersion compensation elements, multiplexer and EAM drivers are in the plane parallel to the underlying supporting semi insulated substrate, The light propagation from EAM to array of dispersion compensation elements, such as for example an AI-generated predetermined arrangement of dispersion compensation elements, to multiplexer to fiber out is in the same direction or plane (X, Y) of propagation of the input optical beam and provides a unique optical EAM multiplexer monolithic design. As a result, the overall device size in a direction Z (up and down into the figure) is only limited by the size of the EAM driver dimensions. The main factor relating to the size of the EAM drivers is based on the necessary control and driver circuitry and as a result any possibility to avoid duplication in respect of this circuitry has advantages in terms of the overall dimensions of the receiver or transmitter. As stated elsewhere, the dimension can be reduced further by sharing the electronic control and driver components between EAMs and between different components.

As stated above, the multiplexer is similarly based on an AI-based inverse design process having as inputs a definition of the required optical response of the multiplexer which is passed through a model trained on multiplexers and their respective optical requirements including the material from which they are made.

FIG. 17 shows an integrated transmitter 1700 which is configured to generate an optical signal 1702, comprising a plurality of wavelengths, via a fiber out 1704, intended to be transmitted, for example, to one or more receivers (not shown in FIG. 17; 1400 in FIG. 14 or 1500 in FIG. 15. The integrated transmitter 1700 may be fabricated on an underlying supporting semi-insulating substrate such as InP, as an example, or some components may be on one type of material whilst others are formed on another type of material. An electric/laser input 1706 is input to an array of electro-absorption modulator (EAM) drivers 1708. Each EAM driver provides a driving signal to respective ones of a plurality of EAMs 1714. Each EAM may emit one of a plurality of optical or near optical wavelengths or wavelength spectra, e.g. wavelengths selected from the O-band, L-band and C-band, as mentioned above. It is noted that the precise wavelengths may depend on the materials and may vary based on the materials used for fabrication of the EAMs.

In FIG. 17 multiple EAM drivers 1708 are shown but this is not intended to be a limitation, and other numbers of EAM drivers may be used including just one. Each EAM driver may drive more than one EAM. The or each EAM is configured to output one or more of a plurality of wavelengths $\lambda_1$, $\lambda_2$, $\lambda_n$ 1712. The EAMs include optical and/or photonic electronics 1716 to provide control functionalities. There may be a one-to one relationship between each of the plurality of wavelengths, the EAM drivers and the EAMs. There may be a different number of EAM drivers to EAMs in cases where lower speeds of operation are tolerable. As stated elsewhere electronic resources 1710 may be shared between multiple ones of the EAM drivers thereby reducing the footprint of the chip.

The plurality of wavelengths 1712 are passed through an array of dispersion compensation elements such as DCGs or DCMs 1722 before being combined through a multiplexer 1718 to generate the optical out signal 1702 comprising $\lambda_1$, to $\lambda_n$ in a single stream for onward transmission to the receiver via an appropriate network. In some configurations some of the composite devices may be formed as a monolithic single chip where all devices are made in materials which can be fabricated in a single device. This includes type III-V semiconductor materials such as Indium phosphide (InP)-based materials system comprising binary, ternary, quaternary, quintenary and other compositions of In, Ga, As, P, Al and Sb. In other configurations, for example using the $SiO_2$ grating structure described above, the grating may be configured to on an interposer and connected to InP-based photoelectric devices via the interposer.

A number of components are difficult to design and fabricate in order that they have the capabilities to operate in the high-speed, high-bandwidth environment of today and tomorrow. These components include, but are not limited to, DCGs, DCMs, multiplexers and demultiplexers. The present invention addresses at least some of the problems associated with high-speed operation and the devices required therefor by using an AI-based inverse design process.

In one example scheme as shown in FIGS. 11 to 13 some of the devices may be formed on a silicon- (Si-) based chip and other devices may be formed in another materials, for example InP-based materials. In examples where there are devices of different materials coupling is not a trivial issue. Ensuring devices of different materials are accurately optically aligned is a complex problem for which a solution is still being sought. In some aspects of the invention some or all of the passive devices such as DCG, multiplexers, demultiplexers and couplers may be Si-based and other electro-optical components and active devices may be InP-based.

In some aspects of the invention, it is further envisioned that the function of the multiplexer and demultiplexer can be accomplished by different devices or designs to achieved the required function. For example, a demultiplexer may be replaced by a an AI-designed drop filtering function combined with a cascading stages of DCG or DCM devices as described with respect to FIG. 18a. The AI-designed drop filter is of a similar structure to the DCM. Further the multiplexer functionality can be accomplished by an adder in combination with the DCG or DCM as described in FIG. 18b. In more general terms the combination of the functions of compensation for dispersion and the combination or separation of respective multiplexing and demultiplexing functions are the inputs to a design for a combined device to an AI-inverse design process. This input gives a design for a device which has a combination of functions or multiple devices each having a separate function which combine to have the same overall requirement as dictated by the required inputs and outputs of the AI-inverse design process.

Figure 18A:
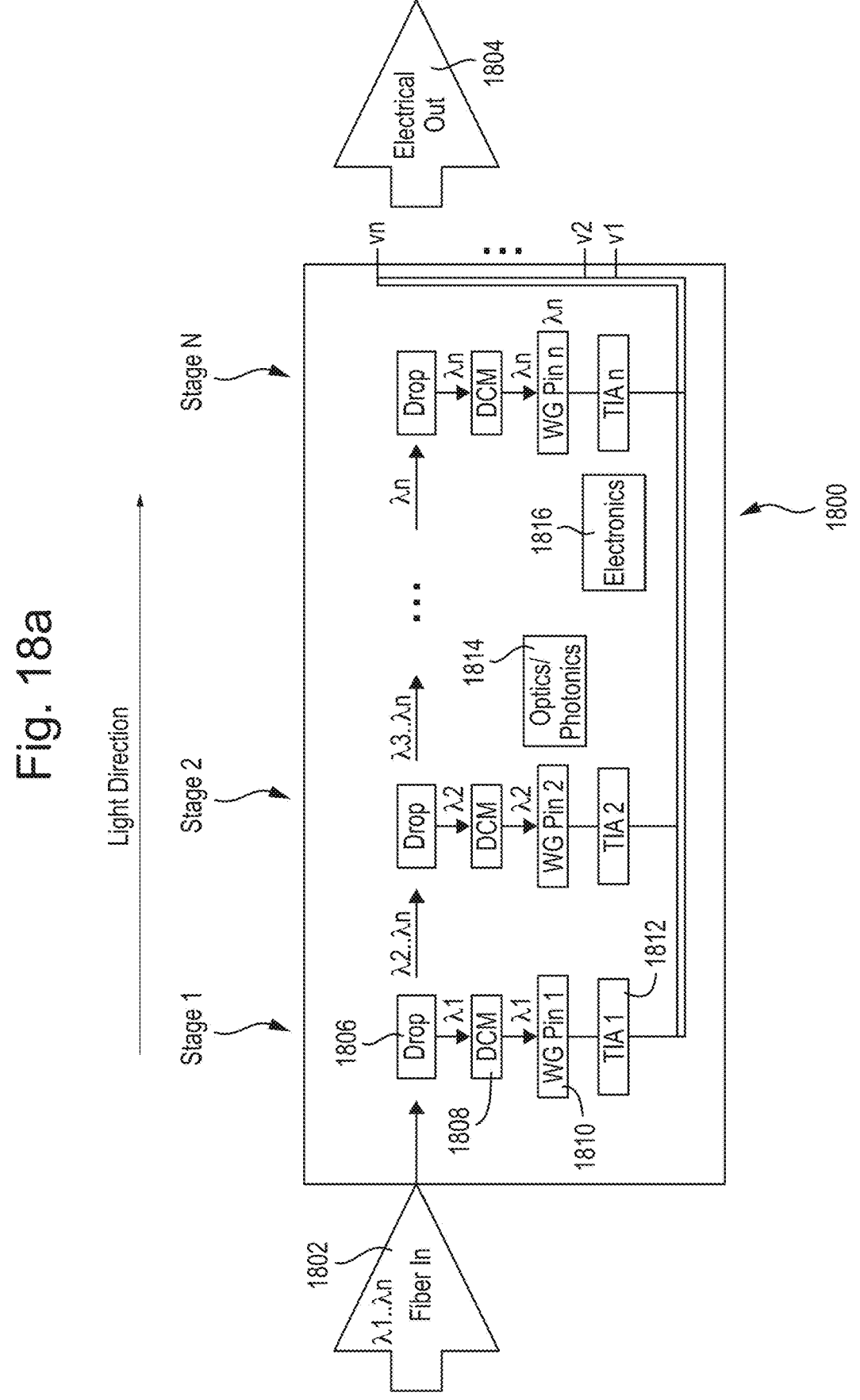
FIG. 18*a* is a schematic view of a receiver according to an aspect of the present invention.

FIG. 18a is an alternative arrangement for a combined receiver 1800 for converting light in 1802 to electric out 1804 in a photonic device. The receiver comprises a cascaded or dependent process in which a function is dependent on or cascades in stages from a previous function. The previous function may be a similar function to the function in which one or more parameters is different. For example, the first stage function may relate to a first wavelength and a second may relate to the same function but at a different wavelength.

As shown in FIG. 18a the receiver includes a light signal in comprising channels having a central wavelength of $\lambda_1$ to $\lambda_N$. The central wavelengths are the central spectral wavelengths of respective channels 1 to N. The light has arrived at the receiver after passage through a fiber which has produced dispersion due to transmission as described elsewhere. The dispersion is different for different wavelengths.

The arrangement in FIG. 18a is seeking to remove the effect of dispersion caused by the transmission of light through the fiber for each channel and return the spectrum for each channel to equate to the as launched spectrum. In a first stage (for $\lambda_1$) the composite light passes through an AI-designed drop filter 1806 centered at $\lambda_1$. This allows wavelengths $\lambda_2$ to $\lambda_N$ to pass through to the subsequent stages and $\lambda_1$ to be "dropped" through the filter to a DCG or DCM 1808₁. The DCG or DCM may comprise a transmissive, diffractive or reflective elements as described elsewhere. The DCG or DCM produces an output centered on ki and having a spectrum that is substantially the same as the launched spectrum for that channel or wavelength.

From the DCG or DCM the output $\lambda_1$ passes through a WG-PIN 1810₁ and then a TIA 1812₁. The output is a voltage $v_1$ which is combined with other stage outputs to form the composite signal out 1804. The receiver may comprise additional components such as electronics for controlling the photonic 1814 and electronic 1816 components. The receiver may comprise a single monolithic chip or include multiple chips coupled as described elsewhere.

The AI-designed drop filters arranged in series with one another essentially provide a function similar to a demultiplexer in that the individual wavelengths of different channels are separated from one another so that each can be treated in a different way through the DCG or DCM to negate the effects of the induced transmission dispersion. Other manners of separating out the channels can also be envisaged.

The light signal from channels $\lambda_2$ to $\lambda_N$ continue to a second stage (for $\lambda_2$) of the arrangement. At the second stage a second drop filter the composite light passes through a drop filter 1806 centered at $\lambda_2$. This allows wavelengths $\lambda_3$ to $\lambda_N$ to pass through to the subsequent stages and $\lambda_2$ to be "dropped" through the filter to a DCG or DCM 1808₂. The DCG or DCM may comprise a transmissive, diffractive or reflective elements as described elsewhere. The DCG or DCM produces an output centered on $\lambda_2$ and having a spectrum that is substantially the same as the launched spectrum for that channel or wavelength.

The DCG or DCM produces an output centered on $\lambda_2$ and having a spectrum that is substantially the same as the launched spectrum for that channel or wavelength. From the DCG or DCM the output $\lambda_2$ passes through a WG-PIN 1810₂ and then a TIA 1812₂. The output is a voltage $v_2$ which is combined with other stage outputs to form the composite signal out 1804. The receiver may comprise additional components such as electronics for controlling the photonic 1814 and electronic 1816 components. The receiver may comprise a single monolithic chip or include multiple chips coupled as described elsewhere.

This continues until all wavelength in the composite light signal are handled as described above for $\lambda_1$ and $\lambda_2$. In the example shown N can be any number including 2, 4, 8, 16, 32, etc. The arrangement in FIG. 18a is shown is a simplified representation for the purposes of describing the functionality and the precise positions of elements relative to one another may be any combination as required for the use case of the design.

Figure 18B:
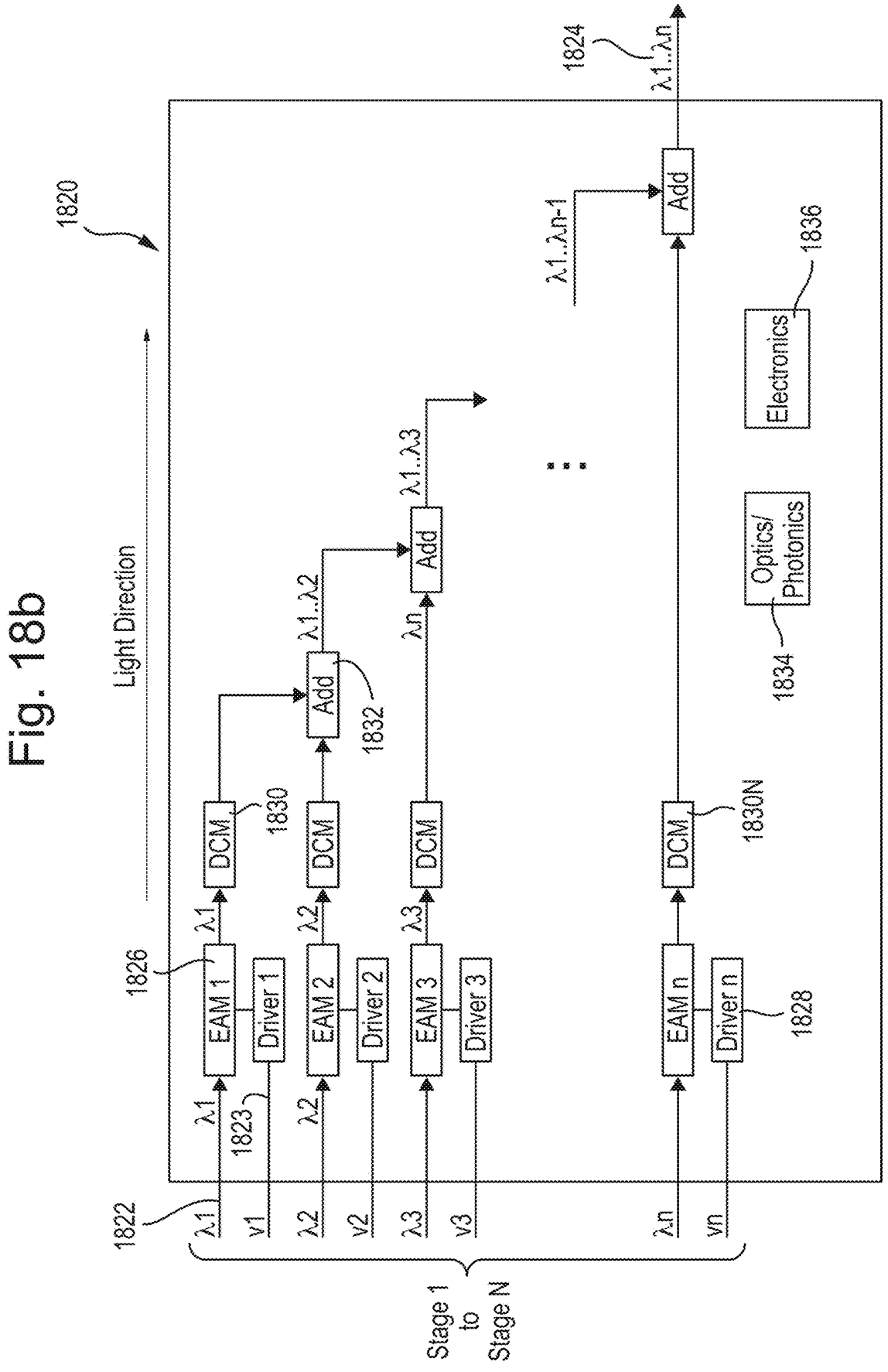
FIG. 18*b* is a schematic view of a transmitter according to an aspect of the present invention.

FIG. 18b shows an arrangement for a combined transmitter 1820 which is similar and related to the arrangement of the receiver of FIG. 18a for converting light in 1822 from a laser source driven by a voltage 1823 to generate a combined transmission signal out 1824 in a photonic device. The transmitter comprises a cascaded or dependent process in which a function is dependent on or cascades in stages from a previous function. The previous function may be a similar function to the function in which one or more parameters is different. For example, the first stage function may relate to a first wavelength and a second may relate to the same function but at a different wavelength.

As shown in FIG. 18b the transmitter 1820 generates a composite light signal out comprising channels having a central wavelength of $\lambda_1$ to $\lambda_N$. The central wavelengths are the central spectral wavelengths of respective channels 1 to N. The light is intended to travel to a receiver through a fiber which will produce dispersion due to transmission as described elsewhere. The dispersion is different for different wavelengths. The arrangement in FIG. 18b is seeking to remove the effect of dispersion caused by the transmission of light through the fiber for each channel so that the spectrum for each channel equates to the as launched spectrum after transmission.

The transmitter includes multiple EAM waveguides 1826 and associated drivers 1828. There is an EAM waveguide for each central wavelength of channels 1 to N and an associated driver for each EAM waveguide. The generated wavelength of each pair of EAM WG and driver corresponds to the central wavelength of the channel $\lambda_1$ to $\lambda_N$. The wavelength pass through a respective DCG or DCM 1830₁ to 1830₂. The respective DCG or DCM introduces a correction for the anticipated dispersion so that after transmission through the fiber the dispersion is compensated for.

The outputs for respective DCGs or DCMs are sequentially added from one stage to the next by an AI-designed adder 1832 associated with each subsequent stage (i.e. not the first stage as there is nothing to add). The AI-designed adder is of a similar structure to the DCM. This continues for all central wavelengths until $\lambda_1$ to $\lambda_N$ are combined to form an output for transmission through the fiber. The adders arranged in series with one another essentially provide a function similar to a multiplexer in that the individual wavelengths of different channels are combined with one another so that each has been treated in a different way through the DCG or DCM to negate the effects of the induced transmission dispersion. Other manners of combining the channels can also be envisaged.

The DCG or DCM may comprise a transmissive, diffractive or reflective elements as described elsewhere. The transmitter may comprise additional components such as electronics for controlling the photonic 1834 and electronic 1836 components. The transmitter may comprise a single monolithic chip or include multiple chips coupled as described elsewhere.

It is noted that there may be a combination of transmitter and receiver where the arrangements is not identical or similar. For example, the receiver of FIGS. 14 and 15 may be used with the transmitter of FIG. 18b; the receiver of FIG. 18a can be used with transmitters arranged as in FIGS. 16 and 17; or vice versa in each case.

In order to make the combination of devices for either the transmitter or the receiver a fabrication process is required. FIGS. 19 and 20 show an example of a possible epitaxial (epi)-layer structure for a monolithic receiver with demultiplexer and DCG or DCM as shown in FIGS. 14 15, or 18a and a transmitter with a multiplexer and DCG or DCM as shown in FIGS. 16, 17 or 18b. In the examples where the demultiplexer is exchanged for another component, such as the drop filter of FIG. 18a, that achieves a demultiplexing function, the demultiplexers shown below will also be exchanged. Similarly, where the multiplexer is exchanged for another component such as the adder of FIG. 18b that achieves a multiplexing function, the multiplexers shown below will also be exchanged.

Figures 19A, 19B:
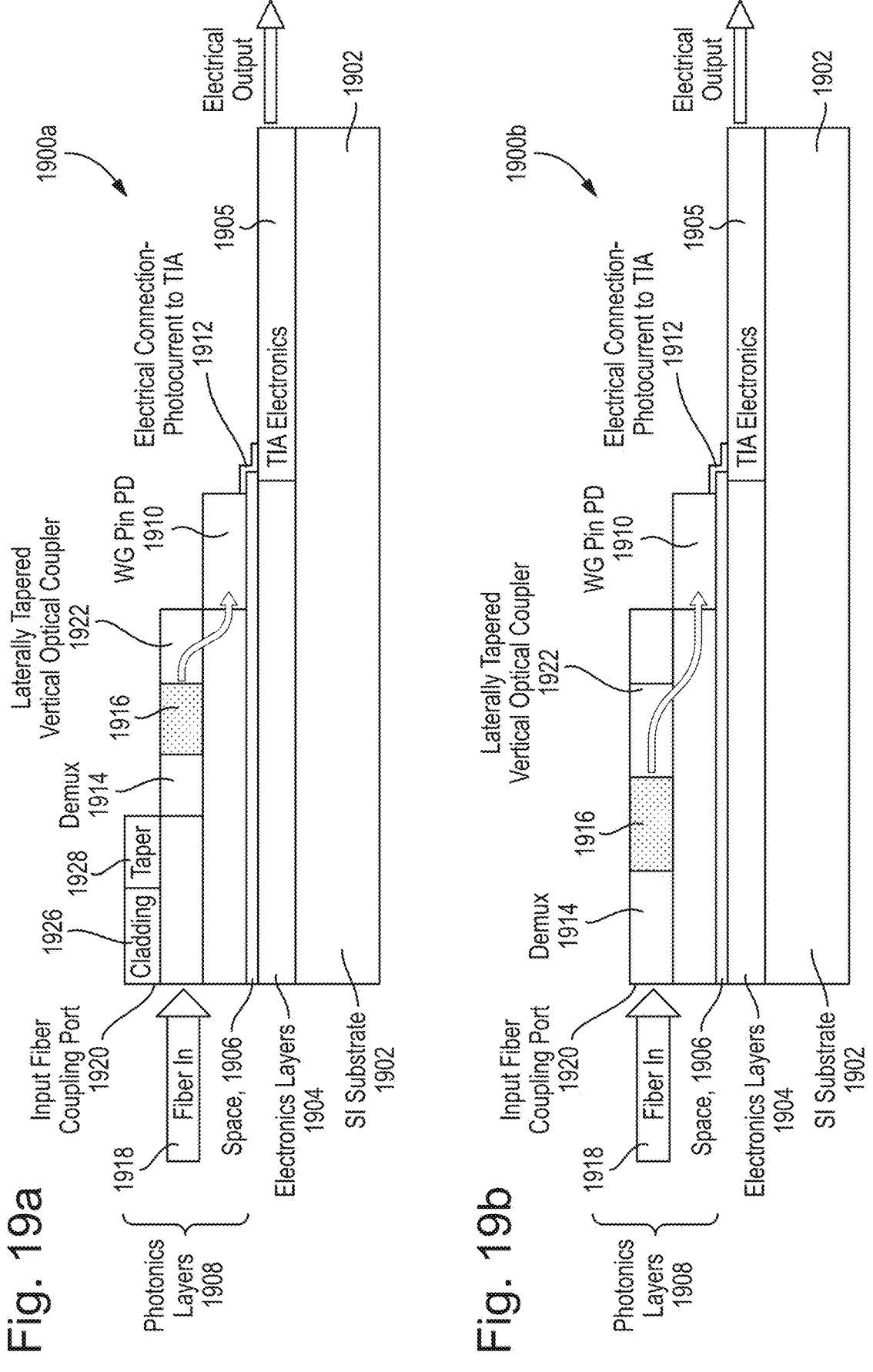
FIG. 19*a* is a simplified cross-sectional view of an epitaxial structure for a monolithically integrated optical receiver including a longitudinal cross-section through one WG-pin PD of a vertical optical coupling of a DEMUX and WG-pin PD according to an aspect of the present invention.
FIG. 19*b* is a simplified cross-sectional view of an epitaxial structure for a monolithically integrated optical receiver including a longitudinal cross-section through one WG-pin PD of a vertical optical coupling of a DEMUX and WG-pin PD according to an aspect of the present invention.

FIGS. 19*a* and 19*b* both show a simplified cross-sectional view of an epitaxial structure for a monolithically integrated optical receiver including a longitudinal cross-section through one WG-pin PD of a vertical optical coupling of a DEMUX or equivalent and a DCG or DCM with a WG-pin PD according to an aspect of the present invention with FIG. 19*a* being a version with additional cladding/taper features and FIG. 19*b* being a version without additional cladding/taper features.

Figures 19C, 19D:
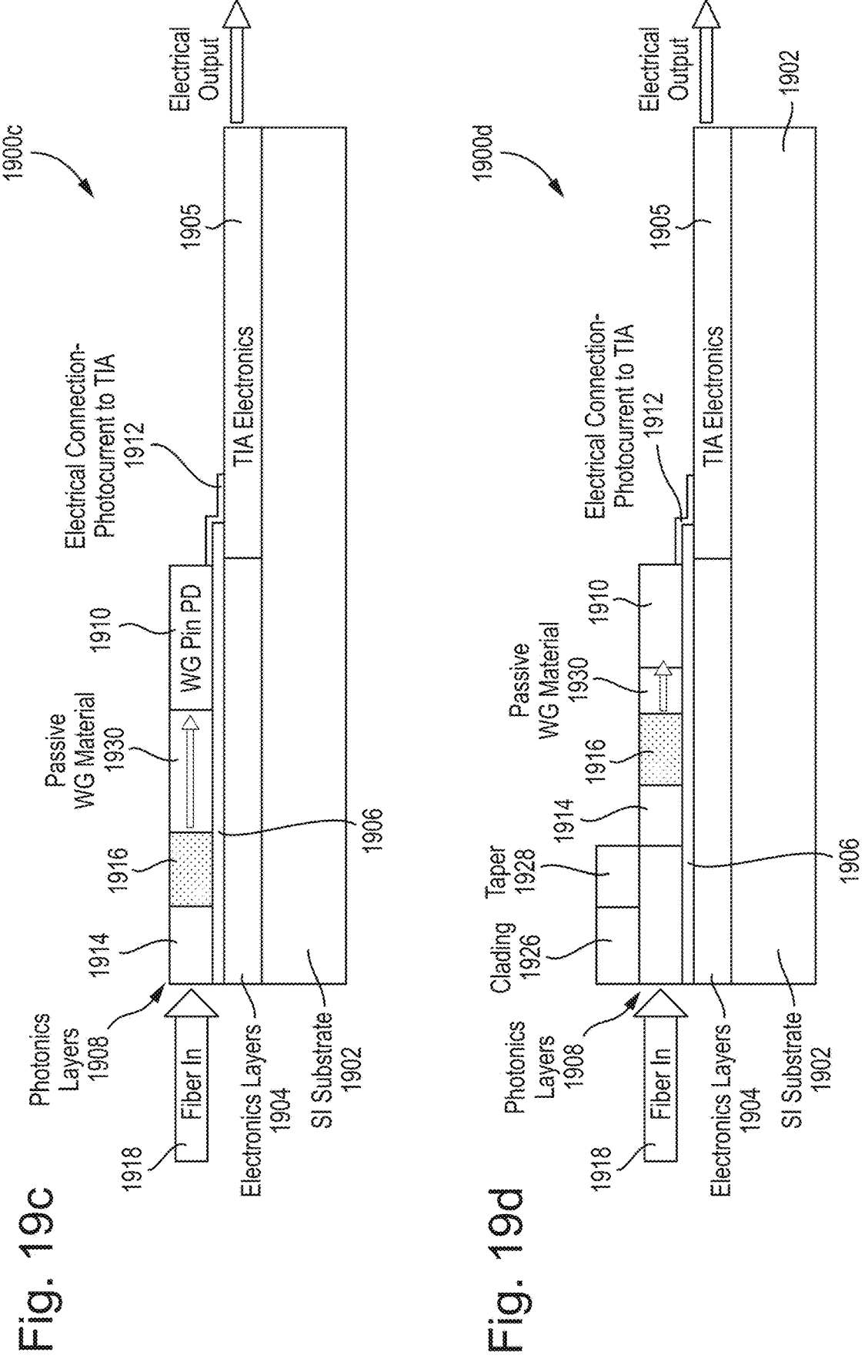
FIG. 19*c* is a simplified cross-sectional view of an epitaxial structure for a monolithically integrated optical receiver including a longitudinal cross-section through one WG-pin PD of a lateral optical coupling of DEMUX and WG-pin PD according to an aspect of the present invention.
FIG. 19*d* is a simplified cross-sectional view of an epitaxial structure for a monolithically integrated optical receiver including a longitudinal cross-section through one WG-pin PD of a lateral optical coupling of DEMUX and WG-pin PD according to an aspect of the present invention.

FIGS. 19*c* and 19*d* both show a simplified cross-sectional view of an epitaxial structure for a monolithically integrated optical receiver including a longitudinal cross-section through one WG-pin PD of a lateral optical coupling of DEMUX or equivalent and a DCG or DCM with a WG-pin PD according to an aspect of the present invention with FIG. 19*c* being a version with additional cladding/taper features and FIG. 19*d* being a version without additional cladding/taper features.

Like reference numbers in FIG. 19*a*-19*d* relate to the same features and not all reference numbers are repeated in all figures.

Referring to FIG. 19*a*, a cross-sectional view is shown of an epitaxial structure for a monolithic multidevice receiver device according to an aspect of the present invention. This shows a monolithically integrated demultiplexer-DCG/DCM-PIN-TIA chip 1900 comprising a semi-insulating (SI) substrate 1902, to illustrate monolithic integration of first epitaxial layers for a InP heterojunction bipolar transistor (HBT) 1904 forming the TIA 1905 and vertically distanced by a spacer layer 1906 from second epitaxial layers 1908 forming an InGaAs WG-pin PD 1910. Layer 1904 or another layer (not shown) may include electronics for driving and controlling each monolithic element of the combined demultiplexer-DCG/DCM-PIN-TIA. The remainder of layer 1908 includes other photonics as required to operate the WG-pin PD 1910. A conductive trace 1912 connects the WG-pin PD 1910 to the TIA 1905. The conductive trace is formed from one or more metallization layers. A demultiplexer or equivalent 1914 and a DCG or DCM 1916 are formed from third epitaxial layers. The demultiplexer 1914 and DCG 1916 are vertically distanced from the first and second layers. The demultiplexer 1914 is configured to receive fiber in 1918 via an input fiber coupling port 1920 from a network (not shown in FIG. 19*a*) that has been transmitted from a transmitter that may or may not be as described elsewhere.

The demultiplexer 1914 and DCG are optically connected with the WG-pin PD via a laterally tapered vertical optical coupler 1922 and waveguide 1924 passing through the same layer as the demultiplexer or equivalent 1914 and a DCG or DCM 1916. The tapered vertical optical coupler 1922 enables vertical optical communication between horizontally distanced layers. Vertical optical coupling using laterally tapered vertical optical couplers requires appropriate selection of bandgap wavelength and refractive index as will be known to the skilled person. A spacer layer 1906 isolates the first and second epitaxial layers. Other spacer layers may be added as needed to avoid accidental connections and crosstalk between components or devices.

An optional cladding layer 1926 is formed atop the demultiplexer 1914 and DCG 1916 along with an optional second laterally tapered vertical optical coupler 1928 to allow light from the fiber into the demultiplexer as an alternative to the waveguide 1924 passing through the demultiplexer or equivalent 1914 and a DCG or DCM 1916. The cladding layer 1926 is to facilitate optical coupling to the fiber and to add an additional cladding layer to the structure. Through the monolithically integrated demultiplexer-DCG/DCM-PIN-TIA, fiber in 1918 is converted to an electrical output 1932 for delivery to individual customers or users.

The optional cladding layer 1926 and the second laterally tapered vertical optical coupler 1928 are used to couple the fiber and the demultiplexer due to the differences in size between the structures. The fiber is typically ~250 μm in diameter and the demultiplexer is considerably smaller. Different diameters of fiber are available and are expected to continue to be smaller in the future. The combination of the optional cladding layer 1926 and the second laterally tapered vertical optical coupler 1928 act as a spot-size converter between the fiber and the demultiplexer. It is possible that different optical components may provide spot-size conversion and may not be required in some examples as shown in some figures.

FIG. 19*b* is the same device 1900*b* as in FIG. 19*a* without the cladding layer 1926 and second laterally tapered vertical optical coupler 1928. This reduces the number of layers and thus the size relative to the FIG. 19*a* example. Device 1900*b* otherwise is essentially the same as device 1900*a*.

Each device formed from epitaxial layers may comprise electronic driving and control circuits which may be formed in further epitaxial layers or those already indicated above for the electronics. These are not shown in detail in FIG. 19*a*-19*d* but may be included in the fabrication of the receiver 1900 or may comprise separate components that are later connected to the monolithic receiver 1900.

FIG. 19*c* shows an alternative example of the monolithically integrated demultiplexer-DCG/DCM-PIN-TIA chip 1900*b*. In this example the demultiplexer or equivalent 1914 and a DCG or DCM 1916 are formed in the same photonics layers 1908*b* as the WG-pin PD 1910. This gives rise to a smaller device in profile and requires an addition passive waveguide material 1930 between the DCG 1916 and the WG-pin PD 1910. The cladding layer 1926 and second laterally tapered vertical optical coupler 1928 are not shown in FIG. 19*c*. FIG. 19*d* shows a configuration including the cladding layer 1926 and second laterally tapered vertical optical coupler 1928 to facilitate optical coupling to the fiber.

FIG. 19*a*-19*d* shown variations of a monolithically integrated demultiplexer-DCG/DCM-PIN-TIA chip 1900 and it will be appreciated that other options are available. Not shown in detail in this FIG. 19*a*-19*d*, but in accordance with other figures there are multiple WG-pin PDs 1910 and TIAs 1905. These are aligned with one another into the page i.e. in the XY plane. The number of WG-pin PDs 1910 and TIAs 1905 may be equal to one another and match with the number of channels in the demultiplexer. For example, eight or sixteen. As mentioned elsewhere the numbers of WG-pin PDs 1910 and TIAs 1905 may be unequal in applications where high speed of operation are not critical.

Figures 20A, 20B:
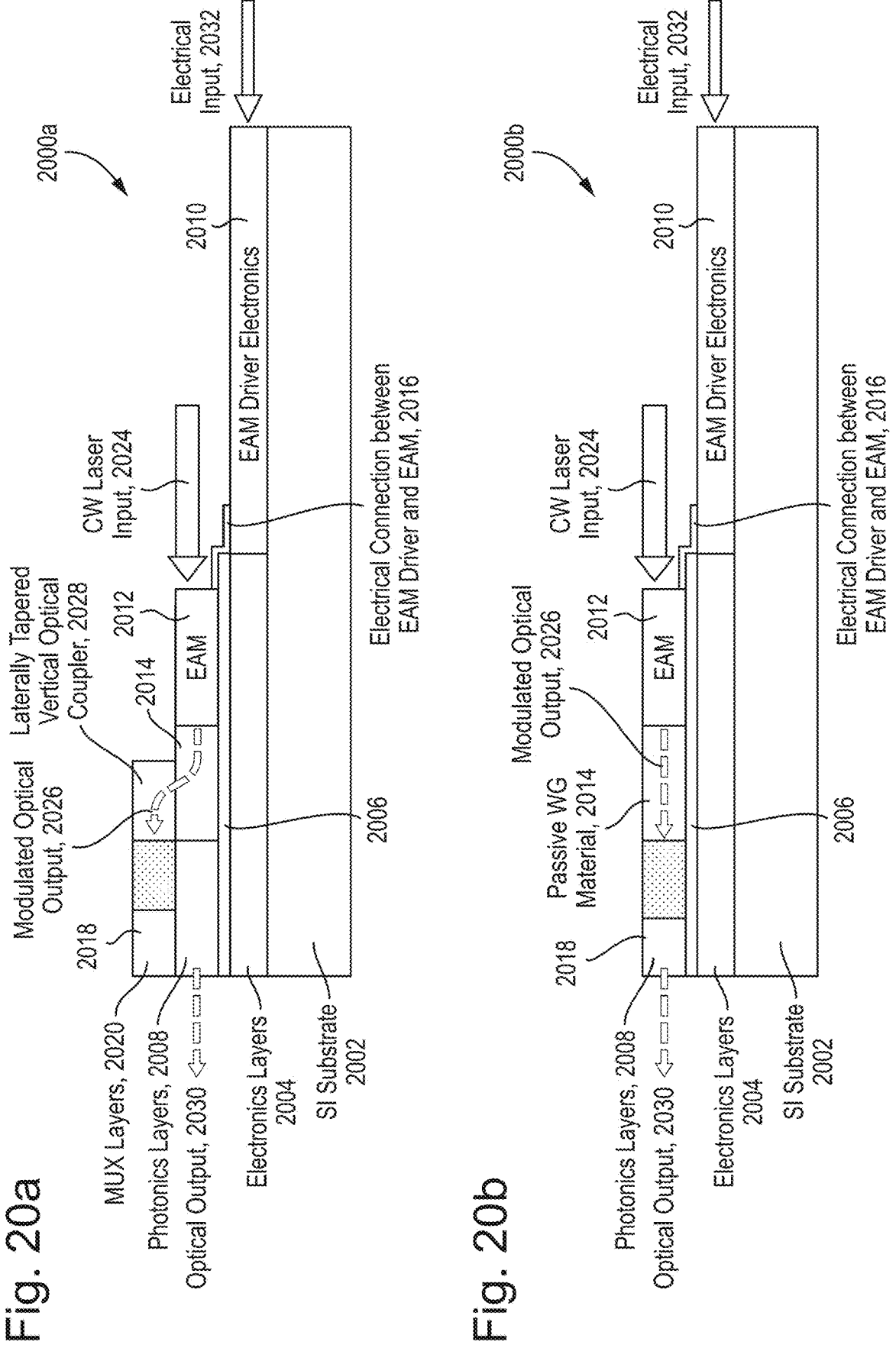
FIG. 20*a* is a simplified cross-sectional view of an epitaxial structure for a monolithically integrated optical transmitter including a longitudinal cross-section through one EAM of a vertical optical coupling of MUX and EAM according to an aspect of the present invention.
FIG. 20*b* a simplified cross-sectional view of an epitaxial structure for a monolithically integrated optical receiver including a longitudinal cross-section through one EAM of a lateral optical coupling of MUX and EAM according to an aspect of the present invention.
Figures 20C, 20D:
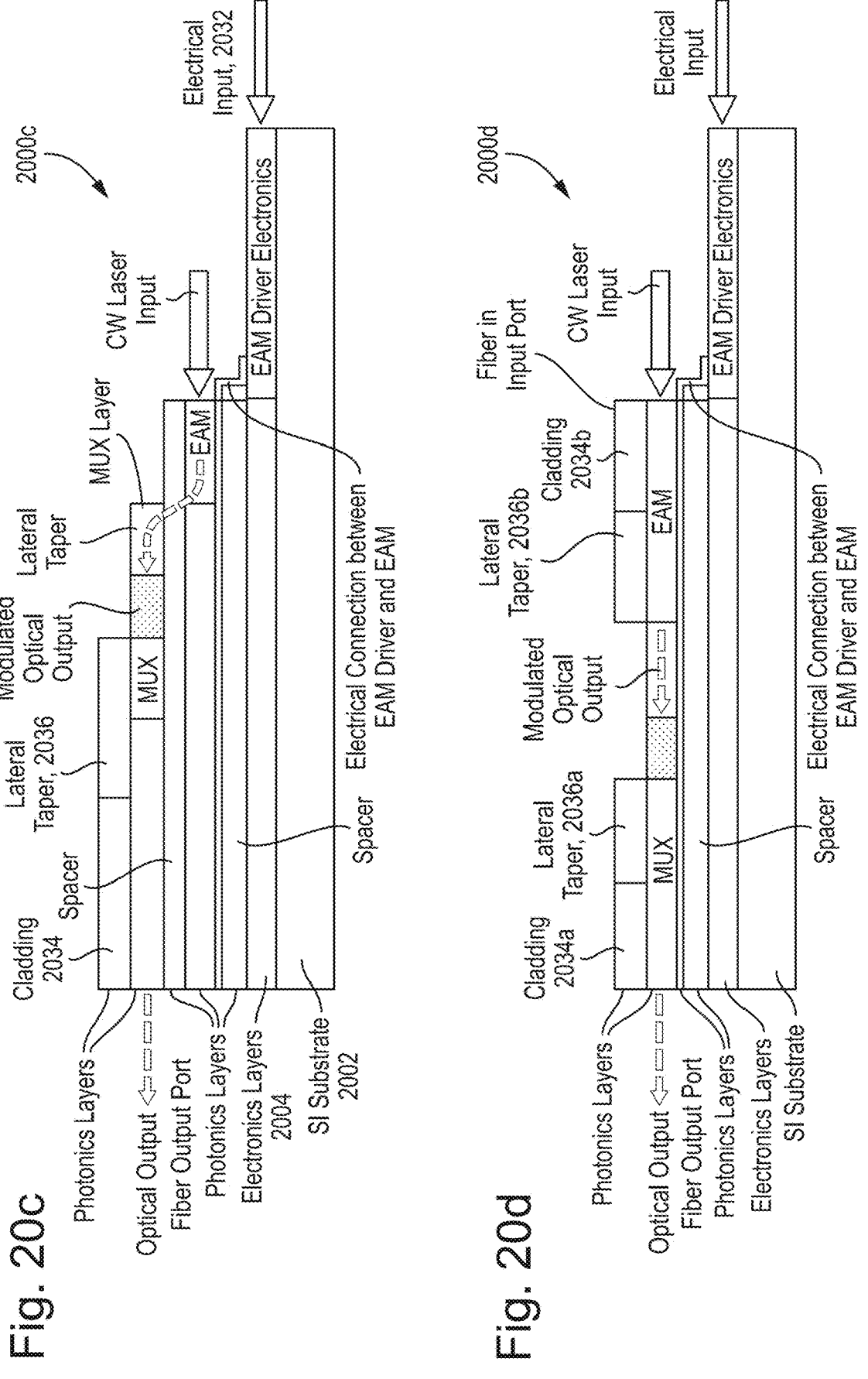
FIG. 20*c* is a simplified cross-sectional view of an epitaxial structure for a monolithically integrated optical transmitter including a longitudinal cross-section through one EAM of a vertical optical coupling of MUX and EAM according to an aspect of the present invention.
FIG. 20*d* a simplified cross-sectional view of an epitaxial structure for a monolithically integrated optical receiver including a longitudinal cross-section through one EAM of a lateral optical coupling of MUX and EAM according to an aspect of the present invention.

FIGS. 20*a* and 20*c* are both a simplified cross-sectional view of an epitaxial structure for a monolithically integrated optical transmitter including a longitudinal cross-section through one EAM of a vertical optical coupling of MUX or equivalent and a DCG/DCM and EAM according to an aspect of the present invention with FIG. 20*a* being a version without additional cladding/taper features and FIG. 20*c* being a version with additional cladding/taper features.

FIGS. 20*b* and 20*d* are both a simplified cross-sectional view of an epitaxial structure for a monolithically integrated optical transmitter including a longitudinal cross-section through one EAM of a lateral optical coupling of MUX or equivalent and a DCG/DCM and EAM according to an aspect of the present invention with FIG. 20*b* being a version without additional cladding/taper features and FIG. 20*d* being a version with additional cladding/taper features.

FIG. 20*a* is a cross-sectional view of an epitaxial structure for a monolithic multidevice transmitter 2000 according to an aspect of the present invention. This shows a monolithically integrated EAM driver-EAM-DCG/DCM-multiplexer or equivalent chip 2000 comprising a semi-insulated substrate 2002 and a monolithic integration of a first plurality of epitaxial layers 2004 forming an EAM driver 2010 and horizontally distanced from a second plurality of epitaxial layers for photonics 2008 forming an InGaAs modulating EAM 2012. The first plurality of epitaxial layers 2004 is separated from the second plurality of epitaxial layers 2008 by a spacer 2006. Layer 2004 or another layer may include electronics for driving and controlling each monolithic element of the combined EAM driver-EAM-DCG/DCM-multiplexer or equivalent. The remainder of layer 2008 includes a passive waveguide material 2014. Conductive traces 2016 connect the EAM driver to the EAM. The conductive trace is formed from one or more metallization layers. A multiplexer or equivalent 2018 and a DCG or DCM 2019 are formed from third epitaxial multiplex layers 2020. The multiplexer or equivalent 2018 and a DCG or DCM 2019 are horizontally distanced from the first and second layers. The EAM receives a continuous wave laser input 2024 to produce a modulated optical output 2026 which passes through a laterally tapered vertical optical coupler 2028 to the DCG 2019 and multiplexer 2018. The multiplexer 2018 is configured to transmit optical out 2030 from the combined optical output from multiple outputs from each EAM. Fiber out 2030 is directed towards a network (not shown in FIG. 20*a*) for a receiver that may or may not be as described in other figures. The multiplexer or equivalent 2018 and a DCG or DCM 2019 are in communication with the EAM via laterally tapered vertical optical coupler 2028 and passive waveguide material 2014. The taper enables vertical optical communication between horizontally distance layers. Vertical optical coupling using laterally tapered vertical optical couplers requires appropriate selection of bandgap wavelength and refractive index as will be known to the skilled person.

Other spacer layers and isolation layers as previously discussed may be added as needed to avoid unintentional connections and crosstalk between components or devices. Through the monolithically integrated EAM driver-EAM, electrical input 2032 is converted to the optical output 2030 for delivery via the network to receivers wherever they may be.

Each device formed from epitaxial layers may comprise electronic driving and control circuits which may be formed in further epitaxial layers or those already indicated above for the electronics. These are not shown in detail in FIG. 20*a* but may be included in the fabrication of the transmitter 2000 or may comprise separate components that are later connected to the monolithic receiver 2000.

FIG. 20*b* shows an alternative example of the monolithically integrated EAM driver-EAM-DCG/DCM-multiplexer or equivalent chip 2000*b*. In this example the demultiplexer 2018 is formed in the same photonics layers 2008 as the EAM 2012. This gives rise to a smaller device in profile and requires passive waveguide material 2014 between the DCG/DCM 2019 and the EAM 2012. The EAM receives a continuous wave laser input 2024 to form a modulated optical output 2026 which passes to multiplexer 2018.

FIG. 20*c* is an equivalent structure to that shown in FIG. 20*a* and includes a cladding layer 2034 and second laterally tapered vertical optical coupler 2036 to facilitate optical coupling to the fiber. This provides the same function as described elsewhere. FIG. 20*d* is an equivalent structure to that shown in FIG. 20*b* and includes first and second cladding layers 2034*a* and 2034*b* and additional second laterally tapered vertical optical couplers 2036*a* and 2036*b*, one of each over the multiplexer 2018 and one over the EAM to facilitate optical coupling to the fiber. This provides the same function as described elsewhere. but may also be applied over a greater surface area to channel light into the multiplexer and to protect from other light sources which may pollute the lateral optical signal.

There are a number of further factors that are relevant to a multiplexer and transmitter adapted to compensate for channel dispersion. The EAMs is known to have flexibility in terms of the various operation limitations and optical performance. The present invention addresses the intrinsic limitations of EAM by use of additional solutions.

The effect of chirp may be more significant particularly when using EAMs having Multiple-Quantum-Wells (MQWs). This is a preferred type of EAM for high-speed applications and non-uniform well thickness is required to accommodate channel spacing. To adapt the EAMs to be adapted to a larger wavelength region by reducing extinction ratio (ER) or providing a greater drive voltage. It is possible to increase length of the modulator to increase ER for any given drive voltage. This has the potential to add capacitance to the EAM. To address this problem, it would be possible to use a transmission drive line as described in #022 (U.S. provisional patent application No. 63/778,687 filed Mar. 27, 2025), incorporated herein by reference.

In an alternative aspect it may be further desirable to re-design the quantum wells of the EAM using an AI-based inverse design process in which one of the inputs comprises a Schrodinger equation.

A default solution of a single channel with a taper to spot-size converter may also be used.

In FIGS. 19 and 20 the layers are shown by way of example, and it is possible that the different devices of the demultiplexer-DCG/DCM-PIN-TIA and the EAM driver-EAM-DCG/DCM-multiplexer may be formed in a different order and be located in different respective layers. The monolithic integration may comprise all optical components and a hybrid integration of electrical components. In the case of hybrid integration of electronic components some devices may be attached later to the monolithic structure in a manner that will be evident to the skilled person. It is noted that each device of the trio of monolithic elements is isolated from the other ones of the trio so that the correct connections are made between the relevant devices. To that end it will be appreciated that different spacer layers, isolation and connections may be made between the devices.

It is also possible that in order to reduce the height of the device in circumstances where this is required there may be multiple devices formed on the same vertical layer. This may be achieved by growing certain layers, etching them away in certain regions and then selectively regrowing in the etched away regions. This would have a disadvantage that the planar size of the receiver or transmitter may be greater than in the examples disclosed but may be useful in some situations. The use of first, second and third layers is thus only used to distinguish one layer from another and not to indicate a specific order of the layers. Indeed, the first and third layers may actually be the same layers, and the devices thereon are displaced horizontally from the second layer but not from one another.

The demultiplexers and multiplexers may comprise single-stage or multi-stage devices. For example, 2-stage or 3-stage devices as design and use dictates.

Figure 21A:
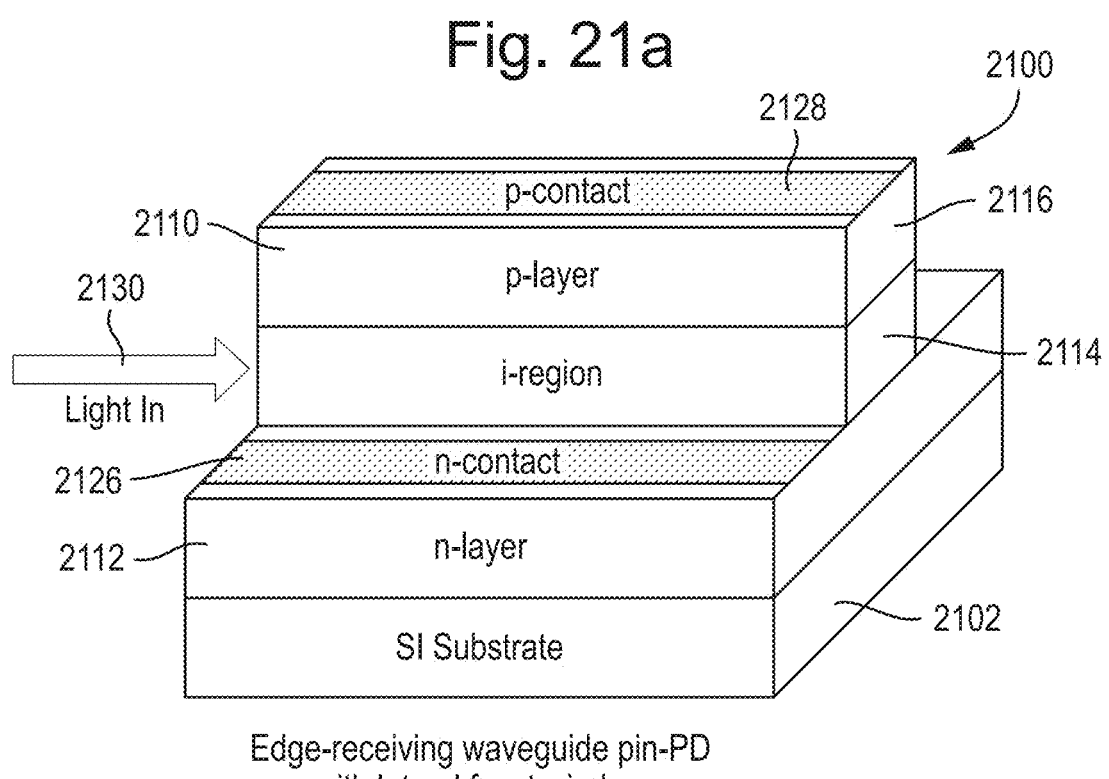
FIG. 21*a* shows a schematic functional block diagram of a WG-pin PD according to an aspect of the present invention.
Figure 21B:
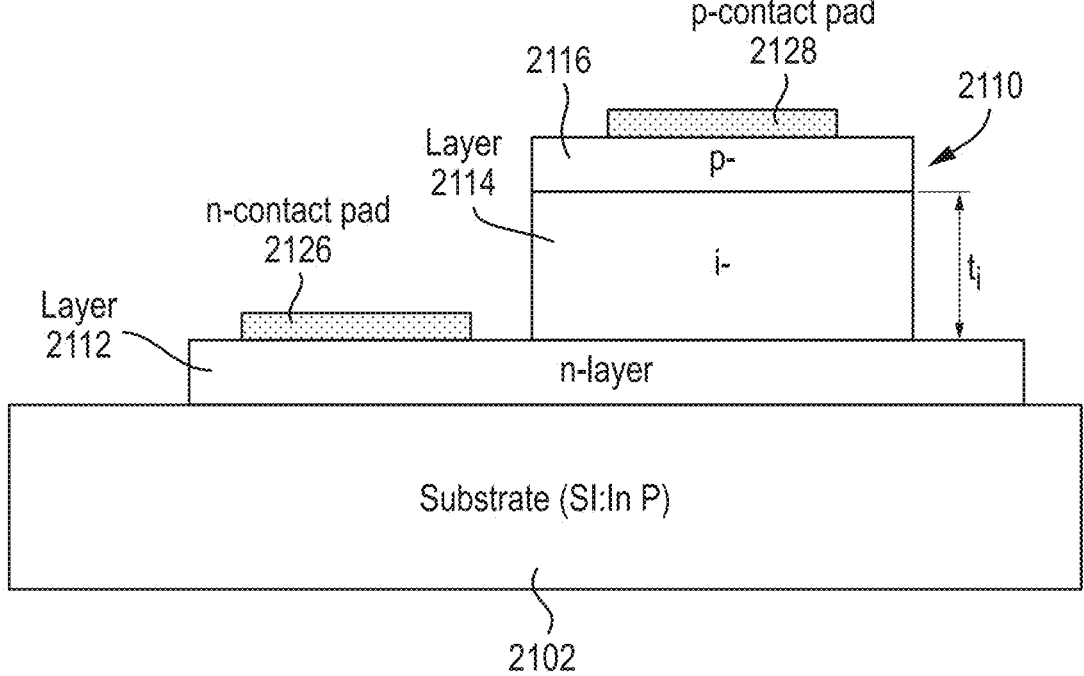
FIG. 21*b* shows a cross-sectional view of the PIN PD of FIG. 26*a*.

For completeness, FIGS. 21*a* and 21*b* show respectively a schematic cross-sectional view and a true cross-sectional view of an InGaAs PIN device structure 2100 as used in the present invention and showing the p-i-n layer structure 2110 comprising an n-layer 2112, an i-layer 2114 and a p-layer 2116 formed on a semi-insulating (SI) substrate 2102, for example indium phosphide (InP) 2102. The i-layer has a thickness $t_i$. The PIN device is essentially a pn-junction separated with an intrinsic (i)-layer of absorption material such as InGaAs. Bond pads comprise a p-contact pad 2128 and an n-contact pad 2126. The n-layer 2112 is interconnected to the n-contact pad 2126. The capacitance Cpin of the p-i-n junction itself is necessary for device operation. A finite junction capacitance is necessary to balance off RC with carrier transit time. However, the bond pad capacitance adds no useful functionality, and ideally the bond pad capacitance would be zero. Light enters laterally via fiber 2130.

Monolithic integration of the PIN and TIA eliminates the bond pad capacitance, and bond wire inductance, by design. For example, it is possible to integrate a InGaAs pin with a TIA fabricated using InP heterojunction bipolar transistors (HBTs). This means there is a direct on-chip interconnection, i.e. a lithographically defined conductive trace, from the output of the pin to the input of the TIA. Preferably the conductive trace between the PIN and TIA provides a short, low resistance, low inductance interconnection, eliminating the need for impedance matching. Thus, one of the 500 bond pads of the pin is eliminated because there is a direct interconnection, not a wire bond connection between the PIN and TIA. Since the conductive trace providing the direct interconnection between the PIN and TIA is lithographically defined, i.e. Using one or more interconnect metallization layers, the PIN-TIA interconnection is more reproducibly and consistently defined, for each PIN-TIA on a wafer, and from wafer-to-wafer, and from batch-to-batch.

Figure 22A:
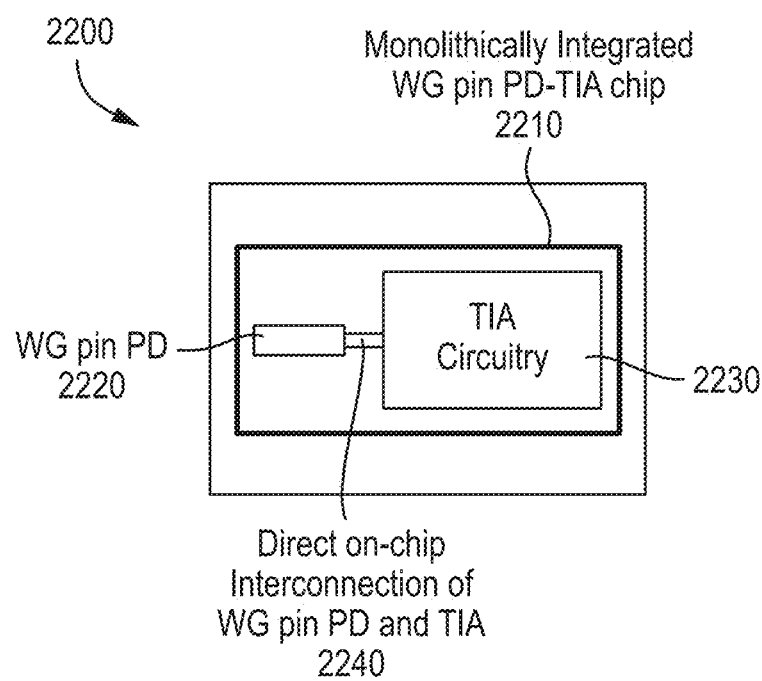
FIG. 22*a* shows a schematic functional block diagram of a WG-pin PD and a TIA according to an aspect of the present invention.
Figure 22B:
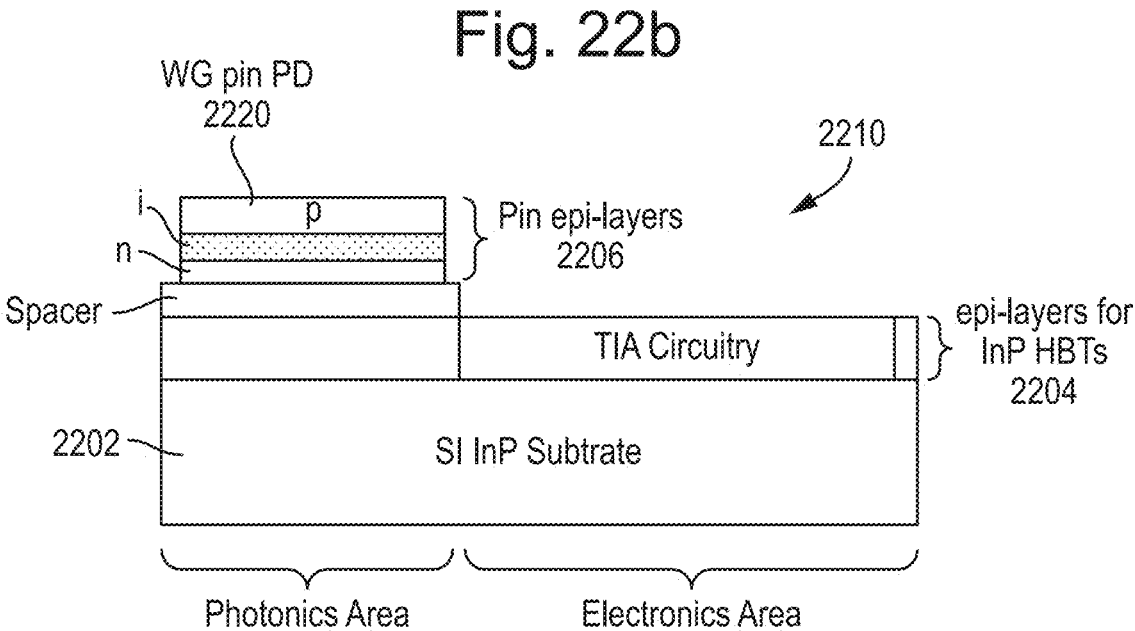
FIG. 22*b* shows a cross-section of the WG-pin PD and a TIA of FIG. 27*a*.

A schematic device topology (top plan view) for a monolithically integrated PIN-TIA of an example embodiment 2200 is shown in FIG. 22*a*. The monolithically integrated PIN-TIA chip 2210 comprises a PIN device structure 2220 and TIA circuitry 2230. There is a direct on-chip interconnection 2240 between the p-contact of the PIN 2220 and the TIA circuitry. A schematic cross-sectional view of the monolithically integrated PIN-TIA chip 2210 comprising a semi-insulating substrate 2202 is shown in FIG. 22*b*, to illustrate monolithic integration of HBT epitaxial layers 2204 for the TIA and horizontally distanced or overlying epitaxial layers 2206 to form the PIN is shown in FIG. 22*b*. Although the opposite terminal of the PIN is coupled to a bond pad (i.e. a ground pad), the capacitance of this pad is actually decoupled from device operation. Since the output of the PIN is directly coupled to a first stage amplifier of the TIA by a conductive trace 2240 providing a direct on-chip interconnection, in effect, the pad capacitance of the PIN does not figure into device operation. This has multiple useful consequences.

FIG. 23 is a simplified schematic cross-sectional view of an epitaxial structure for a monolithically integrated waveguide PD and TIA 2300 according to an aspect of the present invention. The monolithic device comprises a semi insulating (SI) III-V material substrates 2302. In an example this is SI InP. Electronic layers 404 are added to provide a first plurality of semiconductor layers for electronics comprising InP HBTs in an example. A spacer or mode separating layers 2306 separates the first plurality of layers from a second plurality of semiconductor layers for waveguides of a one or more WG-pin PDs 2308.

The WG-pin PDs comprise the materials as described elsewhere in this description and generally comprise one or more III-V materials, e.g. an InP-based material system, comprising binary, ternary, quaternary and other compositions of In, Ga, As, P, Al and Sb. The first plurality of layers comprise electronics and associated functionality, e.g. for fabrication of InP heterojunction bipolar transistors (HBTs). The second plurality of layers comprises photonic layers and associated functionality. For fabrication of WG-pin PDs, the photonics layers comprise an i-region comprising absorption material, sandwiched between an n-InP layer and p-InP layer. In some embodiments, the absorption material of the i-region comprises InGaAs, or a quaternary absorption material selected from within the InGaAlAsP quintenary system, which is lattice matched to InP. In some embodiments the absorption material of the i-region comprises a Quantum Confined Stark Effect (QCSE) multi-quantum well (MQW) structure.

Using materials of this nature enables very high-speed modulation to be achieved. A semi-insulating substrate is beneficial in reducing device capacitance. In addition, Quantum Efficiency and other parameters, such as sensitivity, responsivity and dynamic extinction ratio are also improved. For fabrication on an SI substrate there is reduced overall capacitance which improves electrical performance. The receiver has improved sensitivity and responsivity of WG-PIN PD. The transmitter has a dynamic extinction ratio of the EAM which provides improvements over other designs.

FIG. 24 shows a schematic view of part of an optical transmitter which is a device structure comprising first and second WG-pin PDs 2308*a* and 2308*b* and electronic circuitry comprising a TIA, fabricated with HBTs, based on the epitaxial layer structure shown in FIG. 23 structure. Electrical connections between the WG-pin PDs and the TIA are omitted from this diagram. It will be appreciated that in accordance with an aspect of the invention, there are interconnects between any optical device and electronic device according to techniques which will be appreciated by the skilled person. The area of the chip is defined by the semi-insulating substrate 2302. Layers 2304 includes multiple electronics devices 2310 and 2312 including but not limited to TIAs and any other drivers or control electronics for any other associated component or device located on the chip. An isolation layer 2314 separates the active electronics layers, comprising the electronic circuitry from the remaining electronics layers underlying the photonics layers. Atop the electronics layer is a mode separating layer 2306 and two WG-pin PDs 2308*a* and 2308*b* at the mode separating layer 2306 and the underlying electronics layers 2304. That is, the mode separating layer 2306 vertically separates the photonics layers of the WG-pin PD from the remaining underlying electronics layers, and the isolation region laterally separates the photonics structures from the active electronic devices. One or more metallization layers provide electrical connection between each WG-pin PD and a respective TIA (electrical connections not shown in FIG. 24).

Figure 25A:
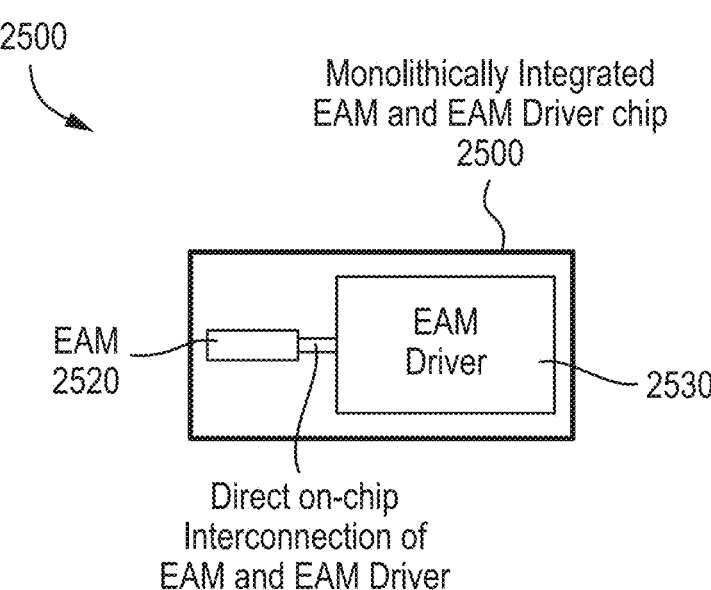
FIG. 25*a* shows a monolithically integrated electro-absorption modulators (EAM) and EAM Driver chip according to an aspect of the present invention.
Figure 25B:
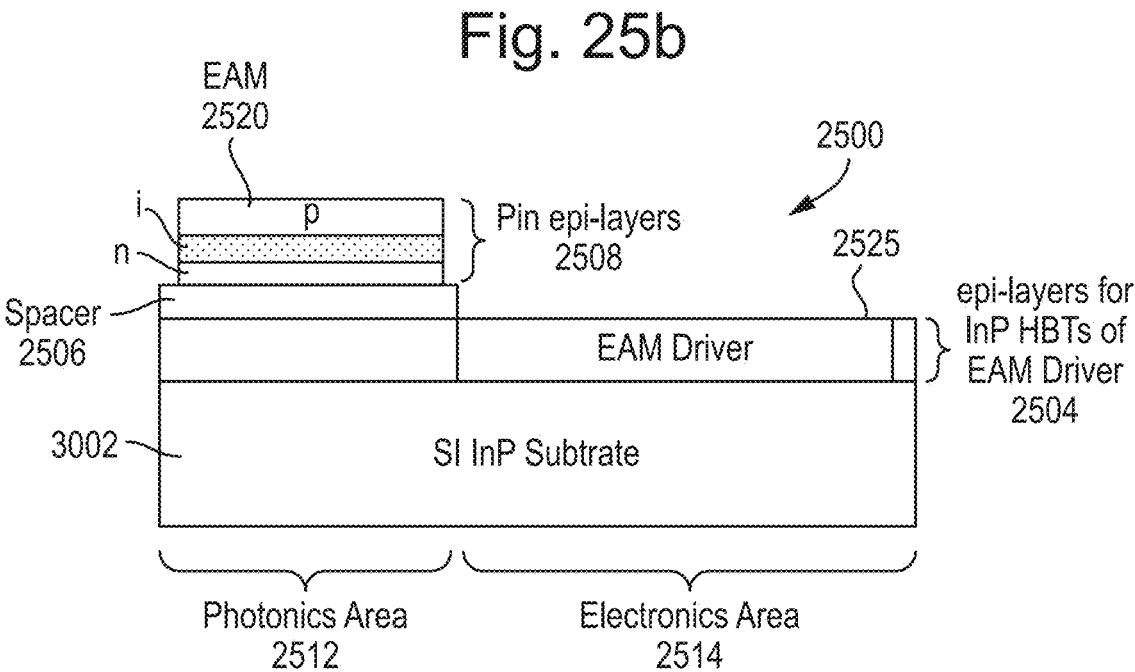
FIG. 25*b* is a simplified cross-sectional view of an epitaxial structure for the FIG. 25*a* structure.

U.S. Pat. Nos. 10,673,532 and 10,530,484 disclose device structures for monolithic integration of an electro-absorption modulators (EAM) and EAM driver circuitry for an optical transmitter. For example, FIGS. 25*a* and 25*b* herein are adapted from FIGS. 3A, 3B and 3C of these patents. FIG. 25*a* shows a schematic plan view of a monolithic electro-photonic integrated circuit 2500 comprising an EAM 2520 with integrated EAM driver circuitry 2530 which as adapted forms part of a transmitter according to aspects of the invention. FIG. 25b shows a simplified cross-sectional view of an epitaxial layer structure for fabrication of a monolithic electro-photonic integrated circuit 2500 comprising an EAM 2520 with an integrated EAM driver circuitry 2530 of FIG. 25a. FIG. 25b also shows the underlying semi-isolating substrate 2502 and a first plurality of semiconductor layers 2504 for electronics, comprising InP EAM driver layers, in an example of HBTs. A spacer 2506 separates the first plurality of semiconductor layers from a second plurality of semiconductor layers 2508 forming the EAM 2520. It will be appreciated that other examples may be used, and the design may vary depending on requirements and processing constraints such as chip dimension requirements and the like.

Figure 26A:
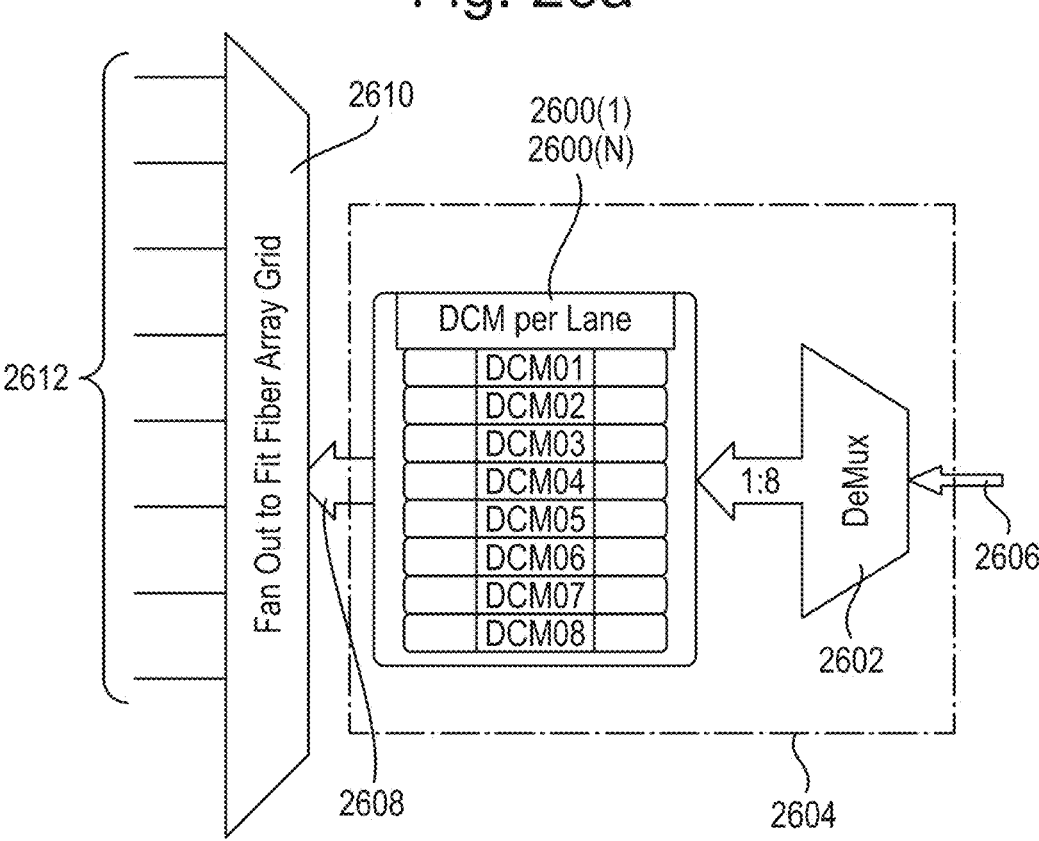
FIG. 26*a* is a diagram of a combination DCM and demultiplexer according to an aspect of the invention.

FIG. 26a shows a combination dispersion compensation matrix 2600 combined with a demultiplexer 2602 on a single chip 2604. The DCM 2600 comprises a DCM 2600(1) . . . 2600(N) for each channel of a number of channels N making up input signal 2606. There may be one DCM per channel or per sequence of cascading channels or stages as is explained below. The output 2608 from the multiple DCMs is fanned out by a fan out element 2610 to fit a fiber array grid 2612. As the devices (the DCM and the demultiplexer) are very small the output from the multiple DCMs may not match with the fiber width and the light may need to be fanned out for the fiber array to ensure that it is correctly transmitted.

Figure 26B:
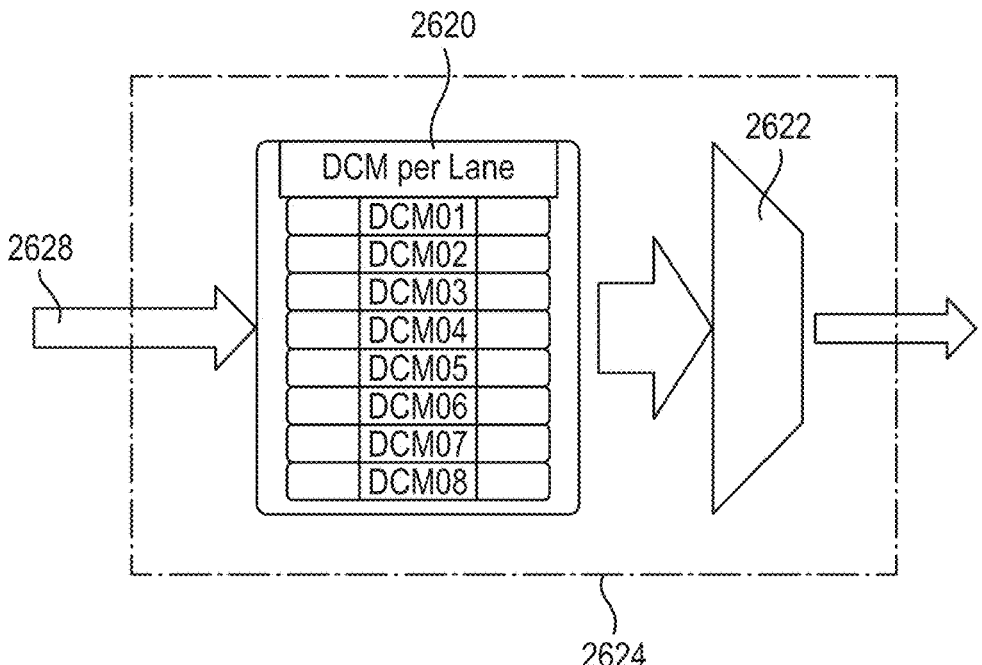
FIG. 26*b* is a diagram of a combination DCM and multiplexer according to an aspect of the invention.

FIG. 26b shows a combination dispersion compensation matrix 2620 combined with a multiplexer 2622 on a single chip 2624. The DCM 2620 comprises a DCM 2620(1) . . . 2620(N) for each channel of a number of channels N making up output signal 2626. There may be one DCM per channel or per sequence of cascading channels or stages as is explained below. The input 2628 to the multiple DCMs may be fanned in to fit a fiber array grid. As the devices (the multiplexer and the DCM) are very small the output from the multiple DCMs may not match with the fiber width and the light may need to be fanned in for the fiber array to ensure that it is correctly transmitted.

In fabricating a device or system the present invention envisages the use of one or more chips to provide the required functionality. The one or more chips may be made from the same types of materials or may be made from different materials. In aspects there are components, devices and systems made from silicon-based materials and components, devices and systems made from InP-based materials. In aspects of the invention, there may be a combination of components, devices and systems with individual parts made from a combination of silicon-based materials and InP-based materials. For example, some or all of the passive wavelength components, devices and systems may comprise silicon-based materials and the active components, devices and systems may comprise InP-based materials. In other cases, there may be different combinations of active and passive components, devices and systems from different materials.

Whatever the material, there is further provided a bespoke manner of ensuring optical coupling and electrical connections between respective chips forming the required components, devices and systems. The optical coupling can be implemented using waveguides which are matched to the positions and materials of the respective chips. The electrical connections are made in a normal manner through interposers or other connections as are known in the art.

It is noted that InP-based materials may comprise one or more III-V materials, e.g. an InP-based material system, comprising binary, ternary, quaternary, quintenary and other compositions of In, Ga, As, P, Al and Sb. Silicon-based materials are any materials that can be fabricated in a silicon-on-insulator (SOI) configuration in combination with materials such as Silicon, Germanium, Gallium Arsenide, Silicon Carbide, Gallium Nitride and the like.

Figure 27:
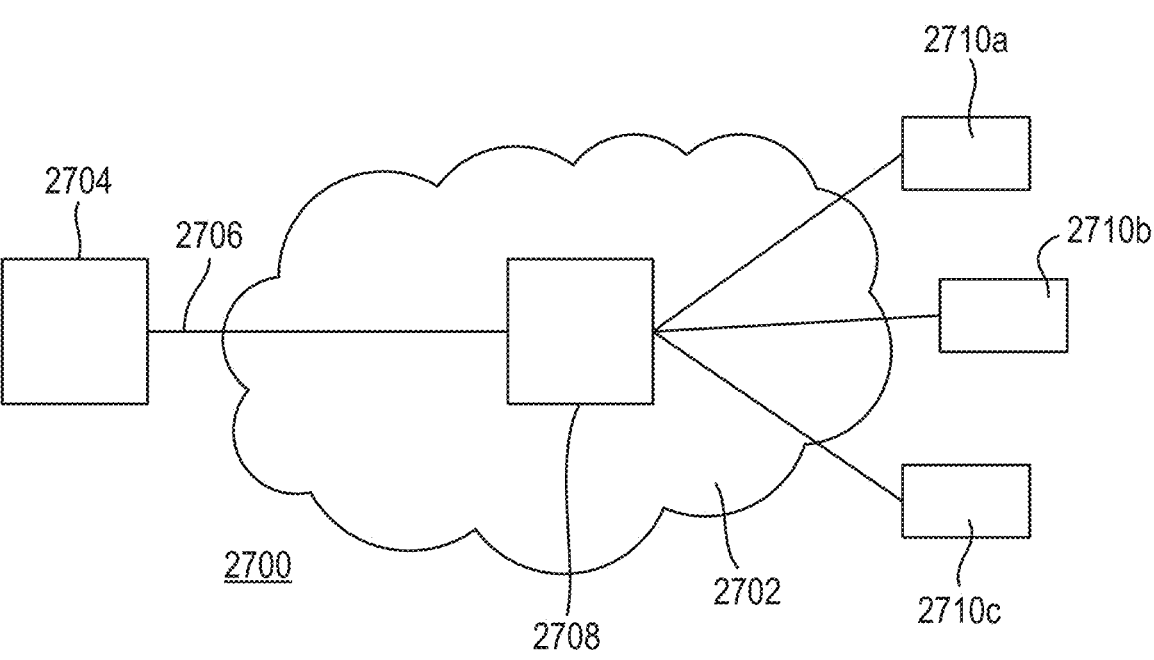
FIG. 27 shows a schematic functional block diagram of an optical distribution network according to an aspect of the present invention.

FIG. 27 shows a distributed network system 2700, according to an aspect of the present invention and which is configured to transmit and receive signals made up of multiple wavelengths. For example, applications such as CWDM for high-speed data interconnect, 5G network communications. The system 2700 is configured to operate with a network 2702 supporting a relevant application. A transmitter 2704 at a service provider communicates via an optical signal 2706 with receivers 2710a, 2710b, 2710c at respective multiple locations. The network may include a device 2708 for directing the transmitted signal to individual receivers. The nature in which this occurs is a beam splitter that can split the input into a plurality of outputs each destined for a particular location. There may be multiple beam splitters in the network depending on the nature of the original signal and the destinations. For example, a splitter per customer and a splitter per user.

It will be appreciated that the transmitter 2704 may include equivalent beam combiners or reverse beam splitters to combine multiple beams into a composite signal optical for transmission across the network. The transmitter may also include laser devices or modulators to generate the optical signal to be transmitted to the receivers, this is described in greater detail above.

The system may include other devices and components as needed such as for example dispersion compensation, multiplexing and/or demultiplexing capabilities. The transmitter may include one or more dispersion compensation gratings and a multiplexer and teach receiver may include one or more dispersion compensation gratings and a demultiplexer. In an aspect of the present invention the grating, multiplexer and demultiplexer are each or in combination designed using Artificial-Intelligence (AI)-based inverse design techniques. After design, the grating, multiplexer and/or demultiplexer are included in a single integrated transmitter and/or a respective single integrated receiver. In addition, an aspect of the present invention provides a single monolithic integrated receiver and transmitter.

The integrated PIN-TIA and demultiplexer is combined with a grating or DCG/DCM in aspects of the present invention as described above. The present invention makes use of AI-based inverse design processes to produce a design for a grating (e.g. DCG or DCM) to integrate with a monolithic arrangement having a PIN-TIA and demultiplexer as described herein. The ability to use AI-based inverse design techniques means that a very compact device can be designed and in combination with the small scale of the WG-pin PD offers a solution to many problems associated with providing a small, efficient and compact receiver. In addition, designing in III-V semiconductor materials provide other advantages over typical silicon-based semiconductors. The combination of using III-V semiconductor materials, such as Indium Phosphide (InP)-based materials system, and the use of AI-based inverse design processes offers a distinct advantage in the quest for integrating devices for use in very high-speed environments requiring optical receivers and transmitters and similar devices and purposes.

The integrated EAM and multiplexer is combined with a grating, DCG or DCM in aspects of the present invention as described above. The present invention makes use of AI-based inverse design processes to produce a design for a grating to integrate with a monolithic arrangement having an EAM and demultiplexer as described herein. The ability to use AI-based inverse design techniques means that a very compact device can be designed and in combination with the small scale of the EAM offers a solution to many problems associated with providing a small, efficient and compact receiver. In addition, designing in III-V semiconductor materials provide other advantages over typical silicon-based semiconductors. The combination of using III-V semiconductor materials, such as an Indium phosphide (InP)-based materials system, and the use of AI-based inverse design processes offers a distinct advantage in the quest for integrating devices for use in very high-speed environments requiring optical receivers and transmitters and similar devices and purposes.

The ability to design, using AI-based inverse design processes in InP semiconductor technology, also allows for a compact design of a multiplexer for use in a transmitter having similar qualities and advantages as the demultiplexer, for multiwavelength applications such as CWDM. This will also become further evident from other places in this application.

The grating, demultiplexer and multiplexers of an aspect of the invention is designed in accordance with an AI-based inverse design process comprised of multi-objective optimizers, physics simulators, and AI models that are trained for generating passive photonic components such as grating, demultiplexers or multiplexers. In order to accomplish this, there are a number of steps to consider and optimize in order to achieve a feasible design for the relevant. For all situations the input to the design process is a definition of the required optical response of the device in question, in this case a dispersion compensating grating, demultiplexer and/or a multiplexer for a receiver and a transmitter respectively.

FIGS. 28 and 29 show examples of a DCG or DCM as described throughout the application and FIG. 30 shows examples of a demultiplexer and an example of a multiplexer, each designed for the purposes of being implemented as examples of the invention and designed based on an AI-based inverse design process of aspects of the invention.

The optical response or the performance criteria provide the input for the trained AI models, optimizers and simulators. For example, one or more optical characteristics such as network capacity, spectral efficiency, optical power budget, and redundancy. Network capacity and spectral efficiencies are used to ensure future proofing and compatibility with other factors. The launched spectrum is the spectrum that exists before transmission of light through a fiber between a transmitter and a receiver. The received spectrum includes dispersion caused by transmission that is to be compensated for.

For a grating such as a DCG or a matrix or array of DCMs according to an aspect of the present invention, the design of the device is based on a number of optical factors including, but not limited to, the required compensation for the dispersion caused by transmission through the network or fiber. As previously discussed, dispersion is a problem over any significant distance over which light travels in a network and compensation for the dispersion would be helpful to enable improved use of the available spectral capacity for transmission over the fiber or network. The dispersion is calculated, and a DCG is designed which provides an array of dispersion compensation elements, such as for example an AI-generated predetermined arrangement of dispersion compensation elements, arranged in a predetermined manner to compensate for at least some of the dispersion encountered.

In an example, as discussed above this may be accomplished by an array of DCGs or DCMs on a per channel basis for one or more channel or a so called "super" DCG or DCM having multiple dispersion compensation elements, such as for example an AI-generated predetermined arrangement of dispersion compensation elements, arranged to provide different dispersion compensation for different channels in a single device. In all cases different paths are provided for different wavelengths of a given channel spectrum. In an example the outer edges of a channel spectrum are provided with different path from the path of the central wavelength value of the channel.

The communication between the DCG or DCM and either the multiplexer or demultiplexer or their equivalents is also considered in the design of the DCG or DCM and either the multiplexer or demultiplexer. This ensures that the output from the demultiplexer, the drop filters or the like is effectively and efficiently coupled to the DCG or DCM. Similarly, the output from the array of dispersion compensation elements is effectively and efficiently coupled to the multiplexer. The combination of the multiplexing and demultiplexing function, however provided, for example with an array of multiplexing or demultiplexing elements with the dispersion compensation function however provided, for example via an array of dispersion compensation elements is thus a co-optimization provided by the present invention. In addition, the ability to make and manufacture combination devices can also serve to preserve space and minimize the overall size of the chip. This can be achieved through monolithic integration or by means of hybrid devices including appropriate coupling.

Other factors considered in the design process include channel wavelengths used in the multiplexer or demultiplexer and spectral efficiency may require careful consideration along with other channel requirements, modulation formats, and dispersion compensation techniques. Further, the optical power budget to ensure reliable signal transmission and factors including fiber attenuation, connector losses, and dispersion may also be considered. In addition, the geometry and/or dimensions of the device and the required optical port-port spacing may further be considered. These are just some of the inputs that may be required for an AI model within the inverse design process to infer the nature of a possible design for the resultant demultiplexer or multiplexer having the required optical characteristics.

As mentioned previously the features relating to chirp mitigation are also adjusted to compensate for any chirp likely to occur in the required structure. These may be in the form of input data or performance criteria.

The input data is passed through the trained AI model, and outputs are generated based on the inputs. The training data for the process, obtained from physics simulators and the like, includes designs of demultiplexers or multiplexers and their optical characteristics and responses. In this way the model has learned the optical response of known devices and is able to output the required parameters of a device having the input parameters entered as the input.

There are different end points or outputs in the inverse design process. The output could include empirical structural details including the device geometry parameters which include a number of parameters $x_1, x_2, \ldots x_n$. Each parameter may define a position, material and size as examples. An alternative output after running the inputs through the AI-based inverse design process is a pixelated structure, a voxelated structure or a QR type code-like structure which sets out a simple dot-based structure that will provide an example of the restrictions to light passing through the intended structure. The pixelated output comprises a design of materials to form a simplified pixel and/or voxel based demultiplexer having material for two different types which are compatible with the processing technology. The structure defined by the process may be optimized in terms of shape size and materials to design a device that provides the required optical response to the light passing through the device.

FIG. 28a shows an example of an array or matrix of dispersion compensation elements 2802 arranged in a DCG type structure 2800 also referred to as a dispersion compensation matrix (DCM) which is configured to receive a light signal in 2804 and produce a compensated light signal out 2806. The array of dispersion compensation elements comprise a plurality of holes in a passive material such as an InP-based material or other appropriate material. The holes may be round, pseudo round or any other shape as is determined by the AI-based inverse design process. The spacing between the holes may be uniform or non-uniform. The holes may be air-holes having a different refractive index from the surrounding materials. The difference in refractive index helps provide the refractive index difference between the materials which leads to different transmission of light though the materials. It will be appreciated that air-holes provide one feature which changes the relative refractive index between materials but there may be many other materials in combination which provide a similar effect. All combinations materials which provide a required relative refractive index ratio are included as examples of materials in which the DCG, DCM or the dispersion compensation elements may be made. The difference in refractive index between the materials may be either binarized or non-binarized in the AI-based inverse design process.

FIG. 28a shows a 2-D array or matrix of dispersion compensation elements, but may instead by 1-D or 3-D. The variations on the distribution; position, size, profile or any other variable of the dispersion compensation elements, such as for example an AI-generated predetermined arrangement of dispersion compensation elements, is dependent on the required dispersion compensation for the device. The present invention provides a technical effect from the use of the AI-based inverse design process by enabling the design of a manufacturable device which is very compact and small and capable of providing dispersion compensation as required for the use case modelled in the AI-based inverse design process. The AI-based inverse design process generates an output which provides an example of a device capable of generating the required dispersion compensation. The device may be in the form of a DCG or other dispersion compensation device or structure.

Figure 28B:
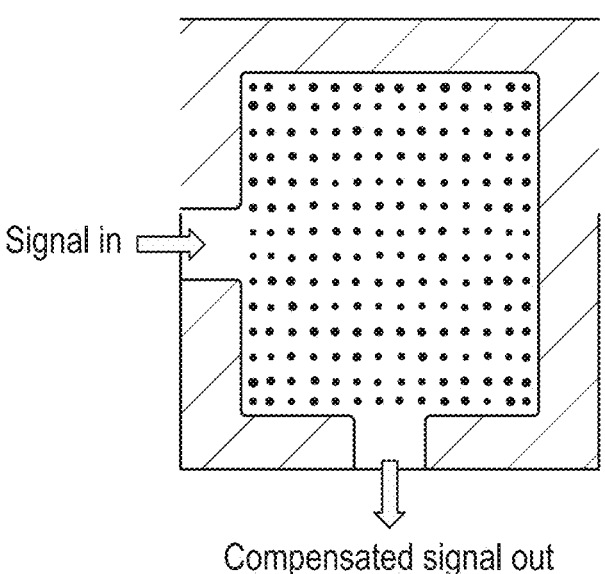
Figure 28C:
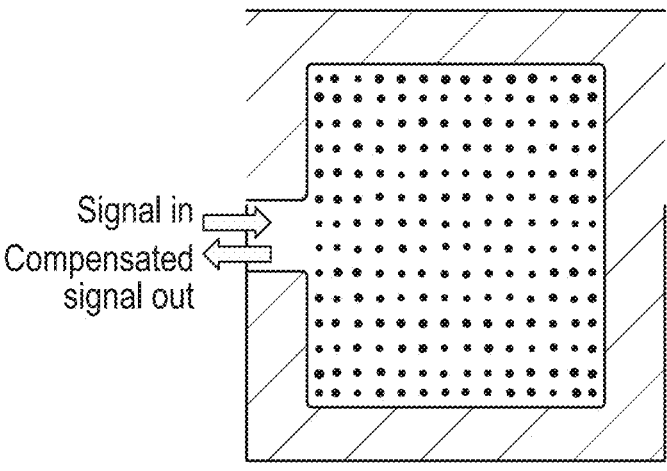

In FIG. 28a the DCM is a transmissive DCM and the signal in is transmitted through the matrix of dispersion compensation elements to generate an output in the substantially the same direction as the input. FIG. 28b shows a diffractive DCM in which the light in is diffracted by the matrix of dispersion compensation elements and exits in a predetermined direction based on the nature of the holes and materials. In this example, this is 90° but the angle of diffraction could be in any required or preferred direction. FIG. 28c shows a reflective DCM in which the light in is reflected by the matrix of dispersion compensation elements and exits in a predetermined direction based on the nature of the holes and materials. In this example this is 180° but the angle of reflection could be in any required or preferred direction.

FIG. 29 shows a 1-D transmission DCG or DCM 2900 in the upper portion and a 1-D reflection DCG or DCM 2902 in the lower portion. The 1-D transmission DCM 2900 illustrates a light signal in 2904, and a compensated light signal out 2906 for a channel. The compensated light signal out is generated by diffraction of component wavelengths through the channel by one of the dispersion compensation elements 2908 forming the transmission DCM 2900. The different dispersion compensation elements 2908 are arranged in a matrix formed in a linear direction along the axis of the direction of transmission of the light. The different dispersion compensation elements 2908 have different optical characteristics, such as thickness, spacing, width and the like. Each of the different dispersion compensation elements 2908 provides a different amount of dispersion compensation of the component wavelengths through the channel. The shape, profile, size and materials of the dispersion compensation elements 2908 are determined by the AI-based inverse design process to provide the required dispersion compensation.

Also shown in FIG. 29 is a 1-D reflection DCM 2902. The 1-D reflection DCM 2902 illustrates a light signal in 2910, and a compensated light signal out 2912 for a channel. The compensated light signal out is generated by reflection of component wavelengths through the channel by one of the dispersion compensation elements 2914 forming the reflection DCG 2902. The different dispersion compensation elements 2914 are arranged in a linear direction along the axis of the direction of transmission of the light. The different dispersion compensation elements 2914 have different optical characteristics, such as thickness, spacing, width and the like. Each of the different dispersion compensation elements provides a different amount of dispersion compensation of the component wavelengths through the channel. The shape, profile, size and materials of the dispersion compensation elements are determined by the AI-based inverse design process to provide the required dispersion compensation.

The DCM or DCG of can be designed and fabricated alone and form a dispersion compensation component. As previously stated, the DCM or DCG may also or alternatively be designed in combination with one or more other passive devices. In examples the combinations may include, but are not limited to, DCM/DCG with a multiplexer; DCM/DCG with a demultiplexer; DCM/DCG with a multiplexing functionality component; and DCM/DCG with a demultiplexer functionality component. Further the previous combination may be further combined with other components on a photo-electric chip either as a monolithic chip or as multiple chips including the required coupling and connections for respective optical and electrical communication. The other components include, but are not limited to passive devices such as gratings, grating couplers, couplers, multiplexers or adders and demultiplexers or filters in combination or not, with or without photodiodes, TIAs and the like.

In some cases, the materials used to make the device are compatible with InP-based materials used for photonic and electronic components. This is by way of example and devices made of other materials may be considered and designed if required.

From the AI-based inverse design process output a candidate device can be designed that can be tested by simulation or the like without committing to a physical structure being fabricated. If this output is failing in any way the design can be remodeled using new inputs that take into account, the deficiencies of the design and a new design can be generated. Changes in the optical response can be modeled, tested and then remodeled by simply changing the inputs and re-running the AI-based inverse design process until a structure having the necessary optical characteristics and is compatible with the In P-based fabrication process is reached. This means there is no detailed fabrication until a suitable pixelated structure or voxelated structure has been confirmed as a likely candidate to produce the required optical and fabrication-based characteristics.

A third output for the AI-based inverse design process may be a full topological structure which once built can be tested to determine if this has satisfactory optical characteristics. Re-modelling may be required after testing and the topology may be output in any necessary format as required.

Figure 30A:
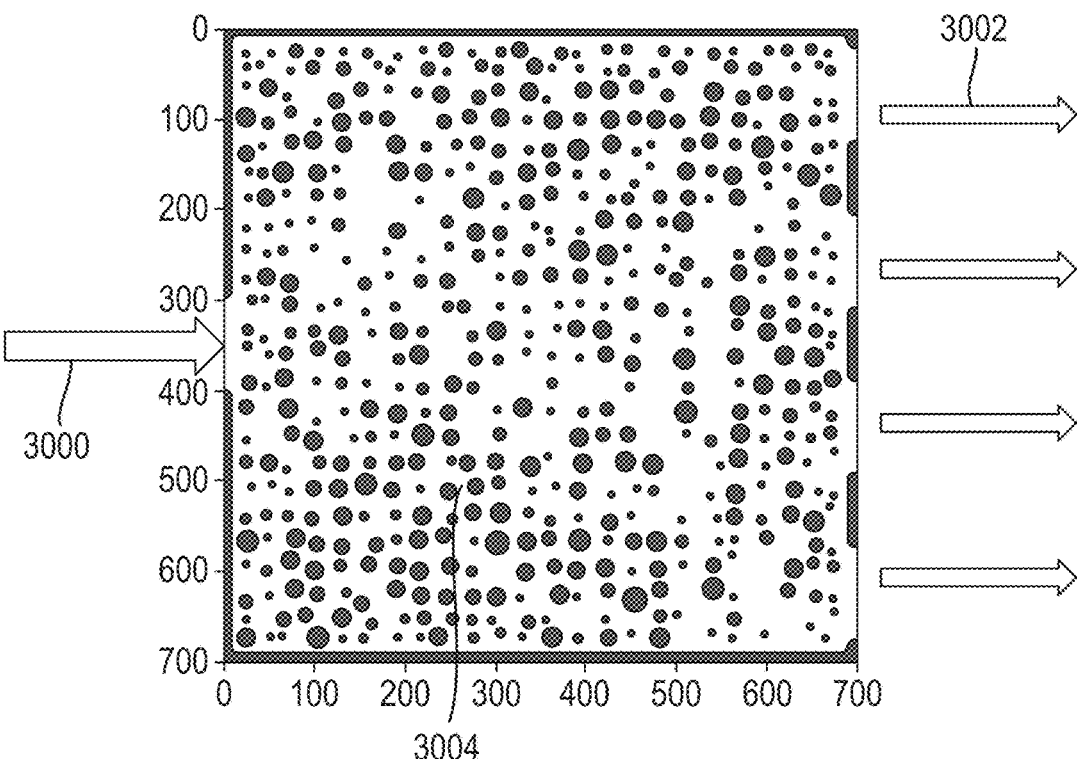
FIGS. 30*a* and 30*b* are schematic drawings showing examples of a demultiplexing and multiplexing matrix of demultiplexing or multiplexing compensating elements designed using an AI-inverse design process.
Figure 30B:
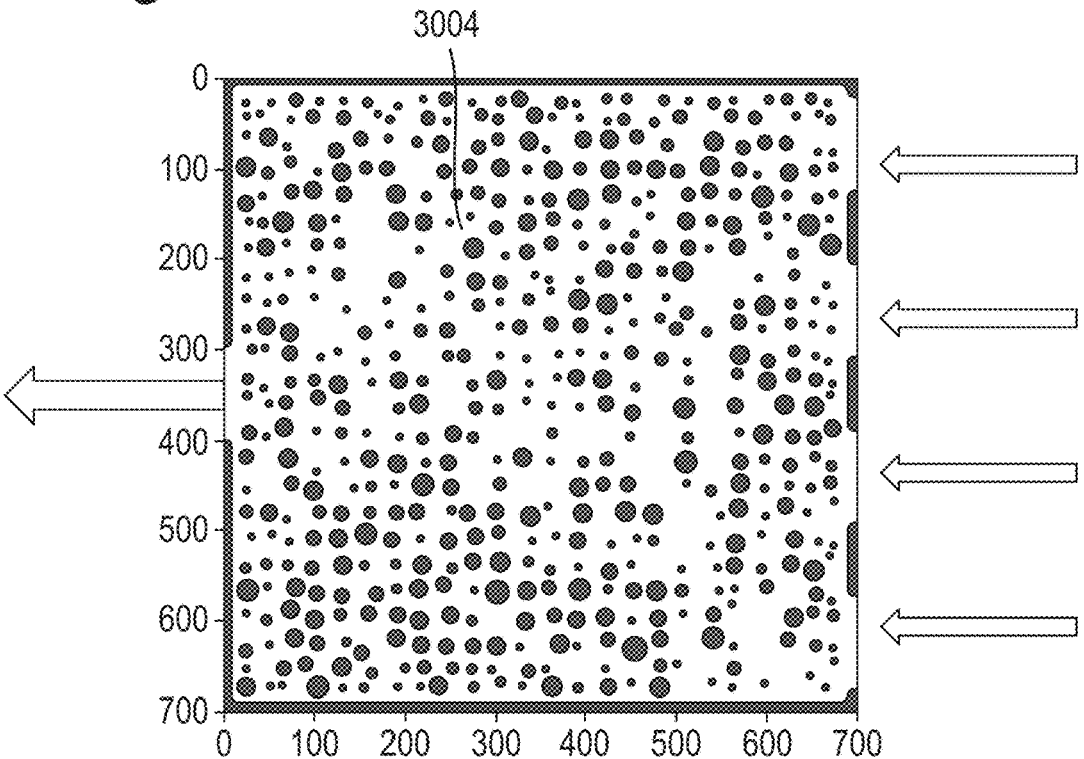

FIGS. 30a and 30b shows example devices in the form of respectively a four-channel demultiplexer 3000 and a four-channel multiplexer 3002. The devices is designed using an AI-based inverse design process. The device comprises an array or matrix of demultiplexing or multiplexing elements 3004 arranged in a 2-D matrix, but may instead be a 1-D or 3-D array or matrix. The array of elements comprises a matrix of AI-generated demultiplexing elements in FIG. 30a and a matrix of AI-generated multiplexing elements in 30b. The variations on the distribution; position, size, profile or any other variable of the demultiplexing or multiplexing elements are dependent on the required requirements for the required demultiplexing or multiplexing function required to be produced by the device in terms of light in and light out for the device. The present invention provides a technical effect from the use of the AI-based inverse design process by enabling the design of a manufacturable device which is very compact and small and capable of providing demultiplexing or multiplexing effect as required for the use case modelled in the AI-based inverse design process. The AI-based inverse design process generates an output which provides an example of a device capable of generating the required demultiplexing or multiplexing function. The multiplexing device can be designed for a multiplexer, including a plurality of multiplexing elements, enabling multiple streams of light to be multiplexed into a single stream for transmission through a fiber. The array of multiplexing elements comprises a plurality of AI-generated multiplexing elements.

FIGS. 31a to 31e are schematic drawings showing examples of arrangements or configurations of dispersion compensating elements including multiple unit cells forming a combination thereof for a designed dispersion compensation effect.

A DCM, multiplexer or demultiplexer comprises a matrix of materials. These may be a material and air; or any material which has a λ0 value in a region of interest and has a high enough refractive index contrast could be used to form the DCG, DCM or dispersion compensation elements. In an example consider a design area in 2-D (for simplicity) of 10 μm×10 μm, which is discretized (or pixelized) in small pixels or voxels of size 100 nm×100 nm (effectively 1000× 1000 pixels or voxels). A pixel can be "turned on" (a pixel is designated to be Si) and "turned off" (a pixel is designated to be SiO₂; a hole filed with air or another dielectric). Within this design space the AI-inverse design process searches for a solution that is capable of performing a required function, be it dispersion compensation, multiplexing, demultiplexing or whatever. In examples of the invention this may include one or more of a dispersion compensation function, a multiplexing function, and a demultiplexing function.

In normal semiconductor processing techniques, it is possible to make features of a device having a "minimum feature size", which equates to that which is physically manufacturable using a certain process. This could be anything between 40 nm to 400 nm depending on the processes, as well as the features' profiles immediately next to the given location. So, if the manufacturing process can reliably produce smaller features the design space is larger, and greater number of characteristics can be used to design the relevant device. The corollary of the design space being large is the need for more efficient optimization algorithms in the AI-inverse design process to traverse the design space and find the good devices, thereby adding to cost and computational burdens. To optimize the former and mitigate the latter a minimum features size may be selected. Simulation and optimization of large devices whilst possible in theory has proved to date to be computationally unrealistic. At present design devices larger than 30 μm×30 μm are computationally too burdensome and convergence is not easy. An optimal size for AI-inverse design in the addressing the technical problems addressed by the present invention has been determined to be of the order of ~20 μm×20 μm from a computational resources point of view. This is an example and is expected to change as technology advances. As such these examples are not in anyway intended to be limiting.

The requirement for a minimum features size may be necessary in the AI-inverse design process or also for other reasons. For example, as noted, the computational burden for any AI based process is enormous. This is compounded by the many parameters and variable needed to design semiconductor devices. One manner in which the design is tested is to manufacture the device. This is a complex and costly process. If the device does not work the redesign and further testing adds significantly to time and cost in a manner that very quickly becomes unacceptable. The larger the device the greater the time for processing. If the device is 2D or 3D the computational effort is often not even possible. This is a major issue in using AI-inverse design tools for semiconductor device and the manner in which they are fabricated. Accordingly, there is a need to address the manner in which AI-inverse design tools are used for the design of manufacturable semiconductor devices.

Of further interest, in an aspect of the invention, is the need to design and manufacture a device capable of compensating for chromatic dispersion over a certain length of fiber, for example. For the technology today the fibers are long and the compensation for chromatic dispersion becomes greater the longer the length of the fiber, as discussed above. Making a larger device might provide the necessary functionality but will not be practical due to the size of the device required and the space available for such devices. The combination of seeking to mitigate chromatic dispersion compensation and to provide a device capable to do this which is not too big, and which is suitable for the lengths of fiber used today and in the future is very difficult.

For the AI-inverse design process to converge to a solution a certain minimum features size may thus be required. Just making something smaller is not enough to ensure a small-scale device that actually does what it is intended to do. Similarly making a device that does the intended function may be too big for the available chip real estate available for devices. To ensure convergence of a workable design to address the technical problem of compensating for chromatic dispersion generated over a fiber the applicant has taken a different and technically inventive approach. The present invention recognizes that the need for an optimal feature size to ensure the AI-inverse design process converges might not give rise to a device that is capable of compensating for the chromatic dispersion predicted by the necessary fiber length. Aspects of the invention are provided to address this problem and provide a technical solution.

As previously mentioned, one way to address the challenges of designing a device having the necessary dispersion compensation for the fiber lengths anticipated is to make use of a unit cell DCM. This is a small sized device (unit-cell) which has converged via an AI-inverse design process to provide a known compensation for dispersion caused by a known wavelength passing through a known length of fiber. This unit-cell is a building block for creating an array or arrangement of unit cells in a predetermined configuration to fit a certain space (in terms of area on a chip) and provide the required compensation for the fiber in question.

FIGS. 31a to 31e show a number of non-limiting examples of possible unit cell arrangements which may be created to provide a known amount of chromatic dispersion compensation. An arrangement of DCM unit cells may include a plurality of unit cells arranged in numerous combinations with one DCM unit cell being connected to a next in a known sequence, direction and/or orientation. In an aspect, each of the DCM unit cells is the same, but this is just a preference and not a requirement. In an example, the unit cell may be 18×18 μm or 32×32 μm. In other examples the unit cell may be rectangular or any other appropriate shape and arrangement of elements. Alternatively, different DCM unit cells may be combined with one another, although this is not the optimum from a processing point of view.

The required number of unit cell DCMs is determined by the ratio of the Fiber chromatic dispersion ($CD_{fiber} \cdot L_{fiber}$) divided by the dispersion compensation provided by the DCM ($DC_{DCM}$). As it is only possible to have a whole number of devices, it may be necessary to round up/down the number of unit cells to be a whole number. This may depend on a variety of factors.

The formula for the number of unit cells of dispersion compensating devices required is given by:

$$N_{DCM} = \text{Round}\left[\frac{CD_{fiber} \cdot L_{fiber}}{DC_{DCM}}\right] \qquad \text{Eq. 4}$$

where, $N_{DCM}$=number of dispersion compensating devices required; $CD_{fiber}$=chromatic dispersion coefficient of the fiber (ps/nm/km); $L_{fiber}$=length of the fiber (km); and $DC_{DCM}$=dispersion compensation provided by the DCM (ps/nm).

Based on the dispersion compensation provided by a unit cell DCM it is possible to combine multiple unit cell DCMs to provide a specific channel dispersion compensation. In examples unit cell DCMs are joined together in a predetermined configurations, such as for example in a chain or sequence, with an output of one unit cell forming the input of the next unit cell in the chain. Within the chain or sequence the inputs and outputs of respective cells may be aligned centrally or offset in some manner. In some configurations there may be connections between all unit cells in an arrangement or configuration and in others there may be only some connections made between the unit cells. This may be used to vary the amount of dispersion compensation provided.

For example, a configuration of nine unit-cells arranged in a 3×3 array may only have the top row connected together for dispersion compensation at a first wavelength or for a first channel. A different combination of unit cells may be connected in a sequence or chain by connection of different ones of the unit cells to one another and by an order thereof for different wavelengths or channels. This means a standard configuration of unit cells could be made for multiple channels with the same or different unit cells and certain one of the configuration being connected in a sequence or otherwise to provide the dispersion compensation for each channel. The predetermined configuration of unit cells may include a plurality of unit cells in an array or any spatial position that enables the maximum use of the available space for the unit cells. In examples the configuration of unit cells may be 1-D, 2-D or 3-D. The configuration may be uniform or non-uniform. A uniform configuration may comprise a number of uniform unit cells each being substantially similar to one another and arranged in a uniform arrangement. A uniform arrangement may comprise a grid or array of elements in rows and columns in an example. The rows and columns may be uniformly spaced from one another or may be non-uniformly spaced. The uniformity may come from the cells being the same or changing from one to the next in a uniform manner.

The input to one unit cell could be on one side and the output of the or each cell could be on the same side or any other side of the unit cell. The path across the unit cell may be in any direction as determined in the design thereof. Examples include from top to bottom, from side to side, diagonally or any other example or combination of examples. The path made through the unit cells in a configuration may be determined on a per channel basis and be necessary to provide the dispersion compensation required. The path through individual unit cells may be the same or different for each unit cell.

Figure 31A:
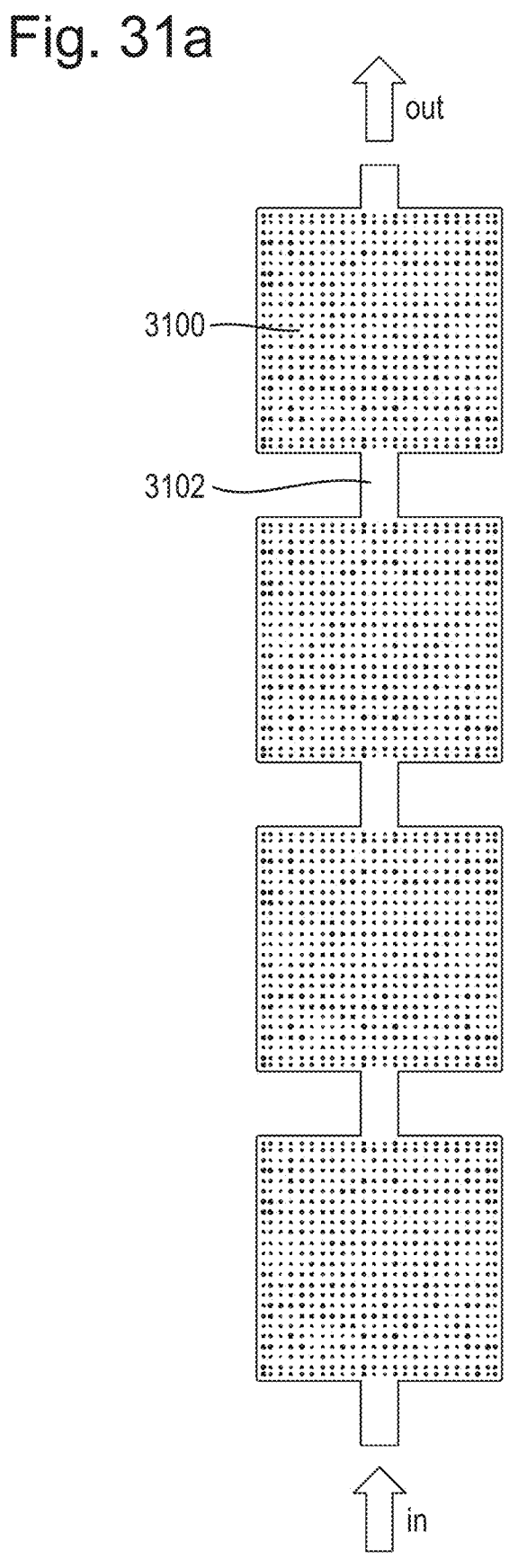
Figure 31B:
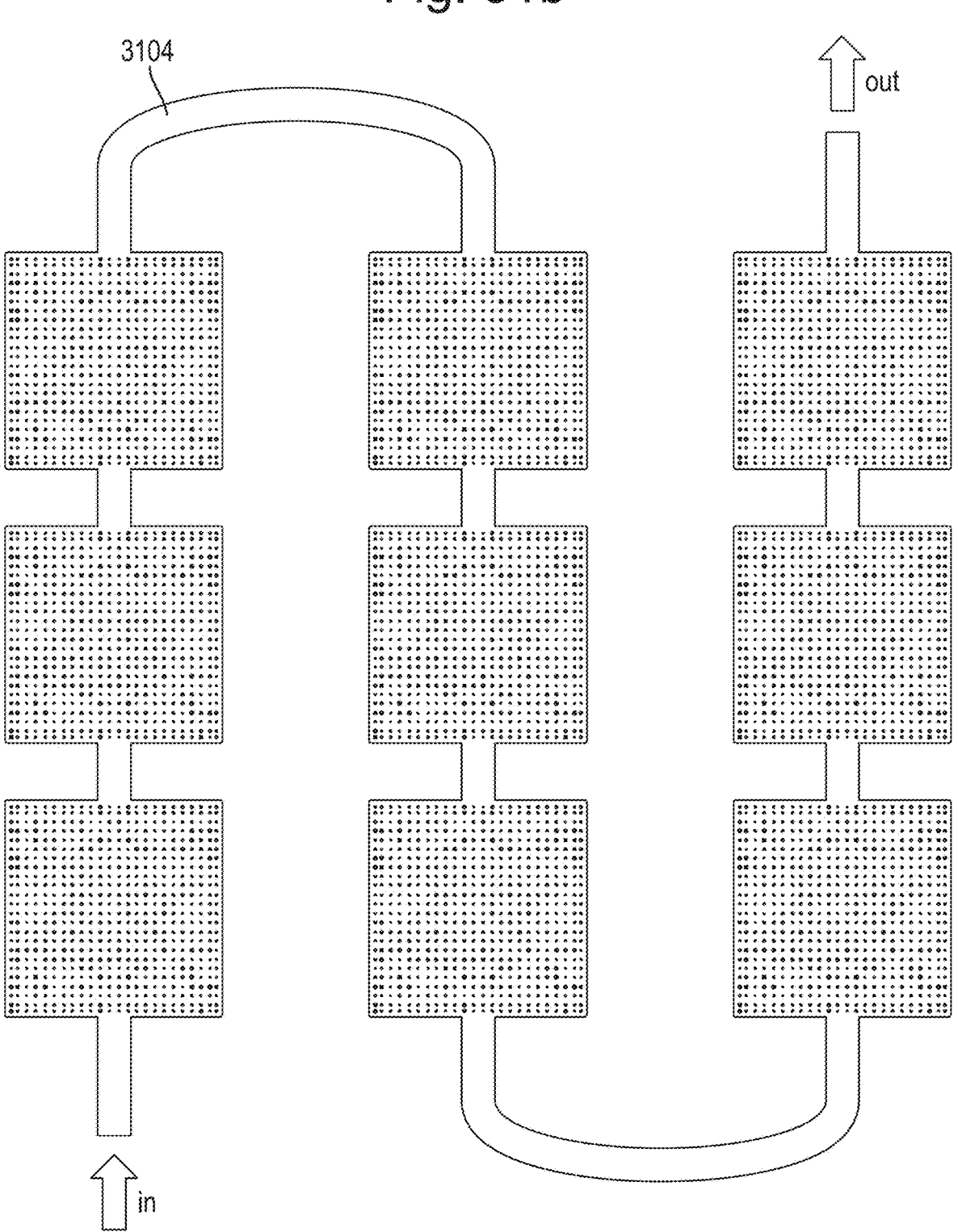
Figure 31B:
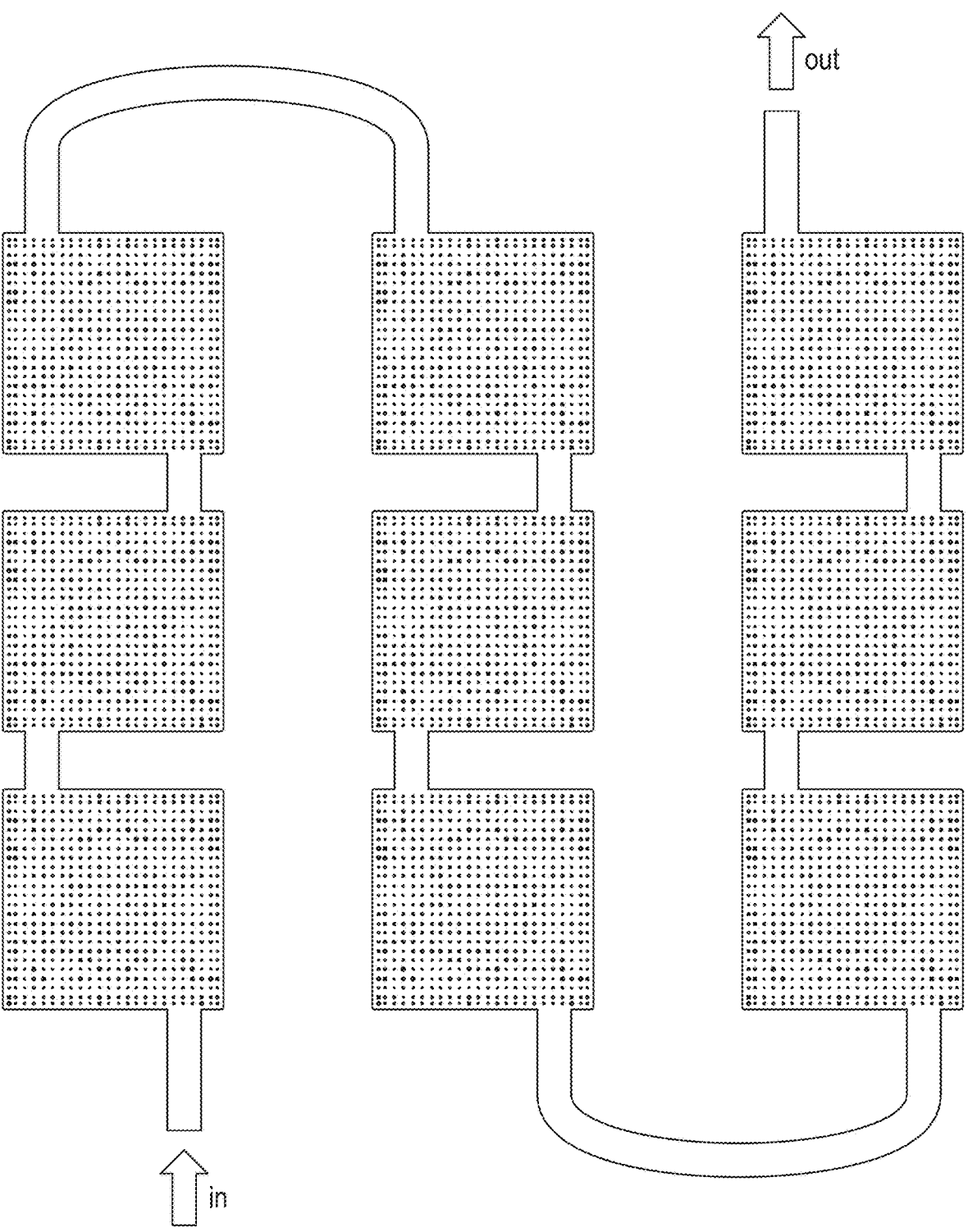
Figure 31D:
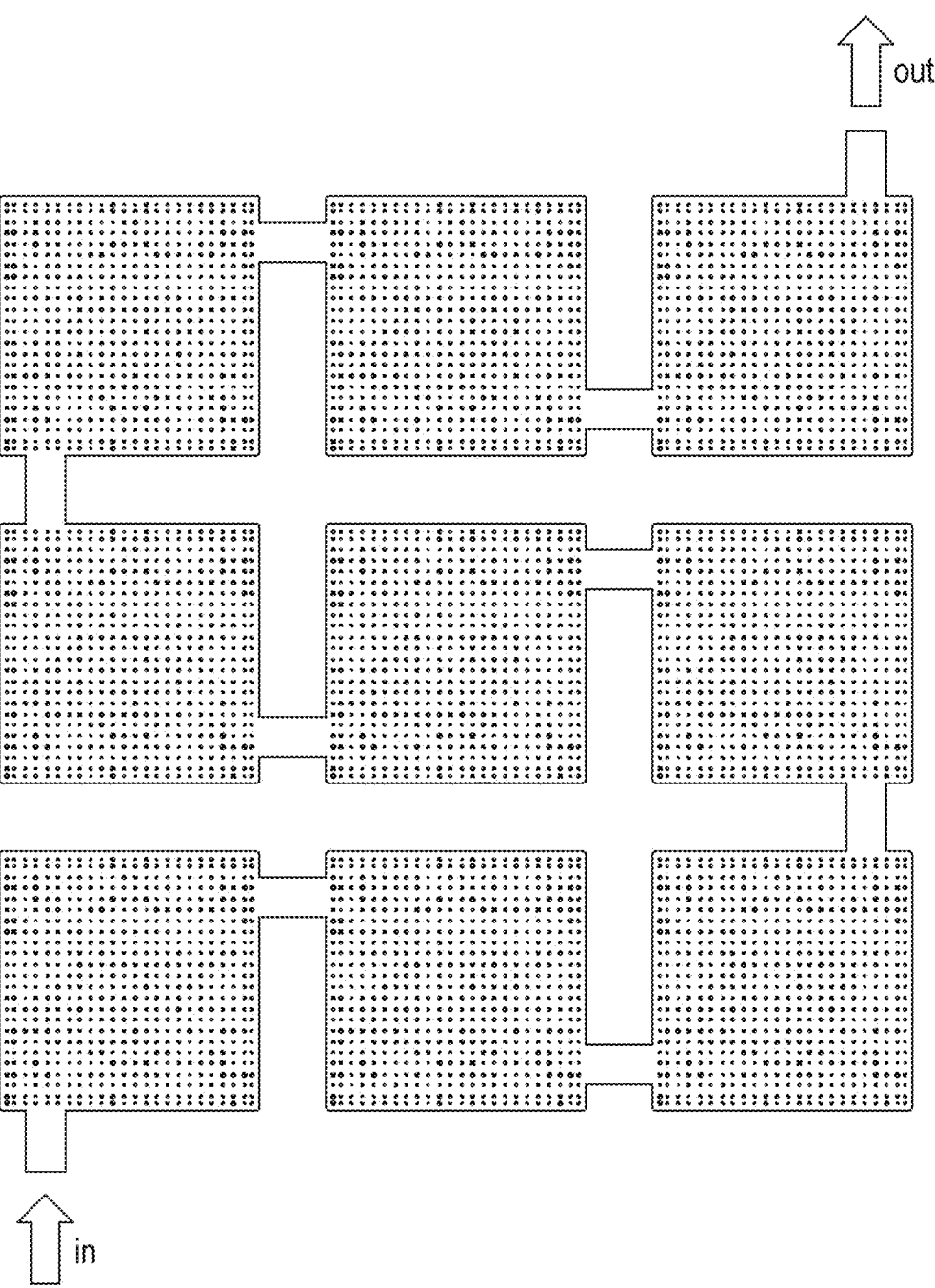
Figure 31E:
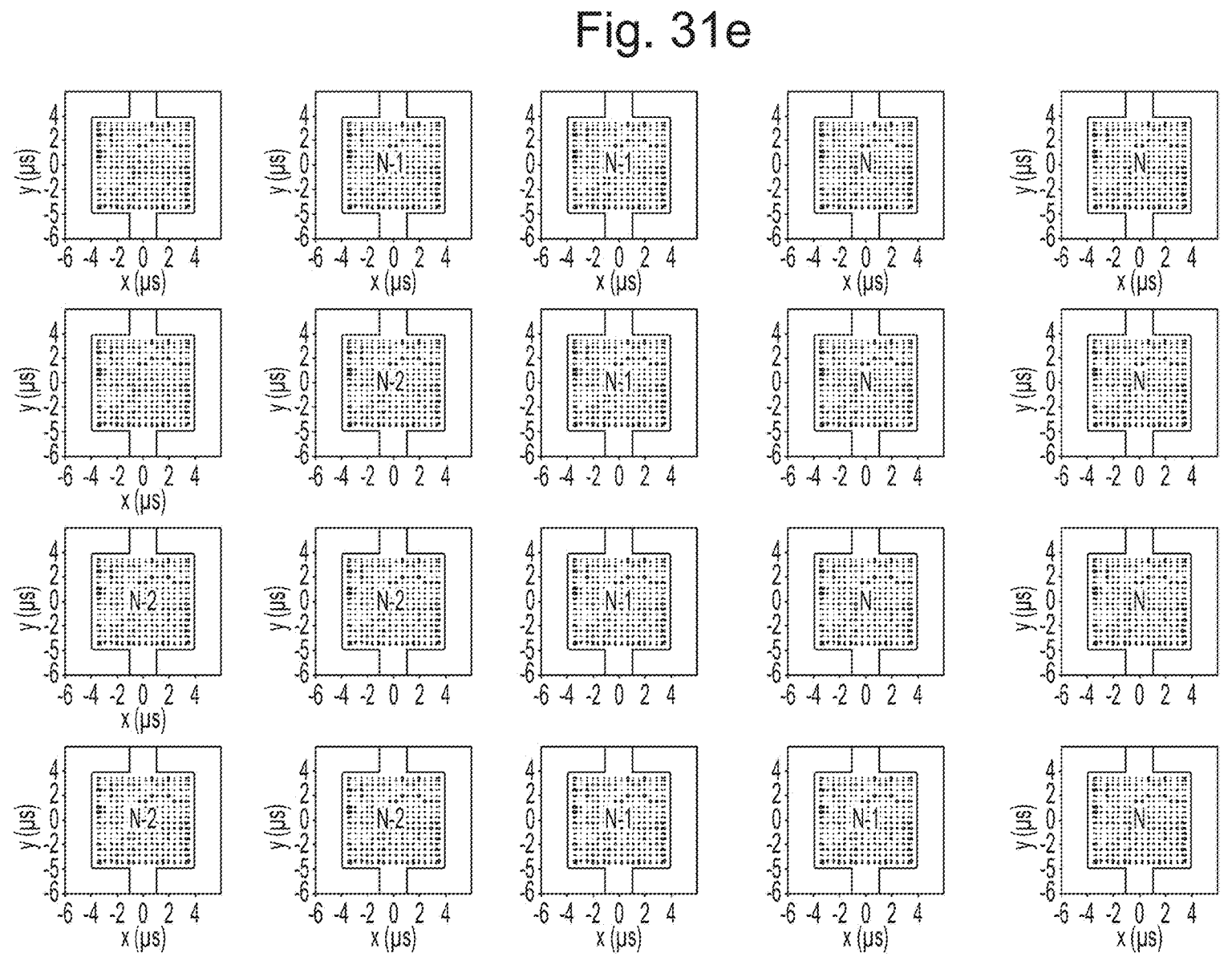

In the examples, FIG. 31a shows a linear arrangement of DCM unit cells 3100. In each case the unit cell includes a central input and output arranged in the substantially the same direction and connected one to the next in a sequence by a connector 3102. FIG. 31b shows an extension of the FIG. 31a arrangement with more unit cells connected in a linear arrangement and including a long connection 3104 between respective columns of unit cells. FIG. 31c deviates from FIG. 31b in that the unit cells operate across a diagonal and the input and outputs of each unit cell are diagonally opposite one another. In this example the unit cell gives different dispersion compensation than the unit cell in FIG. 31b. FIG. 31d shows a fourth arrangement where there is a grid of unit cells connected angularly with one another. FIG. 31e shows a unit-cell DCM array 3106 having a plurality of unit cells in a block. These unit cells are not shown with connections as the connections are determined by the design and are made based on the required dispersion compensation effect required for a specific channel. A set of unit cells may form channel N (the one with the most dispersion). In the example there are 7 channel N unit cells, 6 channel N−1 unit cells and 5 channel N−2 unit cells. These do not need to be collinear. In an example, it is possible to arrange the unit cells in any matrix order provided the input/output is continuous between cells of a given channel. In addition or alternatively, there may be a waveguide output to input and output on a per-channel basis. The connections are made between selected ones of the unit cells so that the overall path through the array provides the required dispersion compensation. The relative positions of the unit cells are shown in a grid but other shapes may be considered such as rectangular shapes, curved shapes, spirals and the like. An objective being to minimize the chip space used for the combination of unit cells and the required connections therebetween for the desired dispersion compensation.

For the AI-inverse design process of a unit cell to be used for more than one channel, additional characteristics may form part of the design parameters for output from the process. For example, if a unit cell is to be used for multiple channels the design may be adapted for it to be configured to be broadband in nature. In an example, the design may be configured to be used in a wide-bandwidth data transmission that is adapted to exploit signals at a wider spread of frequencies or several different simultaneous frequencies. The input for the AI-inverse design process may be varied in other ways to ensure the output design is that required to achieve the required functionality of the device.

For the purposes of interpretation, a unit cell may be considered as a dispersion compensation element as claimed. A plurality of dispersion compensation elements may comprise individual elements making up a DCM or a plurality of unit cell DCMs making up a matrix or any other arrangement of unit cells each having one or more dispersion compensation elements therein.

In the examples shown there are four-channel devices but it will be appreciated that the devices could have a different capacity and provide multiplexing and demultiplexing elements in a different form, type or arrangement for as many channels as are required. As stated elsewhere the multiplexing and demultiplexing elements may be designed alone or in combination with other components or devices, including but not limited to DCGs, DCMs devices such as gratings, grating couplers, couplers, adders and filters in combination or not, with or without photodiodes, TIAs and the like.

The present invention provides a considerable smaller size of device than is possible by traditional design techniques. Using AT-generated devices can result in minimization by factors of $10s$ and $100s$ for DCMs, DCGs multiplexers, demultiplexers and other related devices as compared to current design techniques. The designs are beyond mere miniaturization and provide a new manner in which to combine materials that provide a functionality which is not predictable by scientific principles alone.

An aspect of the present invention is that the use of optical responses in the InP-based waveguide provides very small physical sized PDs. For example, each WG-PIN PD may have a waveguide ridge having a width in the order of 2-3 μm and a length in the order of 30 μm and even as little as 15 μm. This gives a physical width to the PD, including contact areas for metallization of between for example about 15-20 μm. The PDs may be laterally separated by for example a spacing ~10 μm. These dimensions would result in a port-to-port distance between PDs of the order of for example ~25-30 μm. As a result, for an 8-channel demultiplexer to be comparable with these dimensions the demultiplexer only needs to be of the order of for example about 150-250 μm. It will be appreciated that these dimensions are very approximate, but it can be seen that a demultiplexer according to an aspect of the present invention can easily be several times smaller than traditional waveguide demultiplexers. It will be appreciated that similar calculations apply to an 8-channel multiplexer. If the demultiplexer (or the multiplexer) has more channels the size will approximate multiplication of the number of PDs and the port-to-port size. In addition, as different sizes of devices (such as PDs) are possible for different types of materials different minimum sizes may be possible and the sizing to the AI-based inverse design features will be adjusted accordingly. This would include at least that which is necessary to provide an input to the TIA.

It should also be noted that the high-index-contrast afforded by the use of semiconductor/dielectric/air materials combined with AI-based design also greatly reduced the size of the DCG or DCM relative to the large amount of dispersion compensation required for high-bandwidth communication systems. It is further noted that the relative sizes of devices including a DCG or DCM with a multiplexing or demultiplexing functionality is a great improvement over other types of design.

When using the AI-based inverse design process to generate the afore mentioned pixelated, voxelated or QR type code-like structure it will be appreciated that a workable device at the sizes suggested is achievable working with materials from the InP-based material system, comprising binary, ternary, quaternary and other compositions of In, Ga, As, P, Al and Sb. and compatible dielectric materials and metallization layers. Other types of output from the AI-based inverse design process are similarly achievable in InP-based materials.

A further output from the AI-based inverse design process is an indication of the materials that may be used to fabricate the multiplexer or the demultiplexer, e.g. suitable semiconductor and dielectric materials having required optical characteristics, such as refractive index. These include III-V semiconductor materials such as Indium phosphide (InP)-based materials system comprising binary, ternary, quaternary and other compositions of In, Ga, As, P, Al and Sb.

The output from the model is a set of design parameters for one of geometry parameters of the multiplexer, a pixelated or QR type code-like structure which sets out a simple dot-based structure, or a full topological structure that meets the required optical response inputs.

In the case of either the demultiplexer and the multiplexer irrespective of the output the model can be used to generate the device layout of the demultiplexer and the multiplexer to accommodate the channel spacing which is then used in the receiver and transmitter respectively as described above.

An array of dispersion compensation elements, such as for example an AI-generated predetermined arrangement of dispersion compensation elements, demultiplexing or multiplexing elements can be designed together in some aspects of the AI-based inverse design process. In addition, the design may be further extended to include other devices for integration with a receiver or a transmitter as described herein. Further the AI-based inverse design process can be used to design the couplers and other structures required to enable a full end to end solution for combined transmitter and receiver to enable communications at high-speeds and with small scale devices and structures. Where different materials are used for different devices the nature of the coupling requirements can be provided by the AT-based inverse design process.

Fabrication comprises providing an epitaxial layer structure in which an HBT epi-layer structure is provided on the substrate, with an overlying PIN epi-layer structure. That is the TIA circuitry comprising InP HBTs is fabricated on the SI InP substrate, for high-speed operation of the HBT. The InGaAs PIN is formed by overlying epitaxial layers, separated by a spacer layer, so the optical performance of the photonics devices is not degraded by the underlying conductive layers of TIA circuitry, and the speed and performance of the underlying TIA circuitry can be optimized independently. Also, since the HBT epi-layers of the epitaxial layer stack forming the HBT electronics are distinct from the PIN epi-layers of the epitaxial layer stack forming the PIN, each can be optimized separately. If required a spacer comprising one or more intermediate layers between the HBT epi-layers and the PIN epi-layers may be provided, e.g. to provide electrical isolation, to act as an etch stop to facilitate processing, etc.

As illustrated schematically, the area of the TIA circuitry may be isolated from the area of the PIN by a dielectric filled trench. By integration of the HBT electronic circuitry for the TIA and the PIN detector as illustrated schematically, layers of the HBT epi-layer stack and layers of the PIN epi-layer stack may be independently structured and optimized for improved device performance. If required, materials of the epitaxial layer structure may be selected to be compatible with a single epitaxial growth, or alternatively, multiple epitaxial growths may be used, as appropriate. Different processes may be used for fabrication of the HBT epi-layers and PIN epi-layers. For example, in practice, MBE (Molecular Beam Epitaxy) may be used to provide the HBT epi-layers, and MOCVD (Metal Organic Chemical Vapor Deposition) may be used to provide the PIN epi-layers. A semi-insulating spacer may be provided between the HBT epi-layers and the PIN epi-layers. In other embodiments, it is preferred to select an epitaxial layer structure for the HBTs and the PIN which is compatible with single epitaxial layer growth.

In designing the TIA, reducing capacitance allows for a higher transimpedance feedback resistance $R_F$, to increase gain, and the TIA noise is inversely proportional to the feedback resistance $R_F$. It may be beneficial to match the capacitance of the TIA to the device capacitance of the PIN. Since there are a number of parameters that can be adjusted to achieve the required DEMUX-DCG/DCM-PIN-TIA performance, it may not be necessary to minimize the capacitance of the PIN. With respect to the ground pads of the PIN, it may be beneficial to use multiple pads, e.g. two pads will double capacitance, and halve inductance, e.g. use of multiple wire bonds for the ground pads reduces bond wire inductance (e.g. ~1 nH/mm for 25 m bond wires). In designing the PIN, if the responsivity, i.e. A/W, of the PIN is made high enough, so that the SNR in the PIN is higher, the PIN provides a higher input signal to the TIA. This means even if the TIA is noisier (e.g. from lower $R_F$, from higher capacitance) the integrated DEMUX-DCG/DCM-PIN-TIA will provide improved SNR.

Monolithic integration of an InGaAs PIN using InP HBTs for the TIA provides a solution to a problem that is not easily solvable with silicon photonics comprising normal incidence, e.g. front-entry geometry, Germanium (Ge) PINs.

The monolithic integration approach described herein for reducing parasitic capacitances of the photodiode detector, and then adjusting other parameters of the PIN and TIA to improve quantum efficiency, e.g. to meet sensitivity and responsivity specification for high data rate applications may also be extendible to other types of photodiode detectors, e.g. unitary transit carrier (UTC) photodiode device structures and waveguide PIN geometries, et al.

Monolithic integration of the DEMUX-DCG/DCM-PIN-TIA eliminates hybrid integration parasitics such as, bond pad capacitances, wirebond resistance/inductance/etc., and direct interconnection of the DEMUX-DCG/DCM-PIN-TIA provides lower capacitance by eliminating bond pad capacitance, and provides a direct (short-length) lower inductance/lower resistance interconnection. Reduced bond pad capacitance provides associated degrees of freedom to provide improved bandwidth for a PIN of given dimensions and reduced noise. This also provides a very thin, compact demultiplexer.

In another aspect the photonics components DEMUX, DCG or DCM and multiple WG-PDs may be monolithically integrated on a SI substrate, and the photonics chip hybrid integrated with an electronics chip comprising the plurality of TIAs.

As used therein the term light is intended to include all visible and nonvisible radiation which may be transmitted from one place to another to facilitate communication at high-speeds.

In an example, the DCG or DCM is a reflective element meaning that the grating comprises a plurality of reflective surface configure to reflect light incident of the grating. In other examples, the dispersion compensation grating may operate in transmission, that is the light that is transmitted out the other end from which it impinges upon is dispersion compensated. More generally, the DCG or DCM may operate in "diffraction" mode, that is the light that is scattered in some direction in the plane of the array of grating elements. Transmission gratings (DCGs) may be in 2-D or 3-D configurations with a variable spacing density.

Vertical optical coupling using laterally tapered vertical optical couplers requires appropriate selection of bandgap wavelength and refractive index as will be known to the skilled person. Vertical integration through a laterally tapered vertically optical coupler, based on Multi-guide vertical-integration (MGVI) fabrication, provides for integration of components in a device structure that may provide increased reliability compared to conventional butt-coupling of devices. The structure of the laterally-tapered vertical optical couplers of the exemplary embodiments provides efficient vertical optical coupling between the devices. The epi-layer structure for the vertically integrated waveguides for the devices can be designed to reduce stress/strain between the optical components, and the vertically integrated devices avoid a high stress/strain interface region between conventionally butt-coupled devices.

The SI substrate is beneficial in reducing device capacitance. In addition, Quantum Efficiency and other parameters, such as sensitivity, responsivity and dynamic extinction ratio are also improved. For fabrication on an SI substrate there is reduced overall capacitance which improves electrical performance. The receiver has improved sensitivity and responsivity of, for example, a WG-PIN PD. The transmitter has a dynamic extinction ratio of, for example an electro-absorption modulators (EAM) which provides improvements over other designs.

In co-pending U.S. provisional patent application No. 63/766,464, filed Mar. 4, 2025, entitled "Optical Monolithically Integrated Devices", which is incorporated herein by reference in its entirety a design for an optical receiver comprising a demultiplexer (also referred to a DEMUX), a waveguide photodiode (WG-PD), and electronic circuitry and an optical transmitter comprising electronic circuitry comprising an electro-absorption modulator (EAM) driver, an EAM and a multiplexer (also referred to a mux) are described.

The array of dispersion compensation elements such as for example an AI-generated predetermined arrangement of dispersion compensation elements, in whatever form of the present invention may be combined with either a DEMUX or a mux in the receiver or transmitter respectively. This allows for co-optimization of a DEMUX and an array of dispersion compensation elements; or a mux and an array of dispersion compensation elements in respective combined devices. In each case the design and manufacture of an optical receiver and an optical transmitter make use of the AI-generated devices. e.

Monolithically Integrated PD-TIA of Other Embodiments

In other embodiments, the design principles disclosed herein for monolithic integration a DEMUX-DCG/DCM-PIN-TIA comprising an InGaAs PIN and a TIA circuitry fabricated with InP HBTs may be extended to monolithic integration of other types of photodiode with a TIA. Other types of photodiode detectors include, e.g. a Uni-Travelling Carrier (UTC) PD; a waveguide PIN; a resonance enhanced cavity PD; and an APD. To the Applicant's knowledge, monolithic integration of these types of PD with a TIA is not generally considered. However, to the extent that these device structures can be fabricated to be compatible with HBT technology, e.g. InP HBTs, or HBTs fabricated with other compatible semiconductor materials systems, other options for monolithically integrated PD-TIA with improved performance include the following types of PD:

UTC (uni-travelling carrier) PD. For further bandwidth improvement, a UTC PD design could be used. The benefits of UTC are well-understood. This design is likely to be compatible with HBT technology.

Waveguide pin. A waveguide pin can get as close to 100% responsivity as possible. For ultra-high speed and near-100% responsivity this may need to be accompanied by a traveling wave electrical signal. Traveling wave waveguide pins and modulators are well known in the literature.

Resonance enhanced cavity photodiode (or Resonant cavity enhanced (RCE) PD). This is an interesting option, because the basic idea is to use mirrors to get multiple, not just two, passes through the absorption region for maximum absorption for minimum absorption layer thickness. This device structure also provides a high selectivity of QE vs. wavelength, i.e. one wavelength of absorption is favored. This arrangement would work well for OLT having a well-defined specific wavelength, e.g. 1577 nm, or other applications for which the wavelength is well defined. The transit time is quite fast because the absorption layer is thin, and the performance is limited by capacitance.

Eliminating bond pad capacitance through monolithic integration with a TIA, presents an attractive route to achieving a minimum, or at least substantially reduced, absorption thickness limit for a given bandwidth, to increase or maximize the advantage of resonant cavity enhancement.

APD. Currently available APDs struggle to get the bandwidth at 10 GHz and above. Monolithic integration of an APD and TIA reduces the device capacitance $C_{APD}$ of the APD, allowing, by an argument analogous to that above, a better chance of achieving a required bandwidth. Si APDs are known to be far superior to InP-based APDs in terms of excess noise, because of primarily electron injection into the multiplication region.

Although there are significant improvements to InP-based APDs, the carrier ratio at high gain implies that there is limited gain-bandwidth (GBW) product; further implying the need for additional improvements to make InP APDs practical for ultra-high-speed use. For a monolithically integrated InP APD-TIA, a goal would be to try to reduce the carrier transit time. The transit time is multiplied by two for a SAGCM (Separate Absorption, Grading, Charge and Multiplication) APD, once to get the carriers to the multiplication region, and the other for the multiplied carriers to return to the opposite contact area. In this design, the PD capacitance would be increased, which would not usually be desirable, but this increase in capacitance is compensated for by the reduced capacitance of the monolithically integrated APD-TJA Comparison with Silicon Photonics.

Silicon photonics (SiPho) is well known for integration of a PD with electronic circuitry, e.g. integration of circuitry with a PD that may be a pin PD or APD, waveguide or circular (i.e. normal incidence) geometry. Many of these applications for coherent communications require sufficiently fast PDs (usually pin photodiodes), e.g. for establishing the relative phase for QPSK and higher order QAM, high performance modulation schemes. For applications such as phase comparators, etc., implementing circuitry in silicon technology is straightforward. SiPho tends to use CMOS circuitry, with BJTs, e.g. for pads/macros, but not necessarily HBTs, which have a significant advantage over BJTs for $f_T$, etc. To the Applicants knowledge, very few SiPho applications use a monolithically integrated PD with a TIA, which may be, for example, because effective CMOS circuitry requires smaller geometry (i.e. characterized by shorter transistor gate length) than would be economically effective.

Optical Line Terminals (OLT) for Applications Using Multiple Wavelengths.

For Optical Line Terminals (OLT) for PON or other applications using multiple wavelengths, in particular, there is another reason relating to the PD itself why implementation using SiPho is difficult. 1577 nm is close to (or maybe even exceeding) the Ge bandgap energy. Ge is handicapped relative to InGaAs for absorption at this wavelength. It is difficult to achieve good absorption in Ge for a circular i.e. normal incidence geometry PD, whereas for InGaAs this is readily possible. So, although 1577 nm stresses the QE vs bandwidth trade-off for InGaAs, this same wavelength makes circular, normal incidence, geometry Ge-based PDs with acceptable QE quite difficult. One would have to resort to a waveguide geometry for the Ge, if the absorption coefficient is high enough for that even to be done (1) without scattering, etc., by the usual imperfections in fabricated waveguides, and (2) to get the traveling wave of the electrical signal well enough matched for what would be a very long waveguide, which for high speed requires traveling wave.

Thus, implementation of a monolithically integrated DEMUX-DCG/DCM-PIN-TIA with a Ge PD in SiPho presents design and fabrication challenges and presents a "path of high resistance" to practical application. By comparison, monolithic integration of an InGaAs PIN and a TIA fabricated with InP HBTs as described herein, provides a path of "reduced resistance" to practical application, e.g. for OLT and ONU operating at 1.270 μm or 1.577 μm. Other absorption materials within the InGaAlAsP quinternary system, lattice matched to InP can be used, but of all these, InGaAs lattice matched to InP has the lowest bandgap energy, is direct bandgap, and has the highest absorption coefficient near 1.3 μm or 1.5 μm, for the OLT and ONU or other typical applications at these wavelengths.

INDUSTRIAL APPLICABILITY

Disclosed herein are optical receivers of embodiments comprising monolithically integrated components comprising an array of dispersion compensation elements such as for example an AI-generated predetermined arrangement of dispersion compensation elements, along with a demultiplexer (DEMUX), a plurality of waveguide photodiodes (WG-PD) and a plurality of transimpedance amplifiers (TIA). Each TIA may comprise InP heterojunction bipolar transistors (HBT) fabricated from a first plurality of layers of an epitaxial layer stack grown on a SI: InP substrate; each WG-PD is fabricated from a second plurality of layers of the epitaxial layer stack, overlying the first plurality of layers. The DEMUX is fabricated from photonics layers of the epitaxial stack which may be the same as the second plurality of semiconductor layers of the WG-PD, or additional layers of the epitaxial layer stack. The array of dispersion compensation elements, such as for example an AI-generated predetermined arrangement of dispersion compensation elements, may be an InP based configuration, including an airbridge or membrane or an oxidized layer monolithically integrated with the electronic components. Accordingly, outputs of the DEMUX may be laterally optically coupled through optical waveguide material or outputs of the DEMUX may be vertically coupled to each WG-PD through laterally tapered vertical optical couplers. This design approach enables cost-effective fabrication of a monolithically integrated DEMUX with multiple PIN-TIAs for DWM applications.

Alternatively, the array of dispersion compensation elements, such as for example an AI-generated predetermined arrangement of dispersion compensation elements, and DEMUX may reside on a SOT die also being used as an electrical interposer.

Also disclosed is an optical transmitter wherein a plurality of electro-absorption modulators (EAM), EAM Drivers, a Multiplexer (MUX) and optical grating are monolithically integrated for WDM applications, using similar design principles and fabrication techniques for lateral or vertical optical coupling of outputs of multiple EAMs to the monolithically integrated MUX and optical grating.

Alternatively, the array of dispersion compensation elements, such as for example an AI-generated predetermined arrangement of dispersion compensation elements, and MUX may reside on a SOI die also being used as an electrical interposer. In aspects of the invention, it is envisaged that there is an improved performance of optical receivers and transmitters thereby providing a solution to integrating multiple devices on a single chip for applications such as CWDM for high-speed data interconnect, 5G network communications, et al. In some cases, an interposer may comprise different materials for example it may be of GaAs-based materials or the like.

In an aspect, the receiver comprises a plurality of WG-PDs and a plurality of TIAs, each of the plurality of WG-PDs being optically coupled to a respective one of the plurality of optical output ports of the demultiplexer.

In an aspect, the receiver comprises a plurality of TIAs and a plurality of WG-PDs in a one-to-one relationship.

In an aspect, the demultiplexer has N-channels and there are N WG-PDs and N TIAs.

In an aspect, the second plurality of semiconductor layers are photonics layers.

In an aspect, the first plurality of semiconductor layers are electronics layers.

In an aspect, the second plurality of semiconductor layers comprise a first set semiconductor layers and a second set of semiconductor layers and wherein the WG-PD is formed by the first set semiconductor layers and the demultiplexer is formed by the second set semiconductor layers.

In an aspect, the demultiplexer communicates with the PD via an optical connection between the WG-PD and the demultiplexer.

In an aspect, the optical connection comprises a laterally tapered vertical optical coupler.

In an aspect, the optical connection comprises a laterally coupled optical waveguide.

In an aspect, the demultiplexer is designed via an AI-based inverse design process.

In an aspect, the demultiplexer is designed via an AI-based inverse design process trained on one or more of an AI model, an optimizer and a simulator; and configured to have inputs that determine one or more optical characteristics of the demultiplexer.

In an aspect, the AI-based inverse design process produces an output that meet the inputs wherein the output comprises one or more of an empirical structural detail including geometry parameters of the demultiplexer, a pixelated structure, a voxelated structure or a QR type code-like structure which sets out a simple dot-based structure of the demultiplexer, or a full topological structure of the demultiplexer.

In an aspect, the electronic circuitry comprises the TIA comprises InP heterojunction bipolar transistors (HBTs).

In an aspect, the SI substrate comprises a SI Indium Phosphide (InP) substrate.

In an aspect, fabricated with an InP-based materials system comprising binary, ternary, quaternary and other compositions of In, Ga, As, Al, P and Sb.

In an aspect, electrical contacts of the WG-PD are directly interconnected to an input of the TIA by conductive traces.

In an aspect, the first plurality of semiconductor layers of the epitaxial layer stack are separated from the second plurality of semiconductor layers of the epitaxial layer stack by a spacer layer.

In an aspect, the spacer layer comprises a semi-insulating layer.

In an aspect, the demultiplexer demultiplexes the optical signal input into a plurality of wavelengths, each output port of the demultiplexer outputting a selected one of the plurality of wavelengths.

In an aspect, the electronic circuitry comprises electronic devices for controlling or driving the TIA and/or the WG-PD.

In an aspect, the TIA is formed on a first area of the substrate, and the WG-PD is provided on an adjacent area, and comprising an isolation region electrically isolating the first plurality of semiconductor layers of the first area from the second plurality of semiconductor layers of the adjacent area.

In an aspect, the i-layer is selected from materials of the group comprising InGaAs and other absorption materials within the InGaAlAsP quintenary system.

In an aspect, the i-layer comprises InGaAs.

In an aspect, the i-layer comprises a quaternary absorption material within the InGaAlAsP quintenary system, lattice matched to InP.

In an aspect, the i-layer comprises a multi-quantum well Quantum Confined Stark Effect (MQW QCSE) structure.

In an aspect, the transmitter comprises a plurality of EAMs and a plurality of EAM drivers, each of the plurality of EAMs being optically coupled to a respective one of the plurality of optical output ports of the multiplexer.

In an aspect, the transmitter comprises a plurality of EAM drivers and a plurality of EAMs in a one-to-one relationship.

In an aspect, the multiplexer has N-channels and there are N EAMs and N EAM drivers.

In an aspect, the second plurality of semiconductor layers are photonics layers.

In an aspect, the first plurality of semiconductor layers are electronics layers.

In an aspect, the second plurality of semiconductor layers comprise a first set semiconductor layers and a second set of semiconductor layers and wherein the EAM is formed by the first set semiconductor layers and the multiplexer is formed by the second set semiconductor layers.

In an aspect, the multiplexer communicates with the EAM via an optical connection between the EAM and the multiplexer.

In an aspect, the optical connection comprises a laterally tapered vertical optical coupler.

In an aspect, the optical connection comprises a laterally coupled optical waveguide.

In an aspect, the multiplexer is designed via an AI-based inverse design process.

In an aspect, the multiplexer is designed via an AI-based inverse design process based on a trained on one or more of an AI model, an optimizer and a simulator; and configured to have inputs that determine one or more optical characteristics of the demultiplexer.

In an aspect, the AI-based inverse design process produces an output that meet the inputs wherein the output comprises one or more of an empirical structural detail including geometry parameters of the multiplexer, a pixelated structure, a voxelated structure or a QR type code-like structure which sets out a simple dot-based structure of the multiplexer, or a full topological structure of the multiplexer.

In an aspect, the SI substrate comprises a SI Indium Phosphide (In P) based material substrate.

In an aspect, the SI substrate comprises a SI Indium Phosphide (In P) substrate

In an aspect, electrical contacts of the EAM are directly interconnected to an input of the EAM driver by conductive traces.

In an aspect, the first plurality of semiconductor layers of the epitaxial layer stack are separated from the second plurality of semiconductor layers of the epitaxial layer stack by a spacer layer.

In an aspect, the spacer layer comprises a semi-insulating layer.

In an aspect, the multiplexer multiplexes the optical signal inputs from a wavelength from each input port, the multiplexer outputting the plurality of wavelengths.

In an aspect, the electronic circuitry comprises electronic devices for controlling or driving the EAM driver and/or the EAM.

In an aspect, the EAM driver is formed on a first area of the substrate, and the EAM is provided on an adjacent area, and comprising an isolation region electrically isolating the first plurality of semiconductor layers of the first area from the second plurality of semiconductor layers of the adjacent area.

In an aspect, there are N EAMs and the multiplexer has N-channels.

In an aspect, optical axes of waveguides of the EAM and the multiplexer are coplanar and the optical connection comprises a laterally coupled optical waveguide.

In an aspect, the EAM comprises a first plurality of said semiconductor layers and the multiplexer comprises a second plurality of said semiconductor layers, and the optical connection comprises a laterally tapered vertical optical coupler.

In an aspect, the multiplexer is designed via an AI-based inverse design process.

The invention claimed is:

1. A dispersion compensation structure for use in an optical network to compensate for transmission-based dispersion of a light signal, wherein the dispersion compensation structure comprises an array of dispersion compensation elements having an AI-generated matrix of a plurality of materials configured to compensate for transmission-based dispersion to one or more channels of the light signal and to generate an output having a spectrum that is substantially matching a pre-transmission spectrum for the or each channel.

2. The dispersion compensation structure of claim 1, wherein the dispersion compensation structure comprises one of a dispersion compensation grating (DCG); a dispersion compensation matrix (DCM) and a unit cell DCM.

3. The dispersion compensation structure of claim 1, wherein the dispersion compensation structure comprises a plurality of unit cell DCMs arranged in an array.

4. The dispersion compensation structure of claim 3, wherein the or each of the plurality of unit cell DCMs is connected to one or more further unit cell DCM in a predetermined configuration.

5. The dispersion compensation structure of claim 4, wherein the predetermined configuration of unit cells is uniform and different unit cells in the configuration of unit cells are connected in sequence for the or each channel.

6. The dispersion compensation structure of claim 5, wherein the matrix is one of a 1-D, a 2-D and a 3-D matrix of dispersion compensation elements or unit cells.

7. The dispersion compensation structure of claim 1, further comprising a dispersion compensation structure for each channel of the light signal.

8. The dispersion compensation structure of claim 1, wherein the dispersion compensation structure comprises one or more of a dispersion compensation fiber; one dispersion compensation structure located at one end of an optical fiber; one dispersion compensation structure located at one end of an optical fiber and another dispersion compensation structure located at another end of fiber.

9. The dispersion compensation structure of claim 1, configured to operate over a Wavelength Division Multiplexing (WDM) spectral range.

10. The dispersion compensation structure of claim 1, wherein the array of dispersion compensation elements having the AI-generated matrix of a plurality of materials comprises one of a plurality of holes in a passive optical material; an array of air-holes in a passive optical material and the plurality of materials having different relative refractive indexes.

11. The dispersion compensation structure of claim 1, further comprising a demultiplexing arrangement.

12. The dispersion compensation structure of claim 11, wherein the demultiplexing arrangement comprises one of a plurality of AI-generated demultiplexing elements; and a plurality of AI-designed drop filters.

13. The dispersion compensation structure of claim 1, further comprising a multiplexing arrangement.

14. The dispersion compensation structure of claim 13, wherein the multiplexing arrangement comprises one of a plurality of AI-generated multiplexing elements; and a plurality of AI-designed adders.

15. An optical device including the dispersion compensation structure of claim 1, and grown on an underlying supporting semi-insulating (SI) substrate.

16. The optical device of claim 15, further comprising:
   one or more electronic component layers formed on the SI substrate;
   one or more waveguide photonic device layers forming a photonics device; and
   one or more dispersion compensation structure layers.

17. The optical device of claim 16, further comprising an associated cladding layer; an etch stop material and a top dielectric.

18. The optical device of claim 16, wherein the one or more electronic component layers form one or more of a driver, a modulator, an amplifier, a transimpedance amplifier (TIA), a non-photonic device or a non-optical device; one or more (EAM) drivers.

19. The optical device of claim 16, fabricated with an InP-based materials system comprising binary, ternary, quaternary, quintenary and other compositions of In, Ga, As, Al, P and Sb.

20. The optical device of claim 16, for receiving an optical signal from a transmitter via a fiber, and compensating for dispersion caused by transmission of the optical signal from a launched spectrum to a received spectrum, the optical signal comprising one or more channels each having a predetermined dispersion across the or each channel caused by the transmission, the receiver further comprising a combination dispersion compensation and demultiplexing arrangement.

21. The optical device of claim 16, for transmitting an optical signal from a laser via a fiber, and pre-compensating for dispersion caused by transmission of the optical signal from a launched spectrum to a received spectrum, the optical signal comprising one or more channels, each having a predetermined dispersion across the or each channel caused by the transmission, the receiver further comprising a combination dispersion compensation and multiplexing arrangement.

22. The optical device of claim 16, in the form of a photonic device comprising a dispersion compensation structure for use in an optical network to compensate for transmission-based dispersion of a light signal, wherein the dispersion compensation structure comprises an array of dispersion compensation elements having an arrangement configured to compensate for transmission-based dispersion to one or more channels of the light signal and to generate an output having a spectrum that is substantially matching a pre-transmission spectrum for the or each channel; and an array of a plurality of waveguide photodiodes (WG-PD) monolithically integrated on the SI substrate, comprising:

an epitaxial layer stack comprising a plurality of semiconductor layers formed on the SI substrate structured to form optical waveguides of the dispersion compensation structure and the plurality of WG-PDs;

the dispersion compensation structure comprising a first part of the plurality of semiconductor layers, and comprising one or more optical input port for receiving one or more input optical signal, and one or more optical outputs for outputting one or more optical signals;

the array of the plurality of WG-PDs comprising a second part of the plurality of semiconductor layers, the second part being horizontally distanced from the first part, and the plurality of WG-PDs being arranged in parallel;

an input of each WG-PD is optically coupled with one of the plurality of optical outputs of the dispersion compensation structure, and each WG-PD is configured to output a photocurrent to an electrical output.

23. The optical device of claim 16, in the form of a photonic device comprising a dispersion compensation structure for use in an optical network to compensate for transmission-based dispersion of a light signal, wherein the dispersion compensation structure comprises an array of dispersion compensation elements having an arrangement configured to compensate for transmission-based dispersion to one or more channels of the light signal and to generate an output having a spectrum that is substantially matching a pre-transmission spectrum for the or each channel; and an array of a plurality of electro-absorption modulators (EAM) monolithically integrated on the SI substrate, comprising:

an epitaxial layer stack comprising a plurality of semiconductor layers formed on the SI substrate structured to form optical waveguides of the dispersion compensation structure and the plurality of EAMs;

the dispersion compensation structure comprising a first part of the plurality of semiconductor layers, and comprising and one or more optical inputs for receiving one or more optical signals and one or more optical output ports for outputting one or more optical signals;

the array of the plurality of EAMs comprising a second part of the plurality of semiconductor layers, the second part being horizontally distanced from the first part, and the plurality of EAMs being arranged in parallel;

each EAM is configured to receive a continuous wave optical input and an EAM drive signal and to output a modulated optical output, and the modulated optical output of each EAM is optically coupled with one or more optical inputs of the dispersion compensation structure.

24. The optical device of claim 16, wherein the plurality of semiconductor layers grown on the underlying supporting SI substrate comprise silicon-based material.

25. The optical device of claim 16, wherein the plurality of semiconductor layers grown on the underlying supporting SI substrate comprise InP-based material.

26. The optical device according to claim 16, comprising two or more chips in which at least one chip is made from silicon-based material and at least one chip is made from InP-based material.

27. The optical device of claim 16 in the form of one of an optical transmitter, an optical receiver and an optical transceiver.

28. An optical system including one or more optical devices according to claim 27.

29. A method of operating the dispersion compensation structure of claim 1 to transmit an optical signal from a transmitter via an optical fiber to a receiver, the method for compensating for transmission-based dispersion of the light signal, at least one of the transmitter and the receiver comprising a dispersion compensation structure wherein the method comprises providing dispersion compensation via an array of dispersion compensation elements having a predetermined arrangement configured to compensate for transmission-based dispersion to one or more channels of the optical signal and to generate an output having a spectrum that is substantially matching a pre-transmission spectrum for the or each channel.

30. The method of claim 29, further comprising one of multiplexing an output from the dispersion compensation structure into the optical fiber; and demultiplexing an output from the optical fiber into the dispersion compensation structure.

* * * * *